(12) United States Patent
Jones et al.

(10) Patent No.: US 12,251,654 B2
(45) Date of Patent: Mar. 18, 2025

(54) FILTER MEDIUM COMPRISING A FINE FIBER LAYER

(71) Applicant: Donaldson Company, Inc., Bloomington, MN (US)

(72) Inventors: Derek O. Jones, Andover, MN (US); Klenton T. Willis, Woodbury, MN (US); Patricia A. Ignacio-de Leon, Minnetonka, MN (US); Thomas M. Weik, Deephaven, MN (US); Jacob C. Savstrom, Mound, MN (US)

(73) Assignee: Donaldson Company, Inc., Bloomington, MN (US)

( * ) Notice: Subject to any disclaimer, the term of this patent is extended or adjusted under 35 U.S.C. 154(b) by 426 days.

(21) Appl. No.: 17/767,220

(22) PCT Filed: Oct. 8, 2020

(86) PCT No.: PCT/US2020/054844
§ 371 (c)(1),
(2) Date: Apr. 7, 2022

(87) PCT Pub. No.: WO2021/072122
PCT Pub. Date: Apr. 15, 2021

(65) Prior Publication Data
US 2022/0379249 A1 Dec. 1, 2022

Related U.S. Application Data

(60) Provisional application No. 63/004,602, filed on Apr. 3, 2020, provisional application No. 62/992,003, filed
(Continued)

(51) Int. Cl.
*B01D 39/18* (2006.01)
*B01D 39/10* (2006.01)
(Continued)

(52) U.S. Cl.
CPC ............ *B01D 39/18* (2013.01); *B01D 39/10* (2013.01); *B01D 39/1623* (2013.01);
(Continued)

(58) Field of Classification Search
CPC .... B01D 39/18; B01D 39/10; B01D 39/1623; B01D 39/163; B01D 39/2017;
(Continued)

(56) References Cited

U.S. PATENT DOCUMENTS

| 5,554,287 A | 9/1996 | Beck et al. |
| 6,673,136 B2 | 1/2004 | Gillingham et al. |

(Continued)

FOREIGN PATENT DOCUMENTS

| CN | 101952210 A | 1/2011 |
| CN | 102015080 A | 4/2011 |

(Continued)

OTHER PUBLICATIONS

Zhao et al., "Electrospun Bead-on-String Fibers: Useless or Something of Value? Chapter 5," in Novel Aspects of Nanofibers, 2018, pp. 87-102.
(Continued)

*Primary Examiner* — Liam Royce
(74) *Attorney, Agent, or Firm* — Mueting Raasch Group

(57) ABSTRACT

This disclosure describes a filter medium that minimizes the adverse effects of variations in flow rate on filter medium efficiency without a corresponding increase in pressure drop. The filter medium includes a support layer, a continuous fine fiber layer, and an efficiency layer. The continuous fine fiber layer includes a continuous fine fiber that has a diameter of up to 10 micrometers and is located downstream of the efficiency layer.

20 Claims, 17 Drawing Sheets

Related U.S. Application Data on Mar. 19, 2020, provisional application No. 62/952,979, filed on Dec. 23, 2019, provisional application No. 62/947,998, filed on Dec. 13, 2019, provisional application No. 62/912,456, filed on Oct. 8, 2019.

(51) Int. Cl.
  *B01D 39/16* (2006.01)
  *B01D 39/20* (2006.01)

(52) U.S. Cl.
  CPC ....... *B01D 39/163* (2013.01); *B01D 39/2017* (2013.01); *B01D 2239/0216* (2013.01); *B01D 2239/0627* (2013.01); *B01D 2239/0631* (2013.01); *B01D 2239/0636* (2013.01); *B01D 2239/064* (2013.01); *B01D 2239/0654* (2013.01); *B01D 2239/1216* (2013.01); *B01D 2239/1233* (2013.01); *B01D 2239/1266* (2013.01); *B01D 2239/1291* (2013.01)

(58) Field of Classification Search
  CPC .... B01D 2239/0216; B01D 2239/0627; B01D 2239/0631; B01D 2239/0636; B01D 2239/064; B01D 2239/0654; B01D 2239/1216; B01D 2239/1233; B01D 2399/1266; B01D 2329/1291; B01D 2239/025

See application file for complete search history.

(56) References Cited

U.S. PATENT DOCUMENTS

| | | |
|---|---|---|
| 6,716,274 B2 | 4/2004 | Gogins et al. |
| 6,743,273 B2 | 6/2004 | Chung et al. |
| 6,746,517 B2 | 6/2004 | Benson et al. |
| 6,800,117 B2 | 10/2004 | Barris et al. |
| 6,875,256 B2 | 4/2005 | Gillingham et al. |
| 6,924,028 B2 | 8/2005 | Chung et al. |
| 6,955,775 B2 | 10/2005 | Chung et al. |
| 7,070,640 B2 | 7/2006 | Chung et al. |
| 7,090,715 B2 | 8/2006 | Chung et al. |
| 7,160,451 B2 | 1/2007 | Hacker et al. |
| 7,238,285 B2 | 7/2007 | Hacker et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,641,055 B2 | 1/2010 | Ferrer et al. |
| 7,981,336 B2 | 7/2011 | Pourdeyhimi |
| 7,985,275 B2 | 7/2011 | Smithies |
| 7,988,860 B2 | 8/2011 | Kalayci et al. |
| 8,057,567 B2 | 11/2011 | Webb et al. |
| 8,263,214 B2 | 9/2012 | Kalayci et al. |
| 8,267,681 B2 | 9/2012 | Gupta et al. |
| 8,268,033 B2 | 9/2012 | Rogers et al. |
| 8,277,529 B2 | 10/2012 | Rogers et al. |
| 8,366,797 B2 | 2/2013 | Chung et al. |
| 8,512,435 B2 | 8/2013 | Rogers et al. |
| 8,513,431 B2 | 8/2013 | Annis et al. |
| 8,524,041 B2 | 9/2013 | Gupta et al. |
| 8,641,796 B2 | 2/2014 | Rogers et al. |
| 8,673,040 B2 | 3/2014 | Handley et al. |
| 8,709,139 B2 | 4/2014 | Veeser et al. |
| 8,721,756 B2 | 5/2014 | Handley et al. |
| 8,834,610 B2 | 9/2014 | Lundgren et al. |
| 8,882,876 B2 | 11/2014 | Battenfeld et al. |
| 8,950,587 B2 | 2/2015 | Thomson et al. |
| 9,149,748 B2 | 10/2015 | Nagy et al. |
| 9,149,749 B2 | 10/2015 | Nagy et al. |
| 9,153,291 B2 | 10/2015 | Miller, III et al. |
| 9,259,689 B2 | 2/2016 | Waller, Jr. et al. |
| 9,303,339 B2 | 4/2016 | Gupta et al. |
| 9,435,056 B2 | 9/2016 | Shenoy et al. |
| 9,492,775 B2 | 11/2016 | Amsden et al. |
| 9,511,330 B2 | 12/2016 | Yu et al. |
| 9,587,328 B2 | 3/2017 | Shenoy et al. |
| 9,662,600 B2 | 5/2017 | Parker |
| 9,718,005 B2 | 8/2017 | Klein et al. |
| 9,795,906 B2 | 10/2017 | Rogers et al. |
| 9,885,154 B2 | 2/2018 | Gupta |
| 9,950,284 B2 | 4/2018 | Thomson et al. |
| 9,987,578 B2 | 6/2018 | Haberkamp et al. |
| 10,058,808 B2 | 8/2018 | Haberkamp et al. |
| 10,080,985 B2 | 9/2018 | Nagy et al. |
| 10,137,394 B2 | 11/2018 | Tong et al. |
| 10,252,200 B2 | 4/2019 | Anantharamaiah et al. |
| 10,279,291 B2 | 5/2019 | Nagy et al. |
| 10,293,288 B2 | 5/2019 | Chavan et al. |
| 10,316,468 B2 | 6/2019 | Gupta |
| 10,316,748 B2 | 6/2019 | Lans |
| 10,343,095 B2 | 7/2019 | Jaganathan et al. |
| 10,357,729 B2 | 7/2019 | Parker |
| 10,363,505 B2 | 7/2019 | Parker |
| 10,391,434 B2 | 8/2019 | Haberkamp et al. |
| RE47,737 E | 11/2019 | Kahlbaugh et al. |
| 10,537,837 B2 | 1/2020 | Haberkamp et al. |
| 10,610,813 B2 | 4/2020 | Rogers et al. |
| 10,653,979 B2 | 5/2020 | Barsness et al. |
| 10,953,356 B2 | 3/2021 | Haberkamp et al. |
| 10,974,182 B2 | 4/2021 | Schwandt et al. |
| 11,090,590 B2 | 8/2021 | Nagy et al. |
| 11,123,668 B2 | 9/2021 | Anantharamaiah et al. |
| 11,167,232 B2 | 11/2021 | Jaganathan et al. |
| RE49,097 E | 6/2022 | Kahlbaugh et al. |
| 11,504,663 B2 | 11/2022 | Rogers et al. |
| 2002/0046656 A1 | 4/2002 | Benson et al. |
| 2003/0106294 A1 | 6/2003 | Chung et al. |
| 2004/0116025 A1 | 6/2004 | Gogins et al. |
| 2004/0180598 A1 | 9/2004 | Yang et al. |
| 2004/0211160 A1 | 10/2004 | Rammig et al. |
| 2005/0026526 A1 | 2/2005 | Verdegan et al. |
| 2005/0160711 A1 | 7/2005 | Yang |
| 2006/0096263 A1 | 5/2006 | Kahlbaugh et al. |
| 2006/0096932 A1 | 5/2006 | Dema et al. |
| 2006/0137317 A1 | 6/2006 | Bryner et al. |
| 2006/0242933 A1 | 11/2006 | Webb et al. |
| 2007/0131235 A1 | 6/2007 | Janikowski et al. |
| 2008/0105626 A1 | 5/2008 | Jones et al. |
| 2008/0110342 A1 | 5/2008 | Ensor et al. |
| 2008/0149561 A1 | 6/2008 | Chu et al. |
| 2008/0160856 A1 | 7/2008 | Chen et al. |
| 2008/0302242 A1 | 12/2008 | Schelling et al. |
| 2008/0314010 A1 | 12/2008 | Smithies et al. |
| 2009/0120868 A1 | 5/2009 | Huppchen et al. |
| 2009/0221812 A1 | 9/2009 | Ankerfors et al. |
| 2009/0266759 A1 | 10/2009 | Green |
| 2009/0272086 A1 | 11/2009 | Hsiao et al. |
| 2010/0206803 A1 | 8/2010 | Ward et al. |
| 2010/0282682 A1 | 11/2010 | Eaton et al. |
| 2010/0307119 A1 | 12/2010 | Leung et al. |
| 2010/0313753 A1 | 12/2010 | Calis et al. |
| 2011/0138683 A1 | 6/2011 | Hernandez Altamirano et al. |
| 2011/0138685 A1 | 6/2011 | Kalayci et al. |
| 2011/0174158 A1 | 7/2011 | Walls et al. |
| 2011/0210059 A1 | 9/2011 | Green et al. |
| 2011/0259796 A1 | 10/2011 | Chen et al. |
| 2012/0043038 A1 | 2/2012 | Dodd |
| 2012/0137885 A1 | 6/2012 | Dullaert et al. |
| 2012/0190264 A1 | 7/2012 | Mahammad et al. |
| 2012/0234748 A1 | 9/2012 | Little et al. |
| 2013/0068687 A1 | 3/2013 | Shenoy et al. |
| 2013/0152948 A1 | 6/2013 | Inagaki et al. |
| 2013/0233789 A1 | 9/2013 | Parker |
| 2014/0020350 A1 | 1/2014 | Fu |
| 2014/0043038 A1 | 2/2014 | Chen et al. |
| 2014/0076797 A1 | 3/2014 | Jo et al. |
| 2014/0110354 A1 | 4/2014 | Haberkamp et al. |
| 2014/0123613 A1 | 5/2014 | Le Port et al. |
| 2014/0275692 A1 | 9/2014 | Patel et al. |
| 2014/0291222 A1 | 10/2014 | Behrendt et al. |
| 2014/0360145 A1 | 12/2014 | Hamada et al. |
| 2015/0174509 A1 | 6/2015 | Swaminathan |
| 2015/0298070 A1 | 10/2015 | Koslov et al. |

(56) References Cited

U.S. PATENT DOCUMENTS

| | | |
|---|---|---|
| 2015/0354139 A1 | 12/2015 | Geisen et al. |
| 2015/0360159 A1 | 12/2015 | Lee et al. |
| 2016/0023146 A1 | 1/2016 | Hampton et al. |
| 2016/0038864 A1 | 2/2016 | Calcaterra et al. |
| 2016/0038865 A1 | 2/2016 | Jones et al. |
| 2016/0051918 A1 | 2/2016 | Walz et al. |
| 2016/0051920 A1 | 2/2016 | Sato et al. |
| 2016/0074790 A1 | 3/2016 | Kuroda et al. |
| 2016/0136553 A1 | 5/2016 | Healey et al. |
| 2016/0136584 A1 | 5/2016 | Hwang et al. |
| 2016/0166953 A1 | 6/2016 | Swaminathan et al. |
| 2016/0166961 A1 | 6/2016 | Haberkamp et al. |
| 2016/0175748 A1 | 6/2016 | Park |
| 2016/0243478 A1 | 8/2016 | Park |
| 2016/0256805 A1 | 9/2016 | Grein et al. |
| 2016/0279548 A1 | 9/2016 | Chavan et al. |
| 2016/0361674 A1 | 12/2016 | Swaminathan et al. |
| 2016/0367922 A1 | 12/2016 | Kamiyama |
| 2017/0028329 A1 | 2/2017 | Motomura et al. |
| 2017/0080368 A1 | 3/2017 | Smith et al. |
| 2017/0128892 A1 | 5/2017 | Yu et al. |
| 2017/0173509 A1 | 6/2017 | Giglia et al. |
| 2017/0232372 A1 | 8/2017 | Zhang et al. |
| 2017/0296953 A1 | 10/2017 | Parker |
| 2017/0304755 A1 | 10/2017 | Bansal et al. |
| 2017/0306148 A1 | 10/2017 | Bansal et al. |
| 2017/0319994 A1 | 11/2017 | Parker |
| 2017/0361254 A1 | 12/2017 | Huang et al. |
| 2018/0001247 A1* | 1/2018 | Jinka ............ B01D 39/1623 |
| 2018/0085698 A1 | 3/2018 | Motomura et al. |
| 2018/0169551 A1 | 6/2018 | Jaganathan et al. |
| 2018/0178150 A1 | 6/2018 | Neumann et al. |
| 2018/0236385 A1 | 8/2018 | Jinka et al. |
| 2018/0272258 A1 | 9/2018 | Healey et al. |
| 2018/0280845 A1 | 10/2018 | Barlow, Jr. et al. |
| 2018/0280846 A1 | 10/2018 | Barlow, Jr. et al. |
| 2018/0280847 A1 | 10/2018 | Barlow, Jr. et al. |
| 2018/0361287 A1 | 12/2018 | Zhang et al. |
| 2019/0224598 A1 | 7/2019 | Chavan et al. |
| 2019/0255473 A1 | 8/2019 | Gao et al. |
| 2020/0038793 A1 | 2/2020 | Jaganathan et al. |
| 2020/0078742 A1 | 3/2020 | Seo et al. |
| 2020/0391147 A1 | 12/2020 | Schmalz |
| 2021/0086116 A1 | 3/2021 | Shim et al. |
| 2021/0093989 A1 | 4/2021 | Doucoure et al. |
| 2021/0170317 A1* | 6/2021 | Janikowski ........ B01D 39/2048 |
| 2021/0178300 A1 | 6/2021 | Schwandt et al. |
| 2021/0213378 A1 | 7/2021 | Shim et al. |
| 2021/0370208 A1 | 12/2021 | Yegya-Raman et al. |
| 2021/0370218 A1 | 12/2021 | Daus et al. |
| 2021/0387120 A1 | 12/2021 | Petri et al. |
| 2022/0047976 A1 | 2/2022 | Rao et al. |
| 2022/0162785 A1 | 5/2022 | Adachi et al. |
| 2022/0193587 A1 | 6/2022 | Cheng et al. |
| 2022/0387915 A1 | 12/2022 | Ignacio-de Leon et al. |
| 2023/0018302 A1 | 1/2023 | Jones et al. |
| 2023/0021769 A1 | 1/2023 | Jones et al. |
| 2023/0051258 A1 | 2/2023 | Jaganathan et al. |
| 2023/0149840 A1 | 5/2023 | Rogers et al. |

FOREIGN PATENT DOCUMENTS

| | | |
|---|---|---|
| CN | 105392544 A | 3/2016 |
| CN | 105451854 A | 3/2016 |
| CN | 106573191 A | 4/2017 |
| CN | 108330556 A | 7/2018 |
| CN | 109310936 A | 2/2019 |
| CN | 109562311 A | 4/2019 |
| CN | 110124413 A | 8/2019 |
| DE | 102013008391 A1 | 10/2014 |
| DE | 112013005087 T5 | 7/2015 |
| DE | 112014003579 T5 | 4/2016 |
| DE | 102015002672 A1 | 9/2016 |
| DE | 112015002324 T5 | 3/2017 |
| EP | 1764144 A1 | 3/2007 |
| EP | 1860236 A2 | 11/2007 |
| EP | 1894609 A1 | 3/2008 |
| EP | 1689510 B1 | 7/2009 |
| EP | 2589422 A2 | 5/2013 |
| EP | 2822670 A2 | 1/2015 |
| EP | 2958652 A1 | 12/2015 |
| EP | 2222385 B1 | 6/2016 |
| EP | 3029190 A1 | 6/2016 |
| EP | 3056597 A1 | 8/2016 |
| EP | 3064262 A1 | 9/2016 |
| EP | 3083003 A1 | 10/2016 |
| EP | 3100779 A1 | 12/2016 |
| EP | 3142774 A1 | 3/2017 |
| EP | 3225294 A1 | 10/2017 |
| EP | 2809433 B1 | 11/2017 |
| EP | 2987544 B1 | 12/2017 |
| EP | 3100779 B1 | 3/2018 |
| EP | 2361144 B1 | 5/2018 |
| EP | 2864019 B1 | 9/2018 |
| EP | 3416735 A1 | 12/2018 |
| EP | 3445470 A1 | 2/2019 |
| EP | 3056598 B1 | 4/2019 |
| EP | 3508265 A1 | 7/2019 |
| EP | 3519076 A1 | 8/2019 |
| EP | 3445899 A4 | 11/2019 |
| EP | 3233240 B1 | 2/2020 |
| EP | 3357564 B1 | 3/2020 |
| EP | 3738659 A1 | 11/2020 |
| EP | 3039177 B1 | 10/2021 |
| EP | 3895779 A1 | 10/2021 |
| EP | 3906991 A1 | 11/2021 |
| EP | 3781286 B1 | 6/2022 |
| ES | 2731684 T3 | 11/2019 |
| IN | 325621 B | 3/2014 |
| JP | 6045687 B2 | 12/2016 |
| KR | 101416614 B1 | 7/2014 |
| KR | 101479752 B1 | 1/2015 |
| KR | 101479753 B1 | 1/2015 |
| PL | 233499 B1 | 10/2019 |
| WO | 2006049664 A1 | 5/2006 |
| WO | 2006052732 A2 | 5/2006 |
| WO | 2006089063 A2 | 8/2006 |
| WO | 2007133403 A2 | 11/2007 |
| WO | 2008142023 A2 | 11/2008 |
| WO | 2009014539 A1 | 1/2009 |
| WO | 2009067365 A2 | 5/2009 |
| WO | 2010009043 A2 | 1/2010 |
| WO | 2010124899 A1 | 11/2010 |
| WO | 2013043987 A1 | 3/2013 |
| WO | 2013170890 A1 | 11/2013 |
| WO | 2014130933 A1 | 8/2014 |
| WO | 2014164130 A1 | 10/2014 |
| WO | 2015016449 A1 | 2/2015 |
| WO | 2015017795 A2 | 2/2015 |
| WO | 2015053442 A1 | 4/2015 |
| WO | 2015053443 A1 | 4/2015 |
| WO | 2015091181 A2 | 6/2015 |
| WO | 2015157638 A2 | 10/2015 |
| WO | 2016022758 A1 | 2/2016 |
| WO | 2016100300 A8 | 7/2016 |
| WO | 2016205621 A1 | 12/2016 |
| WO | 2016210153 A1 | 12/2016 |
| WO | 2017184982 A1 | 10/2017 |
| WO | 2017196653 A1 | 11/2017 |
| WO | 2017214419 A1 | 12/2017 |
| WO | 2018011347 A1 | 1/2018 |
| WO | 2018175556 A1 | 9/2018 |
| WO | 2018193165 A1 | 10/2018 |
| WO | 2018208819 A1 | 11/2018 |
| WO | 2019202212 A1 | 10/2019 |
| WO | 2019202213 A1 | 10/2019 |
| WO | 2020052884 A1 | 3/2020 |
| WO | 2020152551 A1 | 7/2020 |
| WO | 2021072117 A1 | 4/2021 |
| WO | 2021072122 A1 | 4/2021 |
| WO | 2021203066 A1 | 10/2021 |

(56) References Cited

FOREIGN PATENT DOCUMENTS

WO      2021203067 A1    10/2021
WO      2021203068 A1    10/2021

OTHER PUBLICATIONS

Yoon et al., "High flux ultrafiltration membranes based on electrospun nanofibrous PAN scaffolds and chitosan coating," Polymer, 2006, vol. 47, pp. 2434-2441.
Wikipedia, "Powered air-purifying respirator," retrieved from the Internet on Mar. 20, 2023, <URL:https:en.wikipedia.org/wiki/Powered_air-purifying_respirator>, 5 pages.
Wertz et al., "Filtration media: Advantages of nanofibre coating technology," Filtration & Separation, Jul./Aug. 2009, vol. 46, No. 4, pp. 18-20.
Wang et al., "Computational characterization of nonwoven fibrous media: 1. Pore-network extractionand morphological analysis," Physical Review Materials, 2020, vol. 4, No. 083803, 11 pages.
Cerex Advanced Fabrics, Inc., "Benefits of Spunbond Substrate Uniformity in Advanced Filtration Media," date unavailable but believed to be available as early as 2018, retrieved from the Internet on Dec. 5, 2019, <URL:https://www.cerex.com/wp-content/uploads/2018/03/benefits-of-spunbond-substrate-uniformity-in-advanced-filtration-media.pdf>, 19 pages.
Chinga-Carrasco, "Cellulose fibres, nanofibrils and microfibrils: The morphological sequence of MFC components from a plant physiology and fibre technology point of view," Nanoscale Research Letters, 2011, vol. 6, No. 417, 7 pgs.
Fong et al., "Beaded nanofibers formed during electrospinning," Polymer, 1999, vol. 40, pp. 4585-4592.
Hollingsworth & Vose, "Technostat Electrostatic Filter Media," Mar. 8, 2011, 2 pages.
Hollingsworth & Vose, Technostat® Product Information, 2023, retrieved from the Internet on Mar. 20, 2023, <URL: https://www.hollingsworth-vose.com/brands/filtration/technostat/>, 5 pages.
Hutten, Handbook of Nonwoven Filter Media, Butterworth-Heinemann, an imprint of Elsevier: Oxford, UK; 2007, 13 pgs.
International Prelimary Report on Patentability in PCT/US2020/054844, mailed Apr. 12 2022, 7 pages.
International Preliminary Report on Patentability in PCT/US2020/054837, mailed Apr. 12, 2022, 7 pages.
International Preliminary Report on Patentability in PCT/US2021/025673, mailed Sep. 29, 2022, 7 pages.
International Preliminary Report on Patentability in PCT/US2021/025674, mailed Sep. 29, 2022, 7 pages.
International Preliminary Report on Patentability in PCT/US2021/025676, mailed Sep. 29, 2022, 14 pages.
International Search Report and Written Opinion in PCT/US2020/054837, mailed Jan. 14, 2021, 10 pages.
International Search Report and Written Opinion in PCT/US2021/025674, mailed Jul. 19, 2021, 10 pages.
International Search Report and Written Opinion in PCT/US2021/025676, mailed Sep. 16, 2021, 19 pages.
International Search Report and Written Opinion in PDT/US2021/025673, mailed Jul. 19, 2021, 10 pages.
International Search Report and Written Opinion in PCT/US2020/054844, mailed Jan. 26, 2021, 9 pages.
Invitation to Pay Additional Fees in PCT/US2021/025676, mailed Jul. 26, 2021, 12 pages.
Teijin Aramind, "A truee all-around para-aramid performer," Twaron® Product Brochure, Nov. 6, 2018, 9 pages.
Superior Felt & Filtration, Sub-Micron Fibers—Technostat® Filter Media for Air & Liquid Applications, 2017, 8 pages.
Subbiah et al., "Electrospinning of Nanofibers," Journal of Applied Polymer Science, 2005, vol. 96, pp. 557-569.
Kirsch et al., "Studies on Fibrous Aerosol Filters—III Diffusional Deposition of Aerosol in Fibrous Filter," Ann. Occup. Hyg., 1968, vol. 11, pp. 299-304 (Abstract Only).
Ma et al., "Fabrication and characterisation of cellulose nanofiber based thin-film nanofibrous composite membranes," Journal of Membrane Science, 2014, vol. 454, pp. 272-282.
Purchas, Handbook of Filter Media, 1st Edition, Elsevier Advanced Technology: Oxford, UK; 1996, pp. 152 and 154.
Sheffield, "Changes in Filtration and Contamination," Schroeder Industries, retrieved from the Internet Oct. 7, 2019 <URL:https://www.machinerylubrication.com/Articles/Print/704>, 5 pages.
"The new Filter Media Synteq XP" Brochure, Donaldson Filtration Soltions, Apr. 2009, 4 pages.

* cited by examiner

FILTER MEDIUM COMPRISING A FINE FIBER LAYER

Cross Reference to Related Applications

This application is the § 371 U.S. National Stage of International Application No. PCT/US2020/054844, filed 8 Oct. 2020, which claims the benefit of U.S. Provisional Application Ser. No. 62/912,456, filed 8 Oct. 2019; U.S. Provisional Application Ser. No. 62/947,998, filed 13 Dec. 2019; U.S. Provisional Application Ser. No. 62/952,979, filed 23 Dec. 2019; U.S. Provisional Application Ser. No. 62/992,003, filed 19 Mar. 2020; and U.S. Provisional Application Ser. No. 63/004,602, filed 3 Apr. 2020, the disclosures of which are incorporated by reference herein in their entireties.

SUMMARY OF THE INVENTION

Filter media for use in hydraulic applications is typically tested at a steady flow rate. But in many hydraulic applications, the flow rate varies during use. Variations in flow rate including, for example, under cyclic flow conditions or other dynamic flow conditions, have an adverse effect of filter media performance and, in particular, on filter media efficiency because variations in flow rate result in a particle having multiple opportunities to pass through a media opening.

This disclosure describes a filter medium that minimizes the adverse effects of variations in flow rate on filter medium efficiency without a corresponding increase in pressure drop—that is, an increase in the pressure necessary to force fluid through the filter medium. Although it was known at the time of the invention that the effect of varying flow rates on filter media performance could be minimized by increasing efficiency of the filter media, the means used to increase the efficiency of the filter media also resulted in a corresponding increase in pressure drop. Such an increase in pressure drop results in more opportunities for the filter to be bypassed (for example, via a bypass valve), increased energy consumption, and shorter filter life. In contrast, the filter medium described herein achieves increased efficiency without compromising pressure drop.

In one aspect, this disclosure describes a filter medium including a support layer; a continuous fine fiber layer, having a thickness of up to 50 µm; and an efficiency layer. A composite including the support layer and the continuous fine fiber layer has a P95/P50 ratio of up to 1.8, up to 1.9, or up to 2. The efficiency layer has a P95/P50 ratio of at least 1.8, at least 1.9, or at least 2. Additionally, the value of P95 of the composite falls within a range provided by the values of P5 and P50 of the efficiency layer.

In some embodiments, the composite has a P95/P50 ratio of greater than 1.

In some embodiments, the continuous fine fiber layer has a thickness of at least 2 µm. In some embodiments, the continuous fine fiber layer is located between the efficiency layer and the support layer. In some embodiments, the continuous fine fiber layer includes a fiber having a diameter of up to 10 micrometers (µm). In some embodiments, the continuous fine fiber layer includes a fiber having an elliptical shape. In some embodiments, the continuous fine layer includes a fiber having a diameter of at least 1 micrometer (µm).

In some embodiments, the continuous fine fiber layer includes a mixture of fibers of different diameters. The fibers of different diameters may be commingled within a single strata of the continuous fine fiber layer. Additionally or alternatively, the fibers of different diameters may form different strata in the continuous fine fiber layer.

In some embodiments, the efficiency layer has a P95/P50 ratio of up to 10, up to 15, or up to 20. In some embodiments, the efficiency layer is located on the upstream side of the filter medium.

In some embodiments, the filter medium further comprises a second efficiency layer. The second efficiency layer may be located adjacent to and upstream of the efficiency layer.

In some embodiments, the efficiency layer includes a bi-component fiber and an efficiency fiber, wherein the efficiency fiber has a smaller diameter than the bi-component fiber. The efficiency fiber may include a glass fiber. In some embodiments, the efficiency layer includes a microfilbrillated cellulose fiber.

In some embodiments, the support layer may include a spunbond layer.

In another aspect, this disclosure describes a filter element including a filter medium described herein. In some embodiments, a wire support may be located downstream of the support layer.

As used herein, a "fiber" has an average fiber diameter of up to 100 micrometers.

As used herein, fibers having an "average" diameter indicates that in a sample of a plurality of fibers, the average fiber diameter of that population of fibers in that sample has the indicated average fiber diameter. A population of fibers includes fibers having a diameter within 25% of an average fiber diameter. For example, a population of fibers having an average diameter of 1000 nm includes fibers having a diameter of at least 750 nm and up to 1250 nm. In another example, a population of fibers having an average diameter of 250 nm includes fibers having a diameter of at least 188 nm and up to 313 nm. In a further example, a population of fibers having an average diameter of 500 nm includes fibers having a diameter of at least 375 nm and up to 625 nm. In yet another example, a population of fibers having an average diameter of 1400 nm includes fibers having a diameter of at least 1050 nm and up to 1750 nm.

Fiber diameter may be measured using a top-down SEM image. The sample may be sputter-coated. A useful sputter-coater may be a gold and palladium mixture including, for example, a Au:Pd 60:40 mixture. A more accurate fiber diameter measurement may be obtained by measuring the diameter of the fiber in at least 30 locations in the sample. Software such as a Trainable Weka Segmentation (an ImageJ plug-in) may be useful for analyzing fiber diameters.

As used herein, "fine fiber" refers to a fiber having a diameter of up to 10 micrometers (µm). In some embodiments, a fine fiber has a diameter of at least 50 nm or at least 100 nm.

The term "diameter" refers either to the diameter of a circular cross-section of a fiber, or to a largest cross-sectional dimension of a non-circular cross-section of a fiber.

The term "particle size," as used herein, refers to a particle's diameter, determined as described in ISO 11171:2016.

As used herein, "continuous fine fiber" refers to a fine fiber having an aspect ratio (that is, length to lateral dimension) of at least 5,000, or, more preferably, at least 10,000. References herein to a continuous fine fiber layer refer to a layer that includes a continuous fine fiber (as opposed to a short cut fine fiber). While a continuous fine fiber layer is preferably formed by a fiber-forming process that produces a continuous fine fiber, the resulting layer may or may not include only one continuous fine fiber. That is, a continuous fine fiber layer may include one or more fine fiber shaving an aspect ratio of at least 5,000, or, more preferably, at least 10,000.

As used herein, "short cut fine fiber" refers to a fine fiber having an aspect ratio (that is, length to lateral dimension) of less than 5,000, less than 2,500, or less than 1,000. Typically, a short cut fine fiber has an aspect ratio of at least 10 and up to 5,000.

As used herein, "commingled" fibers or a "commingled fiber structure" refer to fibers having at least two different diameters, wherein fibers having an average first diameter and fibers having an average second diameter are commingled, that is, wherein fiber are mixed within the same layer (or strata) of a media structure as a result of the fibers having been formed or deposited simultaneously or by using very short (for example, up to 10 seconds, up to 20 seconds, or up to 30 seconds) pulses of each polymer solution. When visualized using a top-down SEM image, fibers having an average first diameter may be observed as being located both below and above fibers having an average second diameter.

As used herein, "layered" fibers or a "layered fiber structure" refer to fibers having at least two different diameters, wherein fibers having an average first diameter are not substantially entangled with the fibers having an average second diameter as a result of fibers of differing diameters having been alternately applied to a substrate.

As used herein, unless indicated otherwise, pore size (for example P5, P50, and P95) and ratios of pore sizes (for example, P95/P50) are determined using capillary flow porometry. Capillary flow porometry may be performed using a continuous pressure scan mode. It may be useful to use silicone oil, having a surface tension of 20.1 dynes/cm and a wetting contact angle of 0, as a wetting liquid. The sample may initially be tested dry, varying low pressure to high pressure, and then tested wet, again varying low pressure to high pressure. The test is typically performed at ambient temperature conditions (for example, 20° C. to 25° C.). 256 data points may be collected across the range of the scan of the pressures for both the dry curve and the wet curve. Typically, no tortuosity factor and/or a shape factor will be used (that is, for comparison to other test methods that use an adjustment factor, a factor equal to 1 may be used).

As used herein, a value P(x %) is the calculated pore size when the wet curve is equal to (100−x) % of the dry curve, as determined using the methodology described herein. Although a calculated value, this can be understood as representing the point at which x % of the overall flow through the layer passes through pores of that size or below. For example, P50 (the mean flow pore size) represents the point at which the wet curve is equal to half the dry curve, and may be viewed as the pore size such that 50% of the total flow through the layer is through pores of that size or below.

An average pore size (for example, average maximum pore size) may be calculated from the mean of at least three measurements (taken from at least three different sample locations. Individual measurements of maximum pore size (which may also be referred to as P100) may be detected at the bubble point, where the bubble point is found after fluid begins passing through the sample, and three consecutive measurements increase by at least 1%, where 256 data points are collected across the scan at a rate of approximately 17 data points per minute.

As used herein, the "β ratio" (also referred to herein as "β" or "Beta ratio") is the ratio of upstream particles to downstream particles. The more efficient the filter, the higher the β ratio. The β ratio is defined as follows:

$$\beta_d = \frac{N_{d,U}}{N_{d,D}}$$

where $N_{d,U}$ is the upstream particle count per unit fluid volume for particles of diameter d or greater and $N_{d,D}$ is the downstream particle count per unit fluid volume for particles of diameter d or greater. If present, the subscript attached to β indicates the particle size for which the ratio is being reported.

As used herein, "over-all β ratio" or "over-all β" is the ratio of the sum of all upstream particles over the course of the assay to the sum of all downstream particles over the course of the test (where the test is run to a pressure of 25 psi (172 kPa)):

$$\text{Over-all } \beta_d = \frac{\sum N_{d,U}}{\sum N_{d,D}}$$

where $N_{d,U}$ is the upstream particle count per unit fluid volume for particles of diameter d or greater and $N_{d,D}$ is the downstream particle count per unit fluid volume for particles of diameter d or greater. If present, the subscript attached to β indicates the particle size for which the ratio is being reported.

As used herein, "β100" is the size of the particle at which over-all β is 100.

As used herein, "filtration efficiency" or "efficiency" refers to the percentage of the contaminant removed by the filter, calculated as follows:

$$e_d = 100\left(1 - \frac{1}{\beta_d}\right)$$

where e is the filtration efficiency and β is defined as indicated above. Thus, the efficiencies referred to herein are cumulative efficiencies. If present, the subscript attached to e indicates the particle size for which the ratio is being reported.

As used herein, "pressure drop" (also referred to herein as "dP" or "ΔP") relates to the pressure (exerted by a pump) necessary to force fluid through the filter or filter medium (prior to the addition of a contaminant) for a particular fluid velocity. Unless otherwise indicated, pressure drop is measured as described in ISO 3968:2017.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

Unless otherwise specified, "a," "an," "the," and "at least one" are used interchangeably and mean one or more than one. The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, the recitations of numerical ranges by endpoints include all numbers subsumed within that range (for example, 1 to 5 includes 1, 1.5, 2, 2.75, 3, 3.80, 4, 5, etc.). Herein, "up to" a number (for example, up to 50) includes the number (for example, 50).

For any method disclosed herein that includes discrete steps, the steps may be conducted in any feasible order. And, as appropriate, any combination of two or more steps may be conducted simultaneously.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Any reference to standard methods (e.g., ASTM, TAPPI, AATCC, etc.) refer to the most recent available version of the method at the time of filing of this disclosure unless otherwise indicated.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1A:
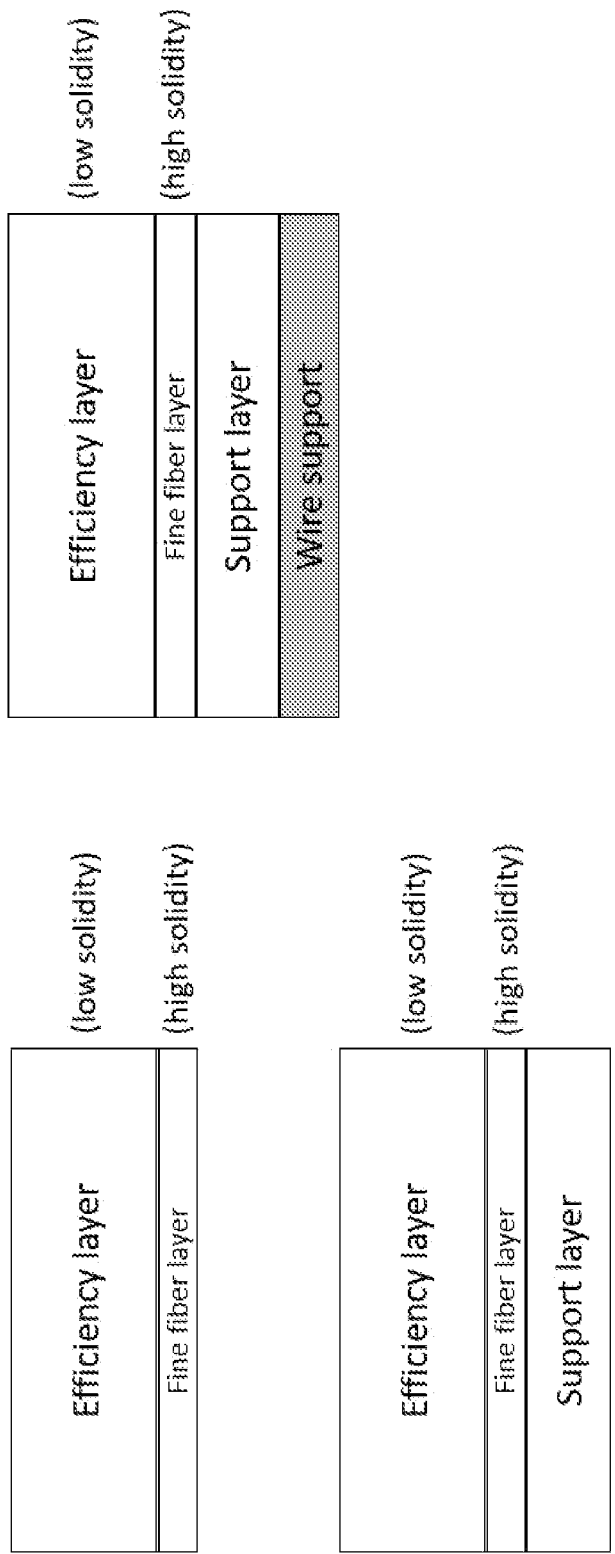
FIG. 1A-FIG. 1B show exemplary filter media and filter element constructions, as further described herein.

This disclosure describes a filter medium that minimizes the adverse effects of variations in flow rate (that occur, for example, during dynamic flow conditions) on filter medium efficiency without a corresponding increase in pressure drop—that is, an increase in the pressure necessary to force fluid through the filter medium. This disclosure further describes methods of making the filter medium.

Challenges of Designing a Filter Medium for Dynamic Flow Conditions

This disclosure describes a filter medium that minimizes the adverse effects of variations in flow rate on filter medium efficiency without a corresponding increase in pressure drop. These variations in flow rate may occur, for example, during dynamic flow conditions. Dynamic flow conditions include, for example, cyclic flow conditions. However, as further discussed herein, the filter media design may also be used to improved performance in other liquid applications.

If a filter was designed with efficiency as the only performance criteria, it would be easy to solve all filtration needs. But, for most applications, pressure and filter life must also be considered and balanced against the desired efficiency.

For example, it is easy to design a filter that can remove 100% of all particles greater than 0.5 μm, but such a filter design will not be practical if the pressure required to push fluid through the filter is at an unreasonable high level or if the filter needs to be replaced at an impractically short interval. In a more specific example, even if an oil filter on your car kept the engine perfectly clean, if that filter required most of the engine's power to push the fluid through the filter and needed to be changed every time the vehicle with refueled, it would be commercially and practically unfeasible.

To provide an illustration of how a filter medium described herein improves efficiency performance, it is helpful to first describe how filter media collect contaminants and how that collection affects pressure across the filter media as the fluid flows through it.

A filter medium includes spaces between the components of the filter medium, and it may also collect contaminants on the upper-most surface of the filter medium. As the contaminant collects in the spaces in or on top the filter medium, the pressure required to push fluid across the filter medium increases because the spaces for the fluid to flow through become smaller and less numerous. The end of life of a working liquid filter medium (especially in hydraulics) is usually defined by a maximum pressure produced while a certain flow of liquid is passing through the filter medium. So, as a contaminant is collected, the pressure drop increases, and the porosity—the ratio of the volume of spaces in a porous medium to the total volume—of the filter medium decreases.

As the porosity decreases, it becomes the dominant contributor to pressure drop and, therefore, the main parameter that defines end of life for a liquid filter. To achieve longer life from a hydraulic filter media, it is, therefore, desirable to manage how the contaminant is being collected by the filter media. Distributing the locations where the contaminant is collected (including, for example, by making more spaces available through the depth of the media), as opposed to collecting the contaminant in a single location (for example, on the surface of the media), results in the porosity of the filter media being maintained for longer, reducing the pressure required to pass liquid through the media, and extending the life of the filter media. Filter media designs that distribute the locations where contaminant is collected across the depth of the media dare called depth loading filter media.

Higher porosity throughout the depth of the filter media allows more space for contaminant to be collected during use of the filter media. The hypothetically longest-lasting filter media is one with 100% porosity. But this advantage is only hypothetical, because some part of the volume must be occupied by something to capture and hold contaminant. Thus, it is desirable to have a porosity that is as high as possible while still providing the filter material with the properties required to achieve the desired efficiency and strength.

In liquid hydraulic filtration, the main filtration mechanism is size exclusion. During size exclusion, a contaminant is captured by the filter media when it is trapped in a pore having dimensions smaller than the dimensions of the contaminant. A wide distribution of pores sizes, distributed throughout the depth of the filter media allows for the distribution of the contaminant within the thickness of the filter media. The pores may be randomly spaced, or they may form a gradient or other pattern structure. Regardless of the pattern (or lack thereof), the desired effect is to distribute a contaminant as much as possible through the depth of the filter media.

Filter media designed for collection by size exclusion have been shown to work well under steady flow conditions in lab testing. But in most hydraulic flow applications, the flow rate through the filter media is variable, and may have cyclic flow patterns. During these variable flow conditions, changing forces, more commonly called dynamic forces, are applied on both the filter media structure and the contaminant captured by the filter media. These dynamic forces change the way a filter media captures contaminant, resulting in reduced overall efficiency.

Without wishing to be bound by theory, it is believed that the reduction in overall efficiency observed during variable flow conditions results from contaminants that had previously been trapped in a pore having dimensions smaller than the dimensions of the contaminant being re-released when a different force is applied to the filter media.

As a result, filters rated for a certain efficiency performance under steady flow conditions often under-perform during variable (for example, cyclic) flow conditions, and these filters allow more contaminant to pass through the filter into the downstream output. Increased contaminants downstream of the filter may cause increased wear in the hydraulic system and/or shorter life of critical hydraulic components.

Thus, it is desirable for the users of these hydraulic systems to have hydraulic oil filtration media designed to perform reliably under variable flow conditions.

One means of increasing the efficiency of the media under variable flow conditions is to increase the thickness of the filter media. By providing increased thickness (or depth), more opportunities to catch a particular contaminant are provided. However, if the filter media becomes too thick, it becomes difficult to pack it into a confined space, such as a traditional pleated configuration. Moreover, even though the probability of catching a particular contaminant is improved by increasing thickness, contaminants may still pass through the media.

Another means of increasing the efficiency of the media under variable flow conditions is to decrease the pore sizes of the filter media. As noted above, however, decreasing the pore size results in the filter media reaching capacity sooner. Moreover, smaller pore sizes may result in a greater pressure being required to pass liquid through the media before contaminant is captured, and will definitely result in a greater pressure being required to pass liquid through the media after a certain volume of contaminant is captured.

The filter media described herein seek to overcome these limitations by providing a multi-layer structure. While individually each layer would have poor performance, the combination of the layers provides improved performance under variable flow conditions (including, for example, cyclic flow conditions).

Filter Medium

In one aspect, this disclosure describes a filter medium that includes a support layer, a continuous fine fiber layer, and an efficiency layer. In some embodiments, the continuous fine fiber layer is located between the efficiency layer and the support layer, and the efficiency layer is located on the upstream side of the filter medium. In some embodiments, the continuous fine fiber layer acts as a surface loading layer. In some embodiments, the efficiency layer acts as a depth-loading layer.

As noted above, a depth-loading layer alone has poor efficiency under variable flow conditions because of its low solidity and wide pore size distribution. The continuous fine fiber layer alone would have a very short life under variable flow conditions if it acted as a surface loading layer because the pressure required to pass liquid through the filter medium would begin to increase almost immediate upon contaminant being collected. And the support layer alone would be inappropriate for use as a filter medium under variable flow conditions because its efficiency is practically non-existent.

In combination, however, and with features selected as further described herein, the support layer, the continuous fine fiber layer, and the efficiency layer provide a filter medium that minimizes the adverse effects of variable flow conditions on filter medium efficiency and does not exhibit a commercially or practically infeasible increase in pressure drop.

For example, as further described herein, the continuous fine fiber layer, acting as a surface loading layer, prevents particles from passing through the filter medium. Additionally, because the continuous fine fiber layer is very thin, it does not increase pressure drop as much as a thicker medium would. Moreover, by combining the continuous fine fiber layer with an appropriate low solidity layer (that is, an efficiency layer acting as a depth loading layer), life of the filter medium may be prolonged.

Additional Optional Configurations of the Filter Medium

Figure 1B:
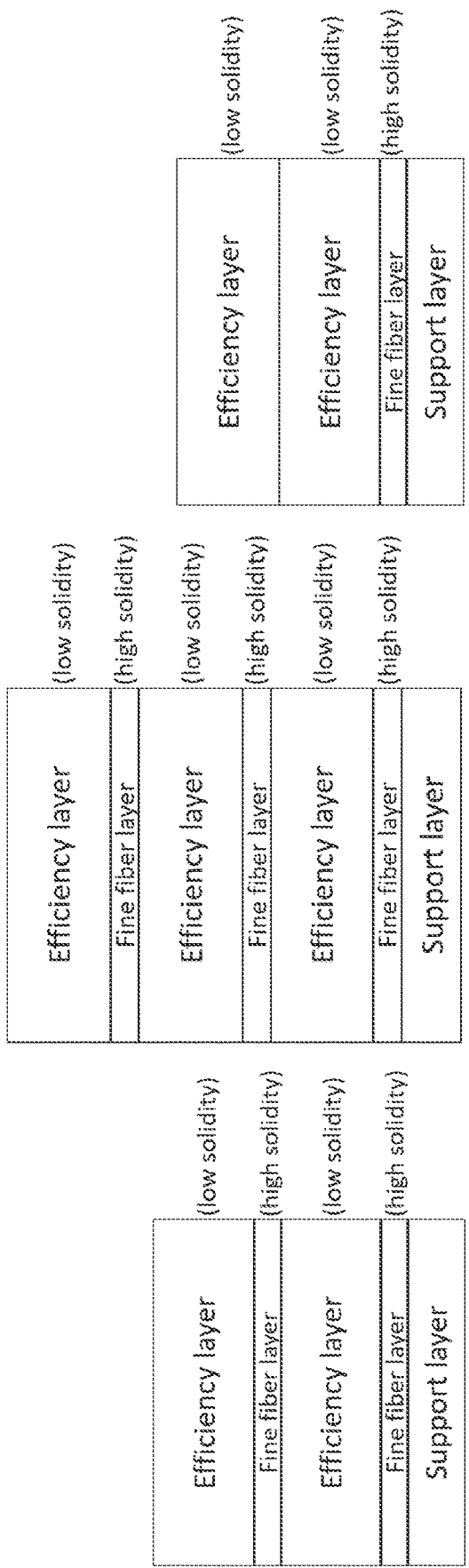

As noted above, the filter medium includes a continuous fine fiber layer and an efficiency layer. In some embodiments, however, the filter medium may include multiple continuous fine fiber layers and multiple efficiency layers. For example, in one embodiment, the filter medium might include a first efficiency layer located on the upstream side of the filter medium, a first continuous fine fiber layer located on the downstream side of the first efficiency layer, a second efficiency layer located on the downstream side of the first continuous fine fiber layer, and a second fine fiber layer located on the downstream side of the second efficiency layer. The support layer will typically be located on the downstream side of the most downstream continuous fine fiber layer. (See FIG. 1B, left panel.)

For example, in another embodiment, the filter medium includes a first efficiency layer located on the upstream side of the filter medium, a first continuous fine fiber layer located on the downstream side of the first efficiency layer, a second efficiency layer located on the downstream side of the first continuous fine fiber layer, a second fine fiber layer located on the downstream side of the second efficiency layer, a third efficiency layer located on the downstream side of the first continuous fine fiber layer, and a third continuous fine fiber layer fine fiber layer located on the downstream side of the third efficiency layer. The support layer will typically be located on the downstream side of the most downstream continuous fine fiber layer. (See FIG. 1B, middle panel.)

In some embodiments, the filter media may include more than one efficiency layer located on the upstream side of the filter medium and a continuous fine fiber layer located on the downstream side of the efficiency layers. (See FIG. 1B, right panel.) An additional efficiency layer may be used to, for example, increase the filter media's capacity (and thus, life) or to improve pressure drop. Such an additional efficiency layer may also be referred to as a loading layer. An exemplary embodiment of a filter media including a support layer, a continuous fine fiber layer, an efficiency layer, and a second efficiency layer (or loading layer) is described and characterized in Example 6.

Features of the Filter Medium

In some embodiments, the filter medium described herein achieves increased efficiency compared to media without the continuous fine fiber layer or layers without compromising pressure drop—that is, pressure drop of the filter medium described herein is within 150%, within 100%, within 50%, within 20%, within 15%, or within 10% of the pressure drop of the filter medium without the continuous fine fiber layer or layers.

In some embodiments, the filter medium described herein achieves increased efficiency compared to media without the continuous fine fiber layer or layers and without the support layer without compromising pressure drop—that is, pressure drop of the filter medium described herein is within 150%, within 100%, within 50%, within 20%, within 15%, or within 10% of the pressure drop of the filter medium without the continuous fine fiber layer or layers and without the support layer.

For example, in an exemplary embodiment, the pressure drop of the filter medium is within a range of 50% to 150% of the pressure drop observed by the efficiency layer or layers alone (that is, the pressure drop of the filter medium without the continuous fine fiber layer or layers and without the support layer).

In some embodiments, the filter medium described herein achieves equivalent efficiency under cyclic flow conditions compared to media without the continuous fine fiber layer under steady flow conditions. Preferably, this efficiency is achieved without a significant pressure drop penalty. For example, the pressure drop is within 150%, within 100%, within 50%, within 20%, within 15%, or within 10% of the pressure drop of the filter medium without the continuous fine fiber layer or layers and without the support layer.

In some embodiments, the filter medium described herein exhibits an over-all $\beta_{10\,\mu m}$ of at least 5, at least 7, or at least 10 under cyclic flow conditions. The filter medium may further exhibit an over-all $\beta_{10\,\mu m}$ of up to 50, up to 100, up to 200, up to 300, up to 500, up to 1000, up to 1500, or up to 2000. For example, the over-all $\beta_{10\,\mu m}$ may be in a range of 5 to 2000, in a range of 5 to 200, or in a range of 5 to 100.

Cyclic flow conditions may be evaluated using ISO/CD 23369 Edition 1 except when testing flat sheet performance and the test is run in singlepass mode, the test should be run at 25° C. Flow velocity through the media may be cycled between 5 mm/sec and 1.25 mm/sec, in a 10 second cycle. ISO 12103-1, Medium Test Dust, may be useful as a particle. An upstream particle concentration of 10 mg/L may be used. Continuous particle concentration measurements may be collected every 6 seconds. It may be useful to control fluid conductivity to a range of 1000 picosiemens/meter (pS/m) to 1500 pS/m.

In some embodiments, one or more of the fibers of the filter media may be selected or treated to alter the electrostatic charge of the filter media. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

Average Maximum Pore Size and Average Mean Flow Pore Size of a Support Layer and a Continuous Fine Fiber Layer Composite As described above, the filter media includes a support layer and a continuous fine fiber layer. In some embodiments, the continuous fine fiber layer may include multiple continuous fine fiber layers. These support layer and a continuous fine fiber layer or layers may form a composite. The composite includes at least one continuous fine fiber layer.

In some embodiments, the filter media has a composite average maximum pore size of up to 20 µm, preferably up to 15 µm, and more preferably up to 14 µm. In some embodiments, the composite maximum pore size of the filter media is at least 0.1 µm. As used herein, "composite average maximum pore size" refers to the average maximum pore size of a composite that includes the support layer and any continuous fine fiber layers present in a layer adjacent to the support layer.

In some embodiments, the filter media has a composite average mean flow pore size or P50 of up to 11 µm, preferably up to 9 µm, and more preferably up to 6 µm. In some embodiments, the composite average mean flow pore size of the filter media or P50 is at least 0.1 µm. As used herein, "composite average mean flow pore size" refers to the average mean flow pore size of a composite that includes the support layer and any continuous fine fiber layers present in a layer adjacent to the support layer.

In some embodiments, the composite average maximum pore size and/or composite average mean flow pore size are preferably determined using capillary flow porometry.

Without wishing to be bound by theory, it is believed that composite average maximum pore size and composite average mean flow pore size depend on the fine fiber diameters, relative amounts of small and large fine fibers, and composite morphology (such as layered or commingled), among other factors.

In some embodiments, the composite may have a mean flow pore size similar to the mean flow pore size of the efficiency layer. For example, in some embodiments, the mean flow pore size (P50) of the composite may be within 1%, 2%, 3%, 5%, 10%, 20%, 30%, 50%, 100%, or 200% of the mean flow pore size (P50) of the adjacent efficiency layer.

As described in Example 5, the composite average maximum pore size of the filter media may correlate with the ability of the filter media to withstand at least 20 psi pressure drop during liquid filtration, indicating better filter performance than a filter media that cannot withstand the same conditions.

Although the composite average maximum pore size of the filter media may correlate with the ability of the filter media to withstand at least 20 psi pressure drop during liquid filtration, composite average maximum pore size may sometimes provide inconsistent values if the media includes a defect or an unusually large maximum pore. Thus, to better understand a composite's range of pore sizes and distribution of pore sizes, additional values were also examined, as described below.

P95/P50 Ratio of a Composite Including the Support Layer and the Continuous Fine Fiber Layer In some embodiments, a composite formed from the support layer and the continuous fine fiber layer has a P95/P50 ratio of up to 1.8, up to 1.9, or up to 2.

Although the pore sizes of the fine fiber layer control the majority of the values of the P95/P50 ratio of the composite, the interaction between the support layer and the continuous fine fiber layer also affects performance. Without wishing to be bound by theory, these interactions are believed to make the composite pore size measurements more informative than pore size measurements of the fine fiber layer alone.

The value of P50 reflects the diameter of a pore at which 50% of the fluid is flowing through pores of that diameter or less. The value of P95 reflects the diameter of a pore at which 95% of the fluid is flowing through pores of that diameter or less, a larger ratio of P95/P50, generally reflects a larger range of pore sizes with relatively larger pores being present.

Without wishing to be bound by theory, it is believed that a composite having a P95/P50 ratio of greater than 2 would not provide sufficient efficiency under cyclic flow. Although a P95/P50 ratio less than 2 provides an increase in pressure drop (due to increasing solidity), because the continuous fine fiber layer is very thin (e.g., less than 50 µm), the corresponding pressure drop may be maintained within acceptable limits.

In some embodiments, the composite has a P95/P50 ratio of at least 1.

P95/P50 Ratio of the Efficiency Layer Adjacent to the Fine Fiber Layer

In some embodiments, the efficiency layer has a P95/P50 ratio of at least 1.8, at least 1.9, or at least 2.

Without wishing to be bound by theory, it is believed that a composite having a P95/P50 ratio of less than 1.8 would exhibit a solidity in a range that would be expected to result in undesirably high pressure drop. In addition, because solidity increases as the P95/P50 decreases, the number of particles that may be captured by the composite also decreases.

In some embodiments, the efficiency layer has a P95/P50 ratio of up to 2.5, up to 3, up to 4, up to 5, up to 10, up to 15, or up to 20.

Without wishing to be bound by theory, a P95/P50 ratio greater than 20 is expected to result in a media layer having larger pore sizes and, thus, too few pores of the size needed to capture the desired particle sizes (for example, particle sizes in a range of 1 µm to 100 µm).

For example, the efficiency layer has a P95/P50 ratio in a range of 1.8 to 20, in a range of 2 to 10, or in a range of 2 to 5.

In some embodiments, it is preferred that the maximum of the range including the P95/P50 ratio of the composite is equal to or below the minimum of the range including the P95/P50 ratio of the efficiency layer. In some embodiments, it is preferred that the P95/P50 ratio of the composite is equal to or below the P95/P50 ratio of the efficiency layer.

For example, in an exemplary embodiment, the P95/P50 ratio of the composite is up to 1.8 and the P95/P50 ratio of the efficiency layer is at least 1.8. In another exemplary embodiment, the P95/P50 ratio of the composite is up to 1.9 and the P95/P50 ratio of the efficiency layer is at least 1.9. In yet another exemplary embodiment, the P95/P50 ratio of the composite is up to 2 and the P95/P50 ratio of the efficiency layer is at least 2.

In some embodiments, it is preferred that the maximum of the P95/P50 ratio of the composite below the minimum of the P95/P50 ratio of the efficiency layer. For example, in an exemplary embodiment, the P95/P50 ratio of the composite is up to 1.8 and the P95/P50 ratio of the efficiency layer is at least 2. In another exemplary embodiment, the P95/P50 ratio of the composite is up to 1.9 and the P95/P50 ratio of the efficiency layer is at least 2.

For example, in some embodiments, the efficiency layer adjacent to the fine fiber layer may have a P95/P50 ratio that is up to 1.5 times, up to 2 times, up to 3 times, up to 4 times, up to 5 times, up to 6 times, up to 7 times, up to 8 times, up to 9 times, or up to 10 times larger than the P95/P50 ratio of the composite.

Overlapping Pore Size Distributions

In some embodiments, the pore size distributions of the efficiency layer and of the composite (including the support layer and the fine fiber layer) overlap. If the filter medium includes more than one efficiency layer, then the pore size distributions of the efficiency layer adjacent to the fine fiber layer and of the composite (including the support layer and the fine fiber layer) overlap. Without wishing to be bound by theory, this overlap in pore size distributions is believed to increase the life of filter.

When the pore size distributions of the efficiency layer and of the composite do not overlap because the pore sizes of the composite are smaller than the pore sizes of the efficiency layer, the fine fiber layer captures particles of sizes that are not captured by the efficiency layer. This capture, in turn, results in an increase in pressure drop and, consequently, shorter media life.

If the pore sizes of the efficiency layer and of the composite do not overlap because the pore sizes of the composite are larger than the pore sizes of the efficiency layer, then the fine fiber layer would not be providing the desired increase in efficiency.

Similarly, if the pore sizes of the efficiency layer and of the composite overlapped across their entire range, the fine fiber layer is likely to not be providing the desired increase in efficiency.

Thus, in some embodiments the P95 of the composite preferably falls within a range provided by the values of P5 and P50 of the efficiency layer.

As shown in Example 6, when the P95 of the composite falls below a range provided by the values of P5 and P50 of the efficiency layer adjacent to the fine fiber layer, the resulting pressure drop of the filter medium is high (23.2 kPa), more than 150% the pressure drop of a filter medium not including the fine fiber layer and support layer.

Without wishing to be bound by theory, it is believed that using a composite having a P95 that falls within a range provided by the values of P5 and P50 of an adjacent efficiency layer allows for the resulting filter media to take advantage of both the depth loading characteristics of the efficiency layer and the surface loading characteristics of the continuous fine fiber layer of the composite. The loss of efficiency during dynamic flow conditions that is observed when using an efficiency layer alone is not observed with the claimed media because of the higher solidity and lower pore sizes of the continuous fine fiber layer. But the high pressure drop that would be seen if the continuous fine fiber layer alone was used to achieve the desired efficiency is also avoided.

Filter Element

In some embodiments, the filter medium disclosed herein may be included in a filter element that includes a wire support. The wire support may be located downstream of the support layer.

In some embodiments, the filter medium, including, for example, a filter medium encompassed in a filter element, is pleated.

Exemplary filter elements include flat-panel filters, cartridge filters, or other filtration components. Examples of such filter elements are described in U.S. Pat. Nos. 6,746,517; 6,673,136; 6,800,117; 6,875,256; 6,716,274; and 7,316,723.

Methods of Using

In some embodiments, the filter media of the present disclosure may be used to filter a fluid including, for example a fluid stream. Fluids include air, gas, and liquids. In some embodiments, the filter media of the present disclosure may be used to remove particulate from a fluid stream.

In some embodiments, the filter media of the present disclosure may be used to filter air. In some embodiments, including when the filter media of the present disclosure is used to filter air, the filter media may be located upstream of other layers in the filter element.

In some embodiments, the filter media of the present disclosure may be used to filter a gas. Gaseous streams can include, for example, air and/or industrial waste gasses. In an exemplary embodiment, the filter media of the present disclosure may be used to filter blow-by gases from the crankcase of diesel engines, which carry substantial amounts of entrained oils therein, as aerosol. In a further exemplary embodiment, the filter media of the present disclosure may be used in a gas turbine.

In some embodiments, the filter media of the present disclosure may be used to filter a liquid. In some embodiments, including when the filter media of the present disclosure is used to filter a liquid, the filter media may be located downstream of other layers in the filter element. Exemplary liquids may include, for example, an aqueous liquid, hydraulic fluid, oil, fuel, a lubricant, etc. Aqueous liquids may include natural and man-made streams such as effluents, cooling water, process water, etc.

In some embodiments, the filter media of the present disclosure may be particularly well suited for use in an application in which flow rate varies including, for example, in a hydraulic application. Variations in flow rate including, for example, cyclic flow conditions, have an adverse effect of filter media performance and, in particular, on filter media efficiency because variations in flow rate result in a particle having multiple opportunities to pass through a media opening.

At the time of the invention, the effect of varying flow rates on filter media performance was typically minimized by increasing efficiency of the filter media, but increasing the efficiency of the filter media also resulted in a corresponding increase in pressure drop—that is, an increase in the pressure necessary to force fluid through the filter media. Such an increase in pressure drop results in more opportunities for the filter to be bypassed (for example, via a bypass valve), increases energy consumption, and shortens filter life. In contrast, the filter media of the present disclosure can achieve increased efficiency under cyclic flow conditions without compromising pressure drop.

Continuous Fine Fiber Layer

The continuous fine fiber layer includes a continuous fine fiber that has a diameter of up to 10 micrometers ($\mu m$). In some embodiments, the continuous fine fiber layer includes a single layer. In some embodiments, the continuous fine fiber layer includes multiple continuous fine fiber layers. In some embodiments when the continuous fine fiber layer includes multiple layers, the multiple layers may include different diameters of fine fibers. In some embodiments when the continuous fine fiber layer includes multiple layers, one or more layers may include continuous fine fibers having different diameters within the layer. In some embodiments, when the continuous fine fiber layer includes multiple layers, each layer may include different combinations of continuous fine fibers having different diameters.

In some embodiments, the continuous fine fiber layer acts as a surface loading layer.

In some embodiments, the continuous fine fiber layer may include a fiber having a diameter of at least 0.05 $\mu m$, at least 0.1 $\mu m$, at least 0.2 $\mu m$, at least 0.5 $\mu m$, or at least 1 $\mu m$.

In some embodiments, the continuous fine fiber layer may include a fiber having a diameter of up to 1.5 $\mu m$, up to 2 $\mu m$, up to 3 $\mu m$, up to 4 $\mu m$, up to 5 $\mu m$, up to 6 $\mu m$, up to 7 $\mu m$, up to 8 $\mu m$, up to 9 $\mu m$, or up to 10 $\mu m$. For example, in an exemplary embodiment, the continuous fine fiber layer includes a fiber having a diameter in a range of 0.1 $\mu m$ to 5 $\mu m$, in a range of 0.5 $\mu m$ to 5 $\mu m$, in a range of 1 $\mu m$ to 5 $\mu m$, or in a range of 1 $\mu m$ to 2 $\mu m$. In some embodiments, including for example, when the continuous fine fiber has an elliptical shape, the continuous fine fiber may preferably include a fiber having a diameter in a range of 1 $\mu m$ to 5 $\mu m$. In some embodiments, including for example, when the continuous fine fiber does not include a mixture of fibers of different diameters, the continuous fine fiber may include a fiber having a diameter in a range of 0.2 $\mu m$ to 1.5 $\mu m$.

In some embodiments, the continuous fine fiber layer may include a fiber having an elliptical (including a circular) shape. For example, the fiber may have cross-sectional major axis (width):cross-sectional minor axis (height) of at least 2:1 (like, for example, fettucine) and up to 1:1 (like, for example, spaghetti).

In some embodiments, the continuous fine fiber layer may preferably include a fiber having a diameter in a range of 1 $\mu m$ to 5 $\mu m$ and a cross-sectional major axis (width):cross-sectional minor axis (height) of at least 1.5:1 and up to 1:1.

In some embodiments, the continuous fine fiber layer has a solidity of at least 10%, at least 11%, at least 12%, at least 13%, at least 14%, at least 15%, at least 20%, or at least 25%. In some embodiments, the continuous fine fiber layer has a solidity of up to 15%, up to 20%, up to 25%, up to 30%, up to 35%, or up to 40%. In an exemplary embodiment, the continuous fine fiber layer has a solidity in a range of 15% to 30%.

Solidity (c) of the continuous fine fiber layer may be calculated from the dimensionless fiber drag parameter, $F^*_{1.0}$, using the following equation: $F^*_{1.0}=4.3548e^{8.8822c}$. $F^*_{1.0}$ may be calculated from a modified Kirsch-Fuchs equation, as further described in the Examples.

Mixed Diameter Fine Fibers

In some embodiments, the continuous fine fiber layer may include a mixture of fibers of different diameters.

In some embodiments, the continuous fine fiber layer may include fibers of two different diameters. When the continuous fine fiber layer includes fibers of two different diameters, the ratio of the average diameter of the "small" fiber diameter fine fibers to the average diameter of the "large" fiber diameter fine fibers (small fine fiber diameter:large fine fiber diameter) may be at least 1:3 (that is, the average fiber diameter of the large fine fibers is 3 times the average fiber diameter of a small fine fiber).

In some embodiments, the ratio of the average diameter of the "small" fiber diameter fibers to the average diameter of the "large" fiber diameter fibers (small fiber diameter:layer fiber diameter) may be in a range of 1:3 to 1:6. For example, in an exemplary embodiment, the continuous fine fiber may include a first fine fiber having an average diameter in a range of 0.2 $\mu m$ to 0.3 $\mu m$ and a second fine fiber having an average diameter in a range of 0.9 $\mu m$ to 1.1 $\mu m$. In another example, the average diameter of a first fine fiber may be 0.25 $\mu m$ and the average diameter of a second fine fiber may be 1 $\mu m$. In yet another example, the average diameter of a first fine fiber may be 0.25 $\mu m$ and the average diameter of a second fine fiber may be 1.4 $\mu m$.

In embodiments wherein the continuous fine fiber layer includes a mixture of fibers of different diameters, the fibers of different diameters may be mixed or commingled together within a single strata of the continuous fine fiber layer.

In embodiments wherein the continuous fine fiber layer includes a mixture of fibers of different diameters, the fibers of different diameters may form different strata in the continuous fine fiber layer. When the fibers of different diameters form different strata in the continuous fine fiber layer, the larger fibers may be deposited on a support prior to the deposition of the smaller fibers, creating a gradient (including, for example, in pore size and solidity) within the continuous fine fiber layer. Additionally or alternatively, when the fibers of different diameters form different strata in the continuous fine fiber layer, larger and smaller fibers may be deposited to form multiple layers with different features. Exemplary embodiments of such a construction are shown in FIG. 2A and FIG. 2H-FIG. 2M. Further exemplary embodiments of continuous fine fiber layers that include a mixture of fibers of different diameters are provided in co-pending application entitled FILTER MEDIA LAYERS INCLUDING MIXED DIAMETER FINE FIBERS, International Patent Application No. PCT/US2020/054837, filed on even date herewith.

Figure 2A:
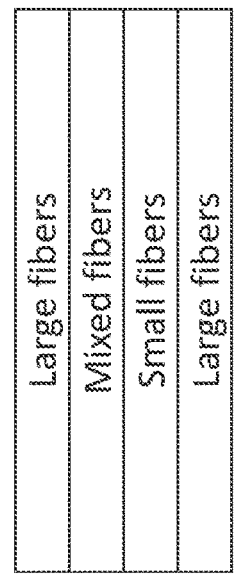
FIG. 2A shows a schematic of an exemplary embodiment of a continuous fine fiber layer of a filter medium described herein that includes a mixture of fibers of different diameters in different strata of the continuous fine fiber layer.
Figure 2B:
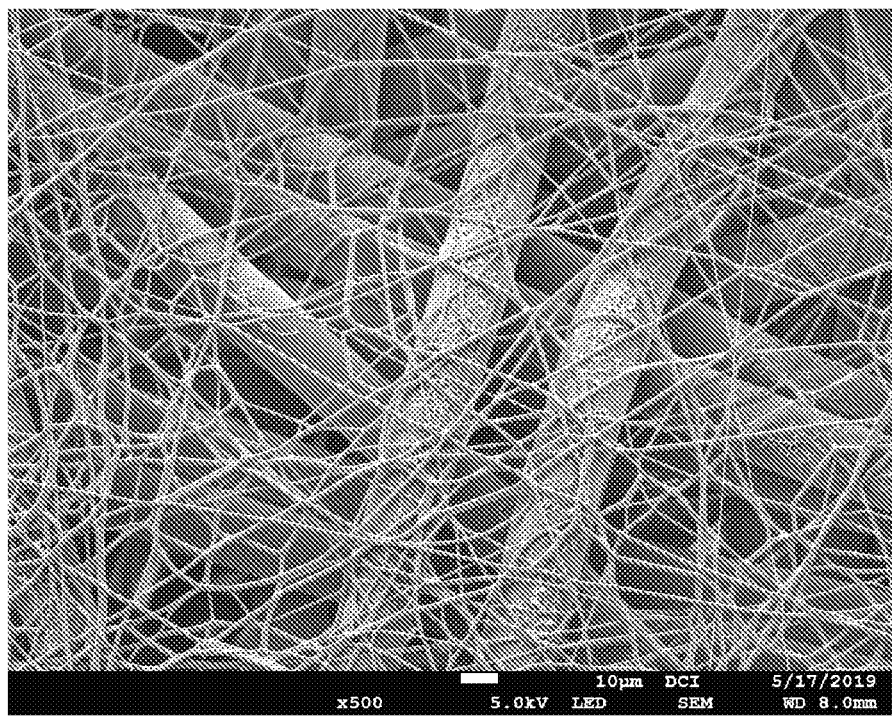
FIG. 2B shows exemplary images of a continuous fine fiber layer including a fine fiber layer deposited on a nylon scrim at 500× magnification (top panel) and 2000× magnification (bottom panel).
Figure 2B:
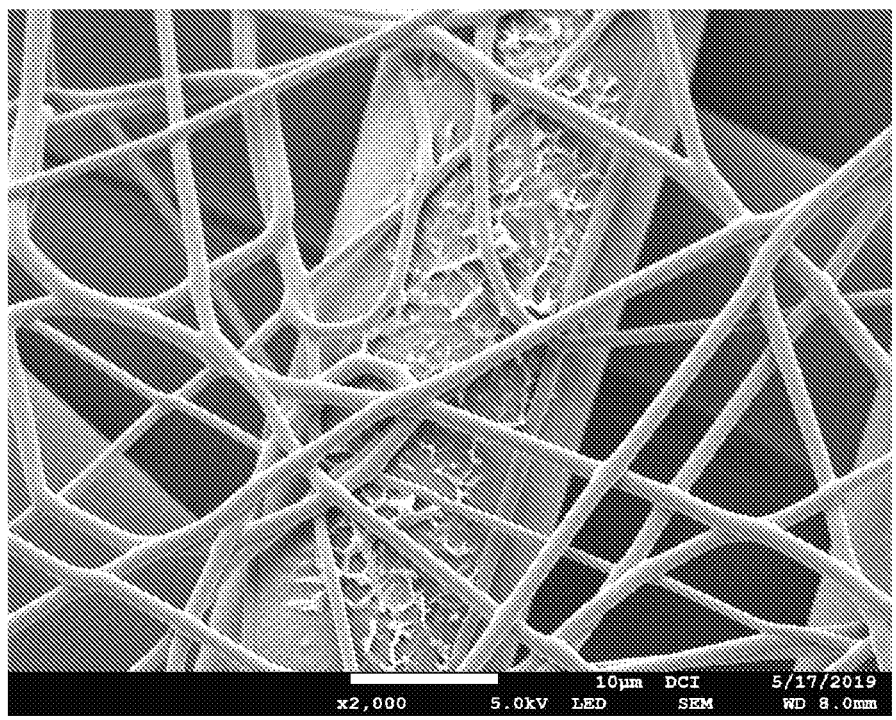

In some embodiments, the "large" fine fibers have an average diameter of at least 0.6 µm, more preferably greater than 0.6 µm. In some embodiments, the "large" fine fibers have an average diameter of at least 0.7 µm, at least 0.8 µm, or at least 0.9 µm. In some embodiments, the "large" fine fibers preferably have an average diameter of at least 1 µm or greater than 1 µm. The "large" fine fibers may have an average diameter of up to 1.1 µm, up to 1.2 µm, up to 1.3 µm, up to 1.4 µm, up to 1.5 µm, up to 2 µm, up to 3 µm, up to 4 µm, up to 5 µm, or up to 10 µm. Exemplary images of a continuous fine fiber layer that includes large fine fibers deposited on a support layer are shown in FIG. 2B.

In embodiments where a continuous fine fiber layer includes "large" fine fibers and "small" fine fibers, the large fine fibers may have an average diameter at least three times the average fiber diameter of the small fine fibers. In such embodiments, the small fine fibers may have an average diameter of up to 0.3 µm, up to 0.4 µm, up to 0.5 µm, or up to 0.6 µm. In some embodiments, the average fiber diameter of the small fine fibers of the continuous fine fiber layer may be at least 0.2 µm.

In some embodiments, the large fine fibers may have a diameter at least 0.2 µm, at least 0.3 µm, or at least 0.4 µm greater than a diameter of the small fine fibers. Even when, as noted above, the average fiber diameter of the large fine fibers is 3 times the average fiber diameter of a small fine fiber, either or both of the large fine fibers and the small fine fibers may include fibers of varying sizes that provide the average diameter. When the large fine fibers and the small fine fibers include, for example, a distribution of sizes, the diameter of the smallest-diameter large fine fibers may be at least at least 0.2 µm, at least 0.3 µm, or at least 0.4 µm greater than the diameter of the largest-diameter small fine fibers. In some such embodiments, the large fine fibers and the small fine fibers may form a bimodal distribution. In some embodiments, the large fine fibers may have a diameter of up to 1 µm, up to 2 µm, or up to 3 µm greater than the diameter of small fine fibers.

In some embodiments where a continuous fine fiber layer includes "large" fine fibers and "small" fine fibers, the continuous fine fiber layer may include at least 0.5% and up to 20% large fine fibers, more preferably, at least 1% and up to 10% large fine fibers, or, even more preferably, at least 5% and up to 7% large fine fibers. Additional ranges may also be useful including, for example, at least 3% and up to 9% large fine fibers, or at least 4% and up to 8% large fine fibers. Without wishing to be bound by theory, it is believed that optimizing the proportion of large fine fibers in the second layer of fine fibers provide support for the small fine fibers without disrupting the small fine fiber structure and resulting in a corresponding loss in efficiency.

In some embodiments the continuous fine fiber layer may include "large" fine fibers and "small" fine fibers and the continuous fine fiber layer may include multiple layers. In an exemplary embodiment, the continuous fine fiber layer includes a first layer of fine fibers comprising large fine fibers and a second layer of fine fibers comprising small fine fibers. In another exemplary embodiment, the continuous fine fiber layer includes comprises a first layer of fine fibers comprising large fine fibers and a second layer of fine fibers comprising large fine fibers and small fine fibers. In some embodiments, the first layer of fine fibers may be deposited on the support layer, and the second layer of fine fibers is deposited on the first layer of fine fibers.

Properties of the Continuous Fine Fiber Layer

In some embodiments, the continuous fine fiber layer preferably has a narrow distribution of pore sizes.

In some embodiments, the continuous fine fiber layer has a basis weight of at least 0.005 $g/m^2$, at least 0.01 $g/m^2$, at least 0.05 $g/m^2$, at least 0.1 $g/m^2$, at least 0.5 $g/m^2$, at least 1 $g/m^2$, at least 1.5 $g/m^2$, at least 2 $g/m^2$, or at least 2.5 $g/m^2$. In some embodiments, the continuous fine fiber layer has a basis weight of up to 1.5 $g/m^2$, up to 2 $g/m^2$, up to 2.5 $g/m^2$, up to 3 $g/m^2$, up to 3.5 $g/m^2$, up to 4 $g/m^2$, up to 4.5 $g/m^2$, up to 5 $g/m^2$, up to 10 $g/m^2$, up to 15 $g/m^2$, up to 20 $g/m^2$, up to 25 $g/m^2$, up to 50 $g/m^2$. In an exemplary embodiment, the continuous fine fiber layer has a basis weight of at least 0.1 $g/m^2$ and up to 20 $g/m^2$. In another exemplary embodiment, the continuous fine fiber layer has a basis weight of at least 0.1 $g/m^2$ and up to 1 $g/m^2$. In a further exemplary embodiment, the continuous fine fiber layer has a basis weight 0.43 $g/m^2$. When the fibers of different diameters are layered, the basis weight of the continuous fine fiber layer will be additive.

Basis weight of the fine fibers may be calculated from the mass of the fine fibers and the area of the scrim, according to the following equation: Total basis weight of the fine fiber layers=(mass of the fine fibers)/(area of scrim). The mass of the fine fibers may be calculated from the polymer and spinning conditions used to make the fiber, according to the following equation: mass of fine fibers=(% w/v polymer in solution)×(pump rate)×(spinning time).

In some embodiments, the continuous fine fiber layer has a thickness of at least the average diameter of the largest fine fiber of the continuous fine fiber layer. In some embodiments, the continuous fine fiber layer has a thickness of at least 0.2 µm, at least 0.3 µm, at least 0.4 µm, at least 0.5 µm, at least 0.6 µm, at least 0.7 µm, at least 0.8 µm, at least 0.9 µm, or at least 1 µm.

In some embodiments, the continuous fine fiber layer has a thickness that is the thickness of several fibers having the average diameter of largest fine fiber of the continuous fine fiber layer. For example, the continuous fine fiber layer may have a thickness of at least 2 µm, at least 3 µm, at least 4 µm, or at least 5 µm.

In some embodiments, the continuous fine fiber layer has a thickness of up to 5 µm, up to 10 µm, up to 30 µm, or up to 50 µm.

In some embodiments, the total thickness of the continuous fine fiber layer may be measured using scanning electron microscopy (SEM). For example, a sample including at least the continuous fine fiber layer and the support layer may be prepared for SEM by cross-sectioning the sample while frozen (for example, in liquid nitrogen). It may be useful to cross-section the sample while the sample is oriented with the support layer being cut before the fine fiber layer. It may further be useful to cross-section the sample while the sample is submerged in liquid nitrogen. An exemplary magnification that may be used is 1000×. It may be useful to use software to assist with the determination of sample thickness by allowing for outlining and re-shading of the fine fiber section in the SEM image. The re-shaded image may then be used to determine the maximal thickness of the fine fiber section in the image. In some embodiments, the total thickness of the fine fiber layer may be determining by averaging at least five maximal thicknesses from five separate images of the same sample.

Properties of the Fibers of the Continuous Fine Fiber Layer

The continuous fine fiber layer includes fine fibers. These fine fibers include a fiber-forming polymer material. In some embodiments, the fine fibers may be made by spinning the fiber-forming polymer material alone. In some embodiments, the fine fibers may be made by spinning the fiber-forming polymer material in combination with another substance.

Fine fiber technologies that contemplate polymeric materials mixed or blended with a variety of other substances is disclosed in Chung et al., U.S. Pat. No. 6,743,273; Chung et al., U.S. Pat. No. 6,924,028; Chung et al., U.S. Pat. No. 6,955,775; Chung et al., U.S. Pat. No. 7,070,640; Chung et al., U.S. Pat. No. 7,090,715; Chung et al., U.S. Patent Publication No. 2003/0106294; Barris et al., U.S. Pat. No. 6,800,117; and Gillingham et al., U.S. Pat. No. 6,673,136. Additionally, in Ferrer et al., U.S. Pat. No. 7,641,055, a water-insoluble, high-strength polymer material is made by mixing or blending a polysulfone polymer with a polyvinyl pyrrolidone polymer resulting in a single phase polymer alloy used in electrospinning fine fiber materials.

The continuous fine fiber may include fibers made of any suitable polymer. In some embodiments, polyamides may be useful as the polymer materials of the continuous fine fiber. One useful class of polyamide condensation polymers are nylon materials. The term "nylon" is a generic name for all long chain synthetic polyamides. Typically, nylon nomenclature includes a series of numbers such as in nylon-6,6 which indicates that the starting materials are a C6 diamine and a C6 diacid (the first digit indicating a C6 diamine and the second digit indicating a C6 dicarboxylic acid compound). Another nylon can be made by the polycondensation of ε-caprolactam in the presence of a small amount of water. This reaction forms a nylon-6 (made from a cyclic lactam, also known as ε-aminocaproic acid) that is a linear polyamide. Further, nylon copolymers are also contemplated. Exemplary nylon materials include nylon-6, nylon-6,6, nylon-6,10, mixtures or copolymers thereof.

Copolymers can be made by combining various diamine compounds, various diacid compounds and various cyclic lactam structures in a reaction mixture and then forming the nylon with randomly positioned monomeric materials in a polyamide structure. For example, a nylon-6, 6-6,10 material is a nylon manufactured from hexamethylene diamine and a $C_6$ and a Cio blend of diacids. A nylon-6-6,6-6,10 is a nylon manufactured by copolymerization of ε-aminocaproic acid, hexamethylene diamine and a blend of a $C_6$ and a $C_{10}$ diacid material. Herein, the term "copolymer" includes polymers made from two or more different monomers and include terpolymers, etc.

In some embodiments, polysulfones may be useful as the polymer materials of the continuous fine fiber. Exemplary polysulfones include polysulfone (PS), polyethersulfone (PES), and polyphenylsulfone (PPSF), and mixtures thereof.

In some embodiments, polymer materials including cellulose derivatives may be useful as the polymer materials of the continuous fine fiber. Examples of such polymers include ethyl cellulose, hydroxyl ethyl cellulose, cellulose acetate (including cellulose diacetate (DAC) and cellulose triacetate (TAC)), cellulose acetate butyrate, cellulose acetate propionate, cellulose acetate phthalate, and mixtures thereof.

In some embodiments, polymer materials of the continuous fine fiber may additionally or alternatively include polypropylene (PP), polyvinylpyrolidone (PVP), poly(4-vinyl pyridine) (P4VP), polyvinylidene fluoride (PVDF), or polytetrafluoroethene (PTFE, also known as Teflon), or mixtures thereof.

In some embodiments, polymer crosslinked with resinous aldehyde may be useful as the polymer materials of the continuous fine fiber, as described, for example, in International Publication No. WO 2013/043987 A1.

In some embodiments, the continuous fine fiber layer has a solidity greater than the solidity of one or more of the other layers in the filter medium (including, for example, the support layer or the efficiency layer or both). Although layers with high solidity typically lead to increased pressure drop, without wishing to be bound by theory, it is believed that providing a very thin continuous fine fiber layer helps to provide the increase in efficiency without the corresponding pressure drop that would typically be observed.

In some embodiments, the continuous fine fiber layer has a mean flow pore size similar to the mean flow pore size of the efficiency layer. In some embodiments, the continuous fine fiber layer has a narrower pore size distribution than the pore size distribution of the efficiency layer.

In some embodiments, the fine fibers may be made by combining a fiber-forming polymer material and at least two reactive additives that are capable of reacting with each other, for example, in a fiber-forming process or in a post-treatment process, as further described in International Patent Publication No. WO 2014/164130. The at least two reactive additives are optionally reactive with the fiber-forming polymer.

In some embodiments, the fine fibers may be made by combining a fiber-forming polymer material and a resinous aldehyde composition such as a melamine-formaldehyde resin.

In some embodiments, the resinous aldehyde composition includes a "polymer-reactive resinous aldehyde composition." A "polymer-reactive resinous aldehyde composition" includes alkoxy groups, as further described in U.S. Pat. No. 9,587,328. In the final fibers, at least a portion of the polymer-reactive resinous aldehyde composition will be involved in crosslinking the polymer and optionally can be involved in self-crosslinking. The fiber-forming polymer material also includes reactive groups. In this context, "reactive" means that the polymer includes one or more functional groups (for example, active hydrogen groups) capable of being crosslinked by the alkoxy groups of the polymer-reactive resinous aldehyde composition used in making the fine fibers.

In some embodiments, the resinous aldehyde composition includes a "polymer-non-reactive resinous aldehyde composition." The polymer-non-reactive resinous aldehyde composition includes reactive groups for self-crosslinking, as further described in U.S. Pat. No. 9,435,056. In the final fibers, at least portions of the polymer-non-reactive resinous aldehyde composition will be involved in self-crosslinking.

As used herein, "resin" or "resinous" refers to monomers, oligomers, and/or polymers, particularly of a nature that can migrate to the surface of a fine fiber during fiber formation. Herein, the term "resinous aldehyde composition" refers to the starting material as well as the material in the final fibers.

Methods of Forming the Continuous Fine Fiber Layer

In another aspect, this disclosure describes a method of making the continuous fine fiber layer.

The continuous fine fiber layer may be formed by any suitable method. For example, fine fibers of the disclosure may be made using a variety of techniques including electrostatic spinning, force spinning, wet spinning, dry spinning, melt spinning, extrusion spinning, direct spinning, gel spinning, by using an islands-in-the-sea method, etc.

In some embodiments, the components of the continuous fine fiber layer may be combined in solution or melt form. In certain embodiments, the fine fibers are electrospun from a solution or dispersion. For example, polymer materials and resinous aldehyde compositions are dispersible or soluble in at least one common solvent or solvent blend suitable for electrospinning.

In some embodiments, the continuous fine fiber layer may be formed on the support layer. In some embodiments, the continuous fine fiber layer may be formed on the efficiency layer.

In some embodiments when the fibers of different diameters may form different strata in the continuous fine fiber layer, larger fibers may be deposited on a support prior to the deposition of smaller fibers. Depending on the number of layers, additionally or alternatively, smaller fibers may be deposited on a support prior to the deposition of larger fibers.

In some embodiments when the fibers of different diameters may form the same strata in the continuous fine fiber layer, the fibers may be formed at the same time.

The fine fibers are collected on the support layer during, for example, electrostatic or melt spinning formation, and are often heat treated after fiber making. Preferably, the continuous fine fiber layer is disposed on a first surface of a layer of permeable coarse fibrous media (that is, a support layer) as a layer of fiber.

A suitable polymer and polymer concentration may be selected by a person having ordinary skill in the art given the size and other properties desired for the continuous fine fiber layer. For example, in some embodiments, the fibers will preferably be compatible with a fluid (for example, hydraulic fluid, fuel, lubricant) they are used to filter. A fiber is considered to be compatible with a fluid if it does not react with the fluid or any other components and additives in it and is insoluble in the fluid (such that the fine fiber structure is not chemically nor physically compromised upon mere contact with the fluid). In an exemplary embodiment, the polymer solution includes Solution 1, as described in the Examples. In an exemplary embodiment, the polymer solution includes Solution 2, as described in the Examples.

In some embodiments when fine fibers of different diameters are commingled, the fibers may be formed at the same time. For example, when two (or more) fibers are formed by electrospinning, the fibers may be formed by simultaneously co-spinning including, for example, by using two (or more) syringes, wherein each syringe includes a different polymer solution. Additionally or alternatively, each syringe may use a different syringe pump feed rate. In some embodiments, when the fine fibers of different diameters are commingled, the fibers may be formed alternating formation of the fibers but using very short (for example, up to 10 seconds, up to 20 seconds, or up to 30 seconds) pulses of each polymer solution.

In some embodiments when fibers of different diameters are layered, the fibers may be formed by alternating formation of the fibers. For example, when two (or more) fibers are formed by electrospinning, the fibers may be formed by alternatively spinning each fiber including, for example, by using two (or more) syringes, wherein each syringe includes a different polymer solution. Additionally or alternatively, each syringe may use a different syringe pump feed rate. In some embodiments, when the fibers of different diameters are layered, the fibers may be formed alternating formation of the fibers using pulses of each polymer solution of at least 30 seconds.

Any suitable method may be used to form a combination of layers of small and large fine fibers may be used. Exemplary methods that may be used to form layered fiber structures include one or more of the methods of Set A5, Set B, Set D5, Set E, Set I5, or Set J, of Table 1. Exemplary methods that may be used to form commingled fiber structures include one or more of the methods of Set A6, Set D, Set D6, Set I, or Set L, of Table 1. In some embodiments, a combination of layers that includes both layered fiber structures and commingled fiber structures may be formed. An exemplary method for forming such a structure is described in the Examples.

Efficiency Layer

The efficiency layer is a nonwoven filter media.

In some embodiments, the efficiency layer preferably acts as a depth-loading layer.

Exemplary nonwoven filter media include a wet-laid resin-free media, a wet-laid resin-bonded glass media, a meltblown media, a wet-laid cellulose media, and an air-laid glass media.

Exemplary wet-laid resin-free media include Synteq XP™ synthetic liquid media having a 10 micron efficiency rating (Duramax P164378, Donaldson Company, Inc., Minneapolis, MN) and Synteq XP™ synthetic liquid media having a 5 micron efficiency rating (Duramax P165332, Donaldson Company, Inc., Minneapolis, MN).

Exemplary wet-laid resin-bonded glass media include media in the Lydall LyPore family, for example LyPore XL Fluid Power 9104 (Lydall, Inc., Manchester, CT); media in the Ahlstrom microglass family, for example, MFPS1301 (Ahlstrom-Munksjö, Helsinki, Finland); and H&V hydraulic media, for example, Grade 1313 (Hollingsworth & Vose, East Walpole, MA).

Exemplary meltblown media include media in the Lydall LyPore MB family, for example, LyPore MB9031 (Lydall, Inc., Manchester, CT); and media in the H&V Meltblown family, grade PF23040 (Hollingsworth & Vose, East Walpole, MA).

Exemplary wetlaid cellulose media include media in the Ahlstrom fuel media family, for example, grade 100P-68 (Ahlstrom-Munksjö, Helsinki, Finland); and media in the H&V fuel media family, for example, grade FS6314 (Hollingsworth & Vose, East Walpole, MA).

Exemplary air laid media include media in the air filtration media from Johns Manville, for example, Evalith XLG-85 (Johns Manville, Denver, CO).

In some embodiments, the efficiency layer is preferably a wet-laid media.

In some embodiments, the efficiency layer includes a bi-component fiber and an efficiency fiber, wherein the efficiency fiber has a smaller diameter than the bi-component fiber.

In some embodiments, the efficiency layer may further include a microfibrillated cellulose.

In some embodiments, the efficiency layer has a solidity less than the solidity of the continuous fine fiber layer.

In some embodiments, the efficiency layer has a solidity of at least 3%, at least 4%, at least 5%, at least 6%, at least 7%, at least 8%, at least 9%, or at least 10%. In some embodiments, the efficiency layer has a solidity of up to 8%, up to 9%, up to 10%, up to 11%, up to 12%, up to 13%, up to 14% or up to 15%. In an exemplary embodiment, the efficiency layer has a solidity in a range of 7% to 12%. In some embodiments, the solidity of the efficiency layer is calculated using the following equation: $c=BW/\rho Z$, where BW is the basis weight, $\rho$ is the density of the fiber, and Z is the thickness of the media. If the efficiency layer includes different fibers, a mass ratio of the fibers may be used to determine density ($\rho$). Basis Weight may be measured according to TAPPI T410 om-08. Thickness may be measured according to TAPPI T411 om-15.

In some embodiments, the efficiency layer has a thickness of at least 0.05 mm, at least 0.1 mm, at least 0.2 mm, or at least 0.3 mm. In some embodiments, the efficiency layer has a thickness of up to 0.5 mm, up to 1 mm, up to 5 mm, up to 10 mm, up to 25 mm, or up to 50 mm. In some embodiments, the efficiency layer has a thickness in a range of 0.2 mm to 50 mm. In some embodiments, the efficiency layer has a thickness in a range of 0.2 mm to 1 mm. In some embodiments, the efficiency layer has a thickness in a range of 0.2 mm to 0.5 mm. Thickness may be measured according to TAPPI T411 om-15.

As noted above, in some embodiments, the continuous fine fiber layer has a mean flow pore size similar to than the mean flow pore size of the efficiency layer. Without wishing to be bound by theory, it is believed that if the mean flow pore size of the continuous fine fiber layer is much smaller than the mean flow pore size of the efficiency layer, a larger proportion of particles will be captured by the continuous fine fiber layer, decreasing filter life. On the other hand, if the mean flow pore size of the continuous fine fiber layer is much larger than the mean flow pore size of the efficiency layer, the efficiency layer must have a high solidity, and the filter will again have decreased life due to lower capacity.

It will be recognized that the mean flow pore size may be selected based on desired efficiency of the filter media and the size of particles being filtered.

In exemplary embodiments, the efficiency layer has a mean flow pore size of at least 1 µm, at least 5 µm, at least 10 µm, at least 15 µm, or at least 20 µm. In exemplary embodiments, the efficiency layer has a mean flow pore size of up to 5 µm, up to 10 µm, up to 15 µm, up to 20 µm, up to 25 µm, up to 30 µm, or up to 35 µm. In a particular exemplary embodiment, the efficiency layer fibers has a mean flow pore size range of 10 µm to 25 µm. In some embodiments, the mean flow pore size is preferably an average mean flow pore size determined using capillary flow porometry, as described in the Examples.

In some embodiments, the efficiency layer has a distribution of pore sizes of broader than the distribution of pore sizes of the adjacent continuous fine fiber layer.

As noted above, in some embodiments, the continuous fine fiber layer has a narrower pore size distribution than the pore size distribution of the adjacent efficiency layer.

In some embodiments, a resinous binder component is not necessary to obtain adequate strength for the efficiency layer. In some embodiments, a resinous binder component is not included in the efficiency layer.

Bi-Component Fiber

The bi-component fiber may include any suitable bi-component fiber or combination of bi-component fibers. The term "bi-component fiber" means a fiber having at least one thermoplastic binder polymer portion with a melting point and a second thermoplastic structural polymer portion with a different and higher melting point than the binder polymer portion. The physical configuration of these fibers is typically in a "side-by-side" or "sheath-core" structure. In side-by-side structures, the two thermoplastic polymer resins are typically extruded in a connected form in a side-by-side structure. The lower melting polymer acts as a binder and the higher melting polymer acts as a structural material. In the sheath-core structure, the core contains the higher, structural fiber melting point and the sheath contains the lower, bonding layer melting point. In some embodiments, the bi-component fiber preferably has a sheath-core structure.

The lower melting polymer of the bi-component fiber may have a melting point such that during the thermal forming process the fiber is heated to a temperature such that the lower melting polymer can fuse and bond the fibers into an intact web. Typically, the higher melting polymer of the bi-component fiber is a material that provides structural integrity to the web and does not melt at either thermal bonding temperatures or at use temperatures.

For example, in one embodiment the bi-component fiber may include a lower melting point polymer having a melting point of at least 100° C., at least 120° C., or at least 140° C. In some embodiments, the lower melting point polymer has a melting point in the range of 140° C. to 160° C. The bi-component fiber may further include a higher melting point polymer having a melting point of at least 235° C. or at least 240° C. In some embodiments, the lower melting point polymer has a melting point in the range of 240° C. to 260° C.

In another embodiment, the bi-component fiber may include a lower melting point polymer having a melting point of at least 50° C., at least 60° C., or at least 70° C. In some embodiments, the lower melting point polymer has a melting point in the range of 70° C. to 115° C. The bi-component fiber may further include a higher melting point polymer having a melting point of at least 200° C., at least 220° C. or at least 240° C. In some embodiments, the higher melting point polymer has a melting point in the range of 240° C. to 260° C.

Without wishing to be bound by theory, it is believed while the relatively low melting point weight polymer of the bi-component fiber melts under sheet, media, or filter forming conditions to bind the bi-component fiber, and other fibers present in the sheet, media, or filter making material into a mechanically stable sheet, media, or filter, the higher melting polymer of the bi-component fiber helps to maintain the low solidity structure of the efficiency layer during the thermal forming process because the higher melting polymer does not melt and, consequently, holds the other fibers in the web apart.

In some embodiments, the efficiency layer may include a first bi-component fiber and an optional second bi-component fiber. The inclusion of a second bi-component fiber having different features than the first bi-component fiber may improve the ease of forming the fibers into a sheet, layer, and/or filter medium.

For example, the first bi-component fiber may include a lower melting point polymer having a melting point of at least 100° C., at least 120° C., or at least 140° C. In some embodiments, the lower melting point polymer has a melting point in the range of 140° C. to 160° C. The first bi-component fiber may further include a higher melting point polymer having a melting point of at least 235° C. or at least 240° C. In some embodiments, the lower melting point polymer has a melting point in the range of 240° C. to 260° C. The second bi-component fiber may include a lower melting point polymer having a melting point of at least 50° C., at least 60° C., or at least 70° C. In some embodiments, the lower melting point polymer has a melting point in the range of 70° C. to 115° C. The second bi-component fiber may further include a higher melting point polymer having a melting point of at least 200° C., at least 220° C. or at least 240° C. In some embodiments, the higher melting point polymer has a melting point in the range of 240° C. to 260° C.

The bi-component fiber typically has a fiber diameter in a range of 5 μm to 50 μm, often in a range of 10 μm to 20 μm. The bi-component fiber typically has a length in a range of 0.1 millimeters (mm) to 20 mm, often have a length of about 0.2 mm to about 15 mm.

The bi-component fiber can be made from any suitable materials including, for example, a variety of thermoplastic materials including polyolefins (such as polyethylenes, polypropylenes, etc.); polyesters (such as polyethylene terephthalate, PET, poly-butylene terephthalate, PBT, etc.); nylons (such as nylon 6, nylon 6,6, nylon 6,12, etc.). Any thermoplastic that can have an appropriate melting point can be used in the bi-component fiber while higher melting polymers can be used in the higher melting portion of the fiber. The bi-component fiber can have, for example, a PET/PET or nylon 6/nylon 6,6 structure with PET/components of different melting points or nylon.

Exemplary bi-component fibers can include polyolefin/polyester (sheath/core) bi-component fibers whereby the polyolefin, e.g. polyethylene sheath, melts at a temperature lower than the core, for example, polyester or polyester/polyester or nylon/nylon materials. Typical thermoplastic polymers include polyolefins, e.g. polyethylene, polypropylene, polybutylene, and copolymers thereof; polytetrafluoroethylene; polyesters, for example, polyethylene terephthalate; vinyl acetates, for example, polyvinyl acetate, polyvinyl chloride acetate; polyvinyl butyral; acrylic resins, for example, polyacrylate, and poly methyl acrylate, poly methyl methacrylate; polyamides, for example, nylon; polyvinyl chloride, polyvinylidene chloride; polystyrene; polyvinyl alcohol; polyurethanes; cellulosic resins, for example, cellulosic nitrate, cellulosic acetate, cellulosic acetate butyrate, ethyl cellulose, etc.; copolymers of any of the above materials, for example, ethylene-vinyl acetate copolymers, ethylene-acrylic acid copolymers, styrene-butadiene block copolymers, Kraton rubbers and the like.

Efficiency Fiber

The efficiency fiber may be made of any suitable material. For example, the efficiency fiber may include glass, metal, silica, polymeric fibers, or other related fibers, or mixtures thereof. The efficiency fiber is typically a monocomponent fiber (that is, the individual fibers are typically made of a single composition). The efficiency fiber may have a a diameter in a range of 0.1 μm to 50 μm or, more preferably, in a range of 0.1 μm to 10 μm.

In some embodiments, the efficiency fiber includes a glass fiber.

In some embodiments, the efficiency fiber includes a short cut fine fiber of a material other than glass. In some embodiments, the efficiency fiber preferably does not include a glass fiber.

The short cut fine fiber may include, for example, a hydrophilic, a hydrophobic, an oleophilic, or an oleophobic fiber.

The short cut fine fiber may include one or more of a variety of materials including naturally occurring cotton, linen, wool, various cellulosic and proteinaceous natural fibers, or a synthetic fiber including, for example, rayon, acrylic, aramide, nylon, polyolefin, polyester fibers.

Microfibrillated Cellulose

In some embodiments, the efficiency layer may include a microfibrillated cellulose. For example, when the efficiency fiber is a short cut fine fiber, the efficiency layer may include a microfibrillated cellulose. In some embodiments, including when the short cut fine fiber includes a synthetic sample fiber, the efficiency layer may include a microfibrillated cellulose.

Microfibrillated cellulose (MFC) herein refers to that material as defined by G. Chinga-Carrasco in Nanoscale Research Letters, 2011, 6:417: "MFC materials may be composed of (1) nanofibrils, (2) fibrillar fines, (3) fibre fragments and (4) fibres. This implies that MFC is not necessarily synonymous with microfibrils, nanofibrils or any other cellulose nano-structure. However, properly produced MFC materials contain nano-structures as a main component, i.e. nanofibrils." The diameters (or, for the microfibrillated cellulose fibers, the "lateral dimensions") of these components are reproduced in Table 1 of that same document and are as follows: (1) nanofibrils (less than 0.1 μm); (2) fibrillar fines (less than 1 μm); (3) fibres or fibre fragments (10 μm to 50 μm).

Furthermore, the term "microfibrillated cellulose," as used herein, does not include dry ground cellulose (also referred to as micronized cellulose or microfine cellulose) and does not include microcrystalline cellulose obtained by removing amorphous portions by acid hydrolysis, as described in U.S. Pat. No. 5,554,287.

In certain embodiments, the microfibrillated cellulose fibers used do not have a "tree structure" (as described in U.S. Pat. Pub. No. 2012/0043038) wherein the described fibrillation process causes external and internal segments of the fiber surface to partially detach from the main fiber structure and become fibrils attached by one segment to the main fiber structure. Such fibrils provide more structure on the fiber to attach to other fibers in a paper structure, for example. For certain embodiments, this is not desirable.

Typically, useful microfibrillated cellulose fibers for the filtration media of the present disclosure have a lateral dimension (for example, width in 2 dimensions) of up to 4 μm. Typically, useful microfibrillated cellulose fibers have a lateral dimension of at least 700 nanometers (nm).

In certain embodiments, a majority (i.e., greater than 50%) of the microfibrillated cellulose fibers have a lateral dimension of up to 4 microns. In certain embodiments, a majority (that is, greater than 50 percent) of the microfibrillated cellulose fibers have a lateral dimension of 700 nm to 4 microns.

Support Layer

The support layer (also referred to herein as a substrate) of the filter medium may include any material suitable for providing support for the continuous fine fiber layer during manufacturing of the continuous fine fiber layer or during use of the continuous fine fiber layer or both. The support layer may include or be made of any suitable porous material.

Typically, fibrous materials will be used for the support layer. The fibers of the support layer may be made of natural fiber and/or synthetic fibers. Suitable fibers may include cellulosic fiber, glass fibers, metal fibers, or synthetic polymeric fibers, or a combination or mixture thereof.

In certain embodiments, the support layer includes fibers having an average diameter of at least 5 microns, or at least 10 microns. In some embodiments, the support layer can include fibers having an average diameter of up to 250 microns.

In some embodiments, the support layer is at least 0.005 inch (125 microns) thick, and often at least 0.01 inch (250 microns) thick. In some embodiments, the support layer is up to 0.03 inch (750 microns) thick.

In some embodiments, the support layer has a basis weight of at least 8 g/m², at least 10 g/m², at least 15 g/m², or at least 20 g/m². In some embodiments, the support layer has a basis weight of up to 70 g/m², up to 100 g/m², or up to 150 g/m². In an exemplary embodiment, the support layer has a basis weight in a range of 8 g/m² to 150 g/m². In another exemplary embodiment, the support layer has a basis weight in a range of 15 g/m² to 100 g/m². Basis Weight may be measured according to TAPPI T410 om-08.

In some embodiments, the support layer has a solidity of at least 5%, at least 10%, at least 20%, at least 25%, at least 30%, or at least 40%. In some embodiments, the support layer has a solidity of up to 10%, up to 20%, up to 25%, up to 30%, up to 40%, or up to 50%. In an exemplary embodiment, the support layer has a solidity in a range of 10% to 40%. In another exemplary embodiment, the support layer has a solidity in a range of 20% to 30%. In some embodiments, the solidity of the support layer is calculated using the following equation: $c=BW/\rho Z$, where BW is the basis weight, p is the density of the fiber, and Z is the thickness of the media. If the efficiency layer includes different fibers, a mass ratio of the fibers may be used to determine density ($\rho$). Basis Weight may be measured according to TAPPI T410 om-08. Thickness may be measured according to TAPPI T411 om-15.

In some embodiments, the support layer has a mean flow pore size of at least 5 µm, at least 10 µm, at least 15 µm, at least 20 µm, or at least 25 µm. In some embodiments, the support layer has a mean flow pore size of up to 10 µm, up to 15 µm, up to 20 µm, up to 25 µm, up to 30 µm, up to 35 µm, up to 40 µm, up to 50 µm, up to 60 µm, up to 70 µm, up to 80 µm, or up to 90 µm. In an exemplary embodiment, the support layer has a mean flow pore size in a range of 10 µm to 25 µm. In some embodiments, the mean flow pore size is preferably an average mean flow pore size determined using capillary flow porometry.

In some embodiments, the support layer has a maximum pore size of up to 10 µm, up to 15 µm, up to 20 µm, up to 25 µm, up to 30 µm, up to 35 µm, up to 40 µm, up to 50 µm, up to 60 µm, up to 70 µm, up to 80 µm, up to 90 µm, up to 100 µm, or up to 150 µm. In an exemplary embodiment, the support layer has a maximum pore size of up to 90 µm.

In some embodiments, the maximum pore size of the support layer (for example, a nylon scrim) may be determined according to capillary flow porometry.

In some embodiments, the support layer preferably includes a consistent media structure—that is, the features of the media (including, for example, the pore size, solidity, basis weight, or thickness, or a combination of those features, or each of these features of the media) are consistent across the length and width of the media. For example, in an exemplary embodiment, the mean flow pore size does not vary by more than 30%, more preferably 25%, and even more preferably 15% across the length and width of the media Without wishing to be bound by theory, it is believed that the interplay between the fiber diameter of the fine fiber of the continuous fine fiber layer, the thickness of the continuous fine fiber layer or layers, and the maximum pore size of the support layer is critical to achieving a structurally sound and efficient media. For example, merely using a higher basis weight (for example, greater than 60 g/m²) support layer does not result in a structurally sound media because, if the maximum pore sizes of the support layer are above a certain size (for example, 90 µm), if the fine fiber diameters are below a certain size, and/or if the fine fiber thickness is small, the continuous fine fiber layer will be structurally compromised during filtration at a sufficiently high pressure drop. For example, when smaller fine fibers (for example, having an average diameter of up to 500 nm) were used for a continuous fine fiber layer on a support layer having a maximum pore size of 88 µm, increasing the basis weight of the continuous fine fiber layer was found to require an unsustainably high pressure to move fluid through the media; in contrast, decreasing the basis weight of the continuous fine fiber layer caused the layer to become structurally compromised during filtration. Although increasing the fiber size of at least one of the fibers in the continuous fine fiber layer (for example, to an average diameter of at least 600 nm, more preferably, at least 900 nm) deposited on a support layer having a maximum pore size of 88 µm decreased the efficiency of the media, increasing the fiber size also decreased pressure drop and resulted in a structurally sound media that does not become structurally compromised during use.

The support layer may be formed of any suitable material. Examples of suitable material for the support layer include spunbond, wetlaid, carded, or melt-blown nonwoven materials, or combinations thereof including, for example, a spunbond-meltblown-spunbond. Fibers can be in the form of wovens or nonwovens. Examples of synthetic nonwovens include polyester nonwovens, nylon nonwovens, polyolefin (for example, polypropylene) nonwovens, polycarbonate nonwovens, or blended or multicomponent nonwovens thereof. Sheet-like support layers (for example, cellulosic, synthetic, and/or glass or combination webs) are typical examples of filter support layers. Other examples of suitable support layers include polyester or bicomponent polyester fibers or polypropylene/polyethylene terephthalate, or polyethylene/polyethylene terephthalate bicomponent fibers in a spunbond.

In some embodiments, the support layer may preferably include polymer fibers. The polymer or polymers of the polymer fiber may be selected for its adhesion to the polymer of the continuous fine fiber layer. In some embodiments, the polymer fibers may include nylon fiber or polyester fibers. For example, if the continuous fine fiber layer includes a nylon fine fiber, the support layer may preferably include nylon.

In some embodiments, the support layer may preferably include spunbond fibers. Spunbond support layers, while exhibiting large variances in pore sizes are otherwise cheap and robust layers, which may make them especially suitable for use as a support layer in a filter media.

In some embodiments, the support layer is a thin media (for example, less than 0.5 mm), that exhibits high permeability; high tensile strength; and small, uniform pore sizes.

In an exemplary embodiment, the support layer includes CEREX 23200 (Cerex Advanced Fabrics, Inc., Cantoment, FL). CEREX 23200 includes nylon 6,6, has a thickness of 8.4 mils (0.21 mm), a basis weight of 67.8 g/m², a solidity of 28%, and a permeability per solidity of 615.1.

Using capillary flow porometry, as described in the Examples, CEREX 23200 was found to have an average maximum pore size of 66.4 µm±21.9 µm, a mean flow pore size of 51.4 µm±12.1 µm, and an average minimum pore size of 29.1 µm±9.7 µm.

The invention is defined in the claims. However, below there is provided a non-exhaustive listing of non-limiting exemplary aspects. Any one or more of the features of these aspects may be combined with any one or more features of another example, embodiment, or aspect described herein.

EXEMPLARY ASPECTS

Aspect 1 is a filter medium comprising: a support layer, a continuous fine fiber layer, having a thickness of up to 50

µm; and an efficiency layer; wherein a composite comprising the support layer and the continuous fine fiber layer has a P95/P50 ratio of up to 1.8, up to 1.9, or up to 2; wherein the efficiency layer has a P95/P50 ratio of at least 1.8, at least 1.9, or at least 2; and wherein the value of P95 of the composite falls within a range provided by the values of P5 and P50 of the efficiency layer.

Aspect 2 is the filter medium of Aspect 1, wherein the composite has a P95/P50 ratio of greater than 1.

Aspect 3 is the filter medium of Aspect 1 or 2, wherein the efficiency layer has a P95/P50 ratio of up to 10, up to 15, or up to 20.

Aspect 4 is the filter medium of any one of the preceding Aspects, wherein the continuous fine fiber layer has a thickness of at least 2 µm.

Aspect 5 is the filter medium of any one of the preceding Aspects, wherein the thickness of the continuous fine fiber layer is measured by scanning electron microscopy (SEM).

Aspect 6 is the filter medium of any one of the preceding Aspects, wherein the continuous fine fiber layer is located between the efficiency layer and the support layer.

Aspect 7 is the filter medium of any one of the preceding Aspects, wherein the efficiency layer is located on the upstream side of the filter medium.

Aspect 8 is the filter medium of any one of the preceding Aspects, wherein the filter medium further comprises a second efficiency layer.

Aspect 9 is the filter medium of Aspect 8, wherein the second efficiency layer is located adjacent to and upstream of the efficiency layer.

Aspect 10 is the filter medium of any one of the preceding Aspects, wherein the efficiency layer comprises a wet-laid resin-free media, a wet-laid resin-bonded glass media, a meltblown media, a wet-laid cellulose media, or an air-laid glass media.

Aspect 11 is the filter medium of any one of the preceding Aspects, wherein the efficiency layer comprises a wet-laid media.

Aspect 12 is the filter medium of any one of the preceding Aspects, wherein the efficiency layer comprises a bi-component fiber and an efficiency fiber, wherein the efficiency fiber has a smaller diameter than the bi-component fiber.

Aspect 13 is the filter medium of Aspect 12, wherein the efficiency fiber comprises a glass fiber.

Aspect 14 is the filter medium of Aspect 12 or 13, wherein the efficiency fiber comprises a short cut fine fiber.

Aspect 15 is the filter medium of any one of the preceding Aspects, wherein the efficiency layer comprises a microfibrillated cellulose fiber.

Aspect 16 is the filter medium of any one of the preceding Aspects, wherein the continuous fine fiber layer comprises a fiber having a diameter of up to 10 micrometers (µm).

Aspect 17 is the filter medium of any one of the preceding Aspects, wherein the continuous fine fiber layer comprises a fiber having a diameter of at least 1 micrometer (µm).

Aspect 18 is the filter medium of any one of the preceding Aspects, wherein the continuous fine fiber layer comprises a fiber having an elliptical shape.

Aspect 19 is the filter medium of any one of the preceding Aspects, wherein the continuous fine fiber layer comprises a mixture of fibers of different diameters.

Aspect 20 is the filter medium of Aspect 19, wherein the fibers of different diameters are commingled within a single strata of the continuous fine fiber layer.

Aspect 21 is the filter medium of Aspect 19 or 20, wherein the fibers of different diameters form different strata in the continuous fine fiber layer.

Aspect 22 is the filter medium of any one of Aspects 19 to 21, wherein the fibers of different diameters include large fine fibers and small fine fibers, wherein the large fine fibers have an average diameter at least 3 times the average fiber diameter of the small fine fibers.

Aspect 23 is the filter medium of Aspect 22, wherein the continuous fine fiber layer comprises a first layer of fine fibers comprising large fine fibers and a second layer of fine fibers comprising small fine fibers.

Aspect 24 is the filter medium of Aspect 22 or 23, wherein the large fine fibers have an average diameter of at least 1 µm.

Aspect 25 is the filter medium of any one of Aspects 22 to 24, wherein the large fine fibers have a diameter at least 0.2 µm, at least 0.3 µm, or at least 0.4 µm greater than a diameter of the small fine fibers.

Aspect 26 is the filter medium of any one of the preceding Aspects, wherein the continuous fine fiber comprises a polyamide.

Aspect 27 is the filter medium of any one of the preceding Aspects wherein the support layer comprises a spunbond layer.

Aspect 28 is the filter medium of any one of the preceding Aspects, wherein the over-all $\beta_{10\ \mu m}$ is at least 5, at least 7, or at least 10 under cyclic flow conditions.

Aspect 29 is the filter medium of Aspect 28, wherein cyclic flow conditions are evaluated using ISO/CD 23369 Edition 1 except when testing flat sheet performance and the test is run in singlepass mode, and the test is run at 25° C.; flow velocity through the media is cycled between 5 mm/sec and 1.25 mm/sec, in a 10 second cycle; ISO 12103-1, Medium Test Dust, provides an upstream particle concentration of 10 mg/L; continuous particle concentration measurements are collected every 6 seconds; and fluid conductivity is controlled to a range of 1000 picosiemens/meter (pS/m) to 1500 pS/m.

Aspect 30 is a filter element comprising the filter medium of any one of the preceding Aspects.

Aspect 31 is the filter element of Aspect 30, wherein a wire support is located downstream of the support layer.

Aspect 32 is a method of using the filter element of Aspects 1 to 29 or the filter element of Aspects 30 or 31 to filter a fluid.

Aspect 33 is the method of Aspect 32, wherein the fluid comprising air, gas, and liquids.

Aspect 34 is the method of Aspect 32 or 33, wherein the fluid comprises hydraulic fluid, oil, fuel, or a lubricant.

The present invention is illustrated by the following examples. It is to be understood that the particular examples, materials, amounts, and procedures are to be interpreted broadly in accordance with the scope and spirit of the invention as set forth herein.

EXAMPLES

Preparation of Polymer Solutions

To prepare Solution 1, a nylon copolymer resin (SVP 651 (Shakespeare Co., Columbia, SC), a terpolymer having a number average molecular weight of 21,500-24,800 comprising 45% nylon-6, 20% nylon-6,6 and 25% nylon-6,10— see also Table 3) was dissolved in alcohol (ethanol, 190 proof) and heated to 60° C. to produce a 9% nylon solids solution. After cooling, a melamine-formaldehyde resin (CYMEL 1133, Cytec Industries of West Paterson, NJ) was added to the solution to achieve a weight ratio of melamine-formaldehyde resin to nylon of 20:100 parts by weight. The melamine-formaldehyde resin acts as a crosslinking agent.

Additionally, para-toluene sulfonic acid (7%, based on polymer solids) was added to the solution. The solution was agitated until uniform. Solution 1 was used to prepare 0.25 µm fibers.

Solution 2 was prepared as described for Solution 1 (and also resulted in a weight ratio of melamine-formaldehyde resin to nylon of 20:100 parts by weight) except a 17% nylon solids solution was used. Solution 2 was used to prepare 1 µm fibers.

Viscosity values of 30±5 cP and 300±5 cP for Solution 1 and 2, respectively, were measured at 25° C. with a Brookfield LV DV-I Prime Viscometer in conjunction with a Fisher Scientific Model 8005 temperature-controlled water bath.

To prepare Solution 3, a copolyamide (Griltex D 1523A, EMS-Griltech, Switzerland) was dissolved in a solvent mixture of ethanol, benzyl alcohol, and water (ethanol:benzyl alcohol:water 16:1:1 by weight) and heated to 60° C. to produce a 21% (w/w) solution. Solution 3 had a viscosity of 473±10 cP measured at 25° C. with a Brookfield LV DV-I Prime Viscometer in conjunction with a Fisher Scientific Model 8005 temperature-controlled water bath. Solution 3 was used to prepare 1.4 µm fibers.

Preparation of Samples by Pendant Drop

Samples were prepared using a pendant drop apparatus, that is, a syringe filled with polymer solution. A high voltage is applied to a needle attached to the syringe and the polymer solution is pumped at a specified pump rate. As the drop of the polymer solution emerges from the needle, it forms a Taylor cone under the influence of the electrostatic field. At sufficiently high voltages, a jet is emitted from the Taylor cone which undergoes extension and fine fibers are formed and deposited on the media attached to a rotating mandrel which acts as the collector.

Fibers were formed onto a support layer wrapped around a cylinder (having a diameter 4 inches and rotating at 300 rpm) by electrospinning at a voltage of 24 kV and at a distance of 4 inches from the syringe or syringes delivering the polymer solution or solutions at a pump rate of 0.075 mL/min. After electrospinning, the formed fine fibers were thermally treated at 140° C. for 10 minutes.

Method 1:

A mixed fiber layer was deposited on a 0.2 mm thick, spunbond nylon scrim having a basis weight of 70 g/m² and a solidity of 28% (Media Grade 23200, Cerex Advanced Fibers, Cantonment, Fla.) by co-spinning two different electrospinning precursor solutions (Solution 1 and Solution 2) from two different syringes, delivered at the same pump rate (0.075 mL/minute) and for the same duration (5 minutes). Two control samples were separately prepared using the same pump rate and duration, by spinning Solution 1 or Solution 2 from a single syringe to produce a layer including only small fine fibers or large fine fibers, respectively.

All samples were subjected to a post-synthesis treatment to improve robustness via cross-linking. After electrospinning, formed fibers were thermally treated at 140° C. for 10 minutes.

Method 2:

A series of mixed fiber layers were deposited on a 0.2 mm thick, spunbond nylon scrim having a basis weight of 70 g/m² and a solidity of 28% (Media Grade 23200, Cerex Advanced Fibers, Cantonment, FL) by co-spinning Solution 1 and Solution 2 from two different syringes, delivered at the same pump rate (0.075 mL/minute) and for the same duration. Two control samples were separately prepared using the same pump rate and duration, by co-spinning either Solution 1 or Solution 2 from two syringes to produce a layer including only small fine fibers or large fine fibers, respectively. In contrast to Method 1, co-spinning either Solution 1 or Solution 2 from two syringes (instead of one syringe) resulted in more similar basis weights between the control samples and the samples including mixed fiber layers.

All samples were subjected to a post-synthesis treatment to improve robustness via cross-linking. After electrospinning, formed fibers were thermally treated at 140° C. for 10 minutes.

Method 3:

A series of fiber layers having fibers of different diameters were deposited on a 0.2 mm thick, spunbond nylon scrim having a basis weight of 70 g/m² and a solidity of 28% (Media Grade 23200, Cerex Advanced Fibers, Cantonment, FL.) by alternatingly ("pulsed") spinning from one of two syringes containing Solution 1 or Solution 2, delivered at the same pump rate (0.075 mL/min) and alternatingly according to the timing sequence in Table 1.

All samples were subjected to a post-synthesis treatment to improve robustness via cross-linking. After electrospinning, formed fibers were thermally treated at 140° C. for 10 minutes.

Method 4:

A series of mixed fiber structures were deposited on a 0.2 mm thick, spunbond nylon scrim having a basis weight of 70 g/m² and a solidity of 28% (Media Grade 23200, Cerex Advanced Fibers, Cantonment, FL) using a two-step procedure.

In the first step, large fine fibers (equivalent to 0.43 g/m² coverage) were deposited onto the scrim to act as an underlying support layer for subsequent fibers by delivering Solution 2 at a pump rate of (0.075 mL/min) for 2 minutes.

In the second step, a layer of fine fibers of mixed diameters was deposited by alternatingly ("pulsed") spinning from either one of two syringes containing Solution 1 or Solution 2 (for small fine fibers and large fine fibers, respectively) delivered at the same pump rate (0.075 mL/min) and alternatingly according to the timing sequence in Table 1.

All samples, with approximate total basis weight ranging from 0.65 to 0.86 g/m², were subjected to a post-synthesis treatment to improve robustness via cross-linking. After electrospinning, formed fibers were thermally treated at 140° C. for 10 minutes.

Method 5

A series of structures having varied basis weight contributions from the small fine fiber component were deposited on a 0.2 mm thick, spunbond nylon scrim having a basis weight of 70 g/m² and a solidity of 28% (Media Grade 23200, Cerex Advanced Fibers, Cantonment, FL) using a two-step procedure.

In the first step, large fine fibers (equivalent to 0.43 g/m² coverage) were deposited onto the scrim to act as an underlying support layer for subsequent fibers by delivering Solution 2 at a pump rate of (0.075 mL/min) for 2 minutes.

In the second step, a layer of small fine fibers was deposited by delivering Solution 1 at a pump rate of 0.075 mL/min. The basis weight of the small fine fiber layer was 0.09 g/m², 0.10 g/m², 0.22 g/m², 0.31 g/m², 0.45 g/m², or 0.56 g/m², and was achieved by using an electrospinning duration of to 48 seconds, 60 seconds, 120 seconds, 168 seconds, 240 seconds, or 300 seconds, respectively. After electrospinning, formed fibers were thermally treated at 140° C. for 10 minutes.

TABLE 1

Pulsed electrospinning sequence

| Sample ID | Pulsed spinning sequence (2 minutes total duration) | Basis weight (g/m²) | Structure and composition* |
|---|---|---|---|
| Set A | 2 min Solution 1 only | 0.65 | 100% small fine fibers |
| Set A5 | 102 sec Solution 1 + 18 sec Solution 2 | 0.68 | Layered, 2% large fine fibers |
| Set A6 | (51 sec Solution 1 + 9 sec Solution 2) × 2 | 0.68 | Commingled, 2% large fine fibers |
| Set B | 90 sec Solution 1 + 30 sec Solution 2 | 0.71 | Layered, 5% large fine fibers |
| Set D | (30 sec Solution 1 + 10 sec Solution 2) × 3 | 0.71 | Commingled, 5% large fine fibers |
| Set D5 | 72 sec Solution 1 + 48 sec Solution 2 | 0.74 | Layered, 7% large fine fibers |
| Set D6 | (18 sec Solution 1 + 12 sec Solution 2) × 4 | 0.74 | Commingled, 7% large fine fibers |
| Set E | 1 min Solution 1 + 1 min Solution 2 | 0.76 | Layered, 10% large fine fibers |
| Set 1 | (10 sec Solution 1 + 10 sec Solution 2) × 6 | 0.76 | Commingled, 10% large fine fibers |
| Set 15 | 42 sec Solution 1 + 78 sec Solution 2 | 0.79 | Layered, 16% large fine fibers |
| Set 16 | (14 sec Solution 1 + 26 sec Solution 2) × 3 | 0.79 | Commingled, 16% large fine fibers |
| Set J | 30 sec Solution 1 + 90 sec Solution 2 | 0.81 | Layered, 20% large fine fibers |
| Set L | (10 sec Solution 1 + 30 sec Solution 2) × 3 | 0.81 | Commingled, 20% large fine fibers |
| Set M | 2 min Solution 2 only | 0.86 | 100% large fine fibers |

*Proportion of larger fine fibers (on a fiber count basis) was estimated from the diameters of small (Solution 1) and large (Solution 2) fine fibers, % solids in precursor spinning solutions, and syringe pump feed rates and spinning time, as described in the Fiber Proportion Calculation section, below.

Method 6

A series of media samples including multiple layers having a variety of sizes of fine fibers were made. Samples included a base layer of large fine fibers, followed by a layer of small fine fibers, and topped by a layer of large fine fibers (Large/Small/Large, or L/S/L). Alternatively, samples included a base layer of large fine fibers, followed by a layer of small fine fibers, then a layer of commingled small fine fibers and large fine fibers, and topped by a layer of large fine fibers (Large/Small/Commingled/Large, or L/S/Commingled/L).

Large fine fibers (equivalent to 0.43 g/m² coverage) were deposited onto the scrim by spinning Solution 2 for 2 minutes. Without wishing to be bound by theory, it is believed the large fine fibers act as an underlying support layer for subsequent fiber layers. Next, a second layer of small fine fibers (equivalent to 0.22 g/m² coverage) was deposited by spinning Solution 1 for 2 minutes. If included, an intermediate (commingled) layer including both small fine fibers and large fine fibers was added by alternatingly ("pulsed") spinning from a syringe containing Solution 1 or Solution 2, for small fine fibers and large fine fibers, respectively, according to the timing sequence in Table 1. Finally, a top layer of large fine fibers (equivalent to 0.43 g/m² coverage) was deposited by spinning Solution 2 for 2 minutes. All solutions were delivered at a pump rate of 0.075 mL/min.

All samples, with approximate total basis weight ranging from 1.31 to 1.52 g/m², were subjected to a post-synthesis treatment to improve robustness via cross-linking. After electrospinning, formed fibers were thermally treated at 140° C. for 10 minutes.

Method 7

A series of media samples including a base layer of large fine fibers and a commingled layer of small fine fibers and large fine fibers were also prepared.

First, a first fine fiber layer including large fine fibers (equivalent to 0.43 g/m² coverage) was deposited on a 0.2 mm thick, spunbond nylon scrim having a basis weight of 70 g/m² and a solidity of 28% (Media Grade 23200, Cerex Advanced Fibers, Cantonment, FL) by spinning Solution 2 for 2 minutes at a pump rate of 0.075 mL/min. Next, a second fine fiber layer including commingled small fine fibers and large fine fibers was deposited by co-spinning two different electrospinning precursor solutions (Solution 1 and Solution 2) from two different syringes, delivered at the same pump rate (0.075 mL/minute) and for the same duration (either 2.5 minutes or 4.5 minutes).

All samples were subjected to a post-synthesis treatment to improve robustness via cross-linking. After electrospinning, formed fibers were thermally treated at 140° C. for 10 minutes.

Method 8A

A single-size fiber structure (nominal fiber diameter 1.4 μm, basis weight 0.67 g/m² coverage) was deposited from a polymer solution (21% w/w Griltex D 1523A (EMS-Griltech AG, Switzerland) in a solvent mixture of ethanol:benzyl alcohol:water 16:1:1 by weight) (Solution 3) delivered at a pump rate of 0.075 mL/min on a 0.2 mm thick, spunbond nylon scrim having a basis weight of 70 g/m² and a solidity of 28% (Media Grade 23200, Cerex Advanced Fibers, Cantonment, FL) via spinning for 2.5 minutes at 24 kV bias at a needle-to-collector distance of 4 inches.

Method 8B

A single-size fiber structure (nominal fiber diameter 1 μm, basis weight 2.59 g/m² coverage) was deposited from a polymer solution (17% w/w SVP 651 (see Table 3) in ethanol) (Solution 2) delivered at a pump rate of 0.075 mL/min on a 0.2 mm thick, spunbond nylon scrim having a basis weight of 70 g/m² and a solidity of 28% (Media Grade 23200, Cerex Advanced Fibers, Cantonment, FL) via spinning for 12 minutes at 24 kV bias at a needle-to-collector distance of 4 inches.

Method 8C

A single-size fiber structure (nominal fiber diameter 1.4 μm, basis weight 4.02 g/m² coverage) was deposited from a polymer solution (21% w/w Griltex D 1523A (EMS-Griltech, Switzerland) in a solvent mixture of ethanol:benzyl alcohol:water 16:1:1 by weight) (Solution 3) delivered at a pump rate of 0.075 mL/min onto a nylon scrim (Cerex, 70 g/m²) via spinning for 15 minutes at 24 kV bias at a needle-to-collector distance of 4 inches.

Method 9:

Large fine fibers (equivalent to 0.54 g/m² coverage) were deposited onto the scrim by spinning Solution 3 for 2 minutes at 24 kV bias at a needle-to-collector distance of 4 inches.

Next, a second layer of small fine fibers (equivalent to 0.22 g/m² coverage) was deposited by spinning Solution 1 for 2 minutes at 24 kV bias at a needle-to-collector distance of 4 inches.

A third layer of large fine fibers (equivalent to 0.54 g/m² coverage was deposited by spinning Solution 3 for 2 minutes at 24 kV bias at a needle-to-collector distance of 4 inches.

Finally, a top layer of large fine fibers (equivalent to 0.54 g/m² coverage) was deposited by spinning Solution 3 for 2 minutes at 24 kV bias at a needle-to-collector distance of 4 inches.

Preparation of Media Handsheets

Handsheets were prepared by weighing out of the component fibers to target the basis weight required when formed in a 30 cm by 30 cm sheet. A FORMAX 12"×12" Stainless Steel Sheet Mold (Catalog No. G-100, Adirondack Machine Corporation, Hudson Falls, NY) was used as the handsheet former and was prepared by placing a uniform nonwoven scrim layer with pores smaller than 100 µm at the bottom of the former (no removable forming wires were used). The former was then filled with cold tap water to almost full, but to allow room for an additional 1.5 L of water to be added. 1 mL of Tide HE laundry soap (Procter & Gamble, Cincinnati, OH) was added to the water in the handsheet former. To prepare the fibers, 1 L of cold tap water was added to a Vitamix blender along with 200 mL of 5% acetic acid in water. The weighed-out fibers were added to the blender and mixed on medium-low speed for 180 seconds. The contents of the blender were then added to the handsheet former, and the contents of the handsheet former were mixed to ensure the fibers are evenly distributed. The water was drained out the bottom of the handsheet former, allowing the fibers form a sheet as they are collected on the nonwoven scrim. Water was removed from the sheet using vacuum suction on the wire side, and the handsheet (still on the scrim) was dried on a one-sided hot plate speed dryer (Model 135 Speed Dryer, Emerson Apparatus, Gorham, ME) at 120° C. for 10 minutes. The sheet was removed (from the scrim) and allowed to cool to ambient conditions before using.

Media Characterization

Steady Flow Conditions Test

β ratio was evaluated under steady flow conditions using ISO 16889:2008 (Hydraulic fluid power—Filters—Multipass method for evaluating filtration performance of a filter element) except when testing flat sheet performance, the test was run in singlepass mode, instead of the multipass mode called for by the test standard. Tests were run at 25° C. instead of the 40° C. called for by the test standard. Flow velocity through the was media 5 mm/sec. ISO 12103-1, Medium Test Dust (Powder Technology, Inc., Arden Hills, MN) was used to provide an upstream particle concentration was 10 mg/L. Continuous particle concentration measurements were collected every 6 seconds.

Cyclic Flow Conditions Test

β ratio was evaluated under cyclic flow conditions using ISO/CD 23369 Edition 1 (Hydraulic fluid power—Multipass method of evaluating filtration performance of a filter element under cyclic flow conditions) except when testing flat sheet performance, the test was run in singlepass mode, instead of the multipass mode called for by the test standard. Tests were run at 25° C. instead of the 40° C. called for by the test standard. Flow velocity through the media was cycled between 5 mm/sec and 1.25 mm/sec, in a 10 second cycle (approximately 5 seconds at each velocity). ISO 12103-1, Medium Test Dust (Powder Technology, Inc., Arden Hills, MN) was used to provide an upstream particle concentration was 10 mg/L. Continuous particle concentration measurements were collected every 6 seconds. Fluid conductivity was controlled to a range of 1000-1500 picosiemens/meter (pS/m).

Calibration of Particle Counters

Particle counters were calibrated for use in ISO test procedures according to ISO 11171:2016 (Hydraulic fluid power—Calibration of automatic particle counters for liquids).

Pressure Drop

Pressure drop was measured as described in ISO 3968: 2017 using the test conditions shown in Table 2.

TABLE 2

Pressure Drop Test Conditions

| Fluid | MIL5606 Hydraulic Oil |
|---|---|
| Media Area | 0.0507 m² |
| Fluid Viscosity | 22 centistokes (cSt) |
| Fluid Temperature | 25° C. |

Scanning Electron Microscopy (SEM)

Samples were prepared for top-down SEM imaging by sputter-coating the surface with a gold and palladium mixture including an Au:Pd 60:40 mixture. Typically, a 5 kV or a 10 kV accelerating voltage was used and images were collected at ×500, ×1000 and ×2500 magnifications with a secondary electron detector or a backscatter electron detector.

Samples were prepared for cross-sectional SEM imaging by preparing a 3 mm by 20 mm sample that included fine fiber on a support layer, placing the sample fine fiber side down in a weighing tin on a hard surface, filling the tin with liquid nitrogen to submerge the sample. After at least 30 seconds, a razor blade was used to cut the sample (while still submerged in liquid nitrogen) to expose a cross-section. After the cut was made and an additional 10-20 seconds had elapsed, the sample was removed from liquid nitrogen and mounted to SEM imaging. Samples were then sputter-coated with 60:40 Au:Pd. Typically, a 5 kV accelerating voltage was used and images were collected at ×1000 magnifications with a secondary electron detector.

Fiber Diameter

Fiber diameter sizing by Scanning Electron Microscopy (SEM) was performed by imaging fibers via top-down SEM and measuring fiber diameter (or other dimensions of interest) in the resulting micrographs. Image processing software such as ImageJ, (FIJI Is Just ImageJ (FIJI), an updated version of ImageJ), and/or Trainable Weka Segmentation (an ImageJ plug-in) was used for fiber sizing. The diameter of the fiber was measured in at least 30 locations in the sample.

Fine Fiber Layer Thickness

The thickness of the fine fiber samples was measured by Scanning Electron Microscopy (SEM) via cross-sectional analysis of SEMs, prepared as described above. The thickness of the fine fiber layer in at least 5 images from different portions of the sample were determined using FIJI. Specifically, the top and bottom of the fine fiber layer were delineated using a polygon tool, the area outside the selected fine fiber cross-section was cleared, the area of the selected fine fiber cross-section was re-colored white using the threshold level tool to compensate for fibers on the borders of the selected section, and the maximum thickness in the image was measured in recorded. Five of these maximum values were rounded to the nearest tenth of a micron and then averaged to provide the thickness of the fine fiber sample.

Fiber Proportion Calculation Based on Spin Time

Relative amounts of small and large fine fibers (on a total fiber count basis) are determined using the following equation:

$$\% \text{ Large Fibers} = 100 \times \frac{(V_L/D_L^2)}{((V_L/D_L^2) + (V_S/D_S^2))}$$

where $D_L$ and $D_S$ are diameters of the large fine fiber and small fine fibers, respectively; and $V_L$ and $V_S$ are volumes of the polymers comprising the large fine fiber and small fine fibers, respectively. Volumes, V, are calculated for small or large fine fiber according to:

$$V = \left(\% \frac{w}{v}\right) \times (\text{Pump Rate} \times \text{Spin Time}) \times \frac{1}{\rho}$$

where $\rho$ is the density of the polymer comprising the small fine fibers or large fine fibers, and % w/v refer to the solids contents on a mass per volume basis of the polymer solutions.

Fiber Proportion Calculation Based on Microscopy

Sample images were obtained via SEM at appropriate magnification (for example, 500×, 1000×, or 2500×). The presence of one or more fiber populations was determined by counting all fibers within the image, followed by classifying into small fine fibers and large fine fibers based on grouping diameters within 25% variation. Fiber size was measured using image processing software such as ImageJ. The proportion of small fine fibers was calculated by taking the ratio of the small fine fiber count against the total fiber (both small and large) count within the image.

Solidity

Solidity (c) of a nonwoven layer (including, for example, a non-fine fiber layer or a composite including fine fiber and non-fine fiber layers) is calculated using the following equation:

$$c = BW/\rho Z$$

where BW is the basis weight, $\rho$ is the density of the fiber, and Z is the thickness of the media. If the nonwoven layer includes different fibers, a mass ratio of the fibers may be used to determine density ($\rho$).

Thickness was measured according to TAPPI T411 om-15, entitled "Thickness (caliper) of paper, paperboard, and combined board," and a foot pressure of 1.5 psi was used. Basis Weight was measured using TAPPI T410 om-08.

Because of the difficulty of measuring thickness of a fine fiber layer, solidity of a fine fiber layer is calculated using an adapted version of the Kirsch-Fuchs equation (see Kirsch et al., "Studies on Fibrous Aerosol Filters—III Diffusional Deposition of Aerosol in Fibrous Filter," *Ann. Occup. Hyg.* 1968; 11:299-304) using experimentally measured pressure drop values. Pressure drop ($\Delta P$ or dP) is determined using a FHAST bench, as described in the Liquid Filtration Performance Testing section, below.

First, the dimensionless fiber drag parameter $F^*_{1.0}$ is calculated from the following modified Kirsch-Fuchs equation:

$$\Delta P = \frac{4\left(\frac{BW}{\rho}\right)\mu U_\infty}{\pi D_f^2} F^*_{1.0}$$

where BW is basis weight, $\rho$ is density of the fiber, $\mu$ is viscosity of the liquid (used for the pressure drop test), $U_\infty$ is velocity of the liquid through the media during the pressure drop test, and $D_f$ is effective fiber diameter. $\Delta P$ is determined from FHAST bench, as described in the Liquid Filtration Performance Testing section, below.

Second, solidity (c) is calculated from $F^*_{1.0}$ using the following equation:

$$F^*_{1.0} = 4.3548 e^{8.8822c}$$

For mixed fiber media, the effective fiber diameter accounts for the relative amounts of the small and large fibers, and is calculated from the following equation:

$$r_{eff} = \frac{\sum_{i=0}^{n} r_i^2 l_i}{\sum_{i=0}^{n} r_i l_i}$$

where $r_{eff}$ is the effective fiber radius, $r_i$ is the radius of fiber i, and $l_i$ is the fraction or relative amount of fiber i. Effective fiber diameter=$2r_{eff}$.

Basis weight of a fine fiber layer or layers is calculated as follows:

Total basis weight of the fine fiber layers=(mass of the fine fibers)/(area of scrim)

The mass of the fine fibers was calculated as follows:

Mass of fine fibers=(% w/v polymer in solution)× (pump rate)×(spinning time)

When the method of making the fine fiber is unknown, the mass of the fine fibers may be calculated as follows, after separating (for example, by peeling or delaminating) the fine fibers from the scrim or support:

Mass of fine fibers=(total mass of media sample)− (mass of bare scrim or support)

Capillary Flow Porometry (Pore Size Measurement)

Pore size measurement was performed by capillary flow porometry method using a continuous pressure scan on a Porometer 3G (Quanachrome Instruments, Boynton Beach, CA).

Flow Porometry Method A

This method used Porofil Wetting Solution as a wetting fluid (Quantachrome Instruments, Anton Paar, Boynton Beach, FL) and samples were tested in both wet and dry states (first wet, then dry). Samples 25 mm in diameter were subjected to a continuous pressure scan from 0.0256 bar to 1.275 bar to determine pore sizes having a diameter in a range of 1 µm to 100 µm.

Flow Porometry Method B

This method used silicone oil, having a surface tension of 20.1 dynes/cm and a wetting contact angle of 0, and samples were tested in both wet and dry states (first dry, then wet). Samples 6 mm in diameter were subjected to a continuous pressure scan selected to measure the majority of the cumulative pore size distribution in a range of 2% to 98%.

For both methods, the sample was tested from low pressure to high pressure, while wet and dry. The air flow and sample pressure from the saturated part of the test is commonly called the wet curve. 256 data points were collected across the range of the scan of the pressures for both the dry curve and the wet curve. Data points were collected across the scan at a rate of approximately 17 data points per minute. The test was performed at ambient conditions (for example, 20° C. to 25° C.). No empirical tortuosity factor and/or a shape factor was applied to adjust the pore size diameter definition.

The flow porometry test procedure collects a set of pressure (typically plotted on the x-axis) and air flow (typically plotted on the y-axis) data for the dry sample, and a set of pressure and air flow data for the saturated (wet) sample. These two sets of data are commonly called the dry curve and the wet curve. That is:

Dry Curve=$V_{dry}$=air flow through a dry sample as a function of pressure

Wet Curve=$V_{wet}$=air flow through a saturated sample as a function of pressure Based on capillary theory, the pressure across the sample (ΔP) can be converted to pore diameter (d) using the Young-Laplace formula, $$d = \frac{4\gamma\cos\theta}{\Delta P} \times (\text{Emperical Factor})$$

Where:

γ=fluid surface tension

θ=fluid contact angle d=pore diameter

ΔP=pressure across sample

This conversion allows the dry and wet curves to be defined as a function of pore diameter. That is:

Dry Curve=$V'_{dry}$=air flow through a dry sample as a function of diameter

Wet Curve=$V'_{wet}$=air flow through a saturated sample as a function of diameter The cumulative flow pore size distribution (Q) is defined as the ratio of the wet curve over the dry curve as a function of pore diameter. Where, $$Q(d) = \frac{V'_{wet}}{V'_{dry}}$$

Cumulative distributions may be represented as an increasing cumulative distribution from 0 to 100%, or as a decreasing cumulative distribution from 100% to 0%. The pore sizes in this document are defined from the increasing cumulative flow pore size distribution. Where, Incr. Cumulative Flow Pore Distribution=1−Q(d)

To better identify points along this curve, this document defines various P(x %) values that are equal to the corresponding pore diameter (d)

P(x%)=d, where x%=1−Q(d)

Examples include, but are not limited to, the following:
P5 is the pore diameter that has an increasing cumulative flow pore distribution of 5%.
P10 is the pore diameter that has an increasing cumulative flow pore distribution of 10%.
P50 is the pore diameter that has an increasing cumulative flow pore distribution of 50%.
P90 is the pore diameter that has an increasing cumulative flow pore distribution of 90%.
P95 is the pore diameter that has an increasing cumulative flow pore distribution of 95%.

Where the maximum pore size was reported, the maximum pore size was determined by detecting the bubble point using the Porometer 3G (Quanachrome Instruments, Boynton Beach, CA), using the Auto Bubble Point (BP Auto Tolerance) method. According to this method, the bubble point is found after fluid begins passing through the sample, and three consecutive measurement increased by at least 1%. The bubble point is the value at the start of this sequence of three points.

Air Filtration Performance

Air filtration performance was assessed with a High-Efficiency Flat Sheet (HEFS) TSI Automated Filter Tester, Model 8127, test bench (TSI Incorporated, Shoreview, MN) to measure particle capture efficiency using 0.3 μm oil (bis(2-ethylhexyl) sebacate, Sigma-Aldrich) droplets (aerosol) at a flow rate of 14.7 liters per minute (L/min) to challenge 4 inch diameter media samples. TSI's CertiTest Model 8127 Automated Filter Tester is designed for testing filters, respirator cartridges, and filter media to the latest American government and industry-wide specification, and meets the standards of 42 CFR § 84 (Jun. 8, 1995).

Liquid Filtration Performance Testing

Liquid filtration performance was assessed with a Flat-sheet, High-Accuracy, Singlepass Two-fluid (FHAST) bench having the following features: flow rate control: 57 mL/min to 580 mL/min at ±2% error; temperature control: 25° C. to 40° C. at ±0.25° C. error; dP measurement: 0 psi to 25 psi at ±0.065% error; particle size: 1.7 μm to 20 μm; max particle concentration: 1,000,000/mL; dilution capabilities: 5:1-100:1. The FHAST bench was used in static mode using ISO Medium Test Dust per ISO 11171:2016 at a concentration of 10 milligrams per liter (mg/L) in hydraulic fluid and at a flow rate of 0.347 L/min to challenge 2 inch diameter media samples. Values for media dP and efficiencies for a particular contaminant particle size (measured using commercially available particle counters, specifically PAMAS 4132 Particle Counting System for Liquids, calibrated with ISO Medium Test Dust per ISO 11171:2016, Hydraulic fluid power—Calibration of automatic particle counters for liquids) were collected at regular time intervals (approximately every 7 sec) throughout the duration of testing, which was terminated upon reaching a pre-set maximum media dP of 20 psi (measured with two Test Media dP sensors: (A) 0 psi to 5 psi, ±0.025% accuracy differential pressure transducer; high accuracy, low range dP sensor and (B) 0 psi to 25 psi, ±0.065% accuracy differential pressure transducer; low accuracy, high range dP sensor).

Beta ratio was evaluated under steady flow conditions (347 mL/min through a media sample 2 inches in diameter) using ISO 16889:2008 (Hydraulic fluid power—Filters—Multi-pass method for evaluating filtration performance of a filter element) except when testing flat sheet performance, the test was run in single-pass mode, instead of the multi-pass mode called for by the test standard. Hydraulic fluid (Mobil Aero HF, MIL-PRF-5606) was laden with ISO 12103-1 A3 Medium Test Dust (Powder Technology, Inc., Arden Hills, MN) at a concentration of 10 mg/L. Instantaneous beta values were recorded every 7 seconds throughout the test duration. A test ends when a terminal dP of 20 psi is reached.

Figure of Merit

Figure of Merit is a measure of the performance of a filter media and of the filter media's ability to provide a certain level of clarification of a stream with a minimum energy used. Larger Figure of Merit values are generally better than smaller values.

Figure of Merit (FOM) values were calculated from fractional penetration (P, the ratio of upstream and downstream counts), pressure drop (dP, inches H$_2$O) and face velocity (u, fpm):

$$FOM=(-\log_{10}P)/(dP/u)$$

Fractional penetration (P), pressure drop (dP) and face velocity (u) were measured using the HEFS TSI Automated Filter Tester, Model 8127, test bench, as described above.

Scanning Electron Microscopy (SEM)

Samples were prepared for SEM imaging by sputter-coating with gold. Typically, a 5 kV or a 10 kV accelerating voltage was used and images were collected at ×500, ×1000 and ×2500 magnifications with a secondary electron detector or a backscatter electron detector.

Example 1

XP/Fine Fiber/Scrim media was constructed by combining Synteq XP™ synthetic liquid media having a 10 micron efficiency rating as the efficiency layer ("10XP," Donaldson Company, Inc., Minneapolis, MN), a support layer (CEREX 23200, Cerex Advanced Fabrics, Inc., Cantoment, FL), and a continuous fine fiber layer deposited on the support layer using electrospinning. The continuous fine fiber layer (which had a 0.9 μm diameter) was formed from SVP 651 (see Table 3). The efficiency layer was the most upstream layer; the continuous fine fiber layer was placed downstream of the efficiency layer; and the support layer (scrim) was placed downstream of the continuous fine fiber layer.

The layers were placed on top of each other and placed in a filter housing.

The Beta ratio versus particle sizes was measured under steady flow conditions (as described in the Steady Flow Conditions Test) or under cyclic flow conditions (as described in the Cyclic Flow Conditions Test) for Synteq XP™ synthetic liquid media having a 10 micron efficiency rating ("10XP," Duramax P164378, Donaldson Company, Inc., Minneapolis, MN), Synteq XP™ synthetic liquid media having a 5 micron efficiency rating ("5XP," Duramax P165332, Donaldson Company, Inc., Minneapolis, MN), and the XP/Fine Fiber/Scrim media. Results are shown in FIG. 3.

Figure 3B:
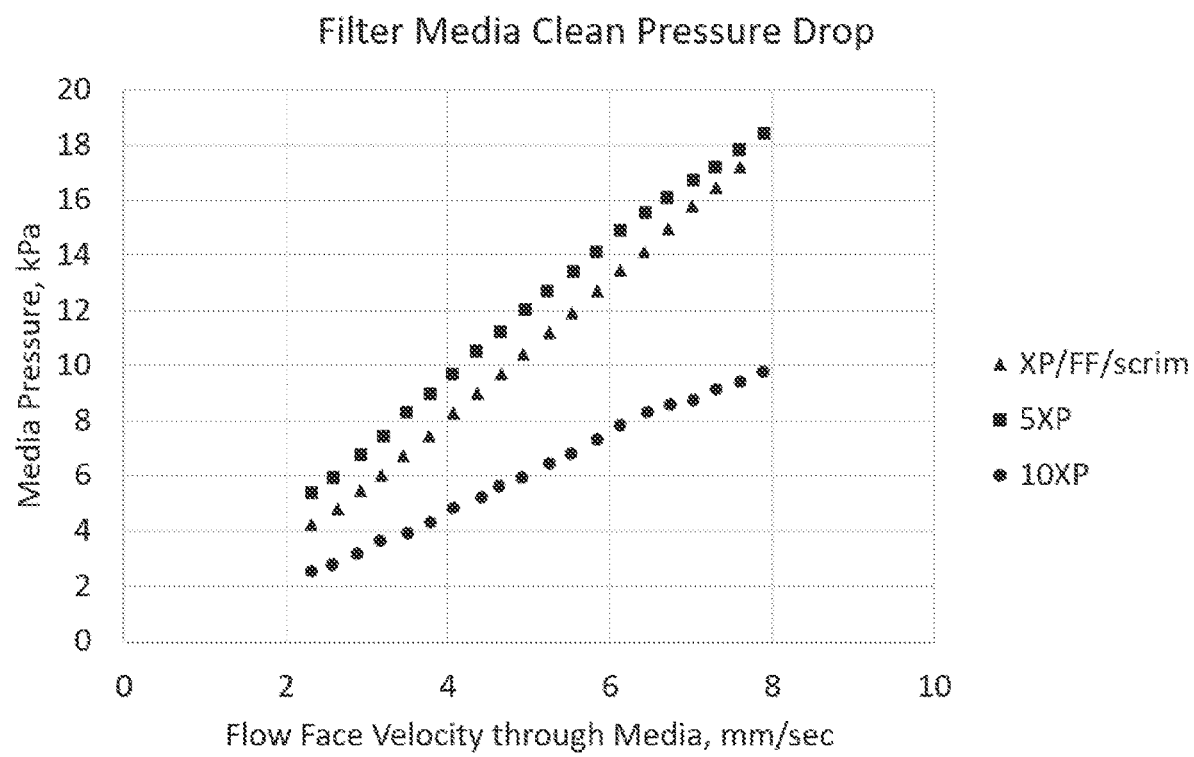
FIG. 3B shows the pressure drop for the same media tested in FIG. 3A.
Figure 3A:
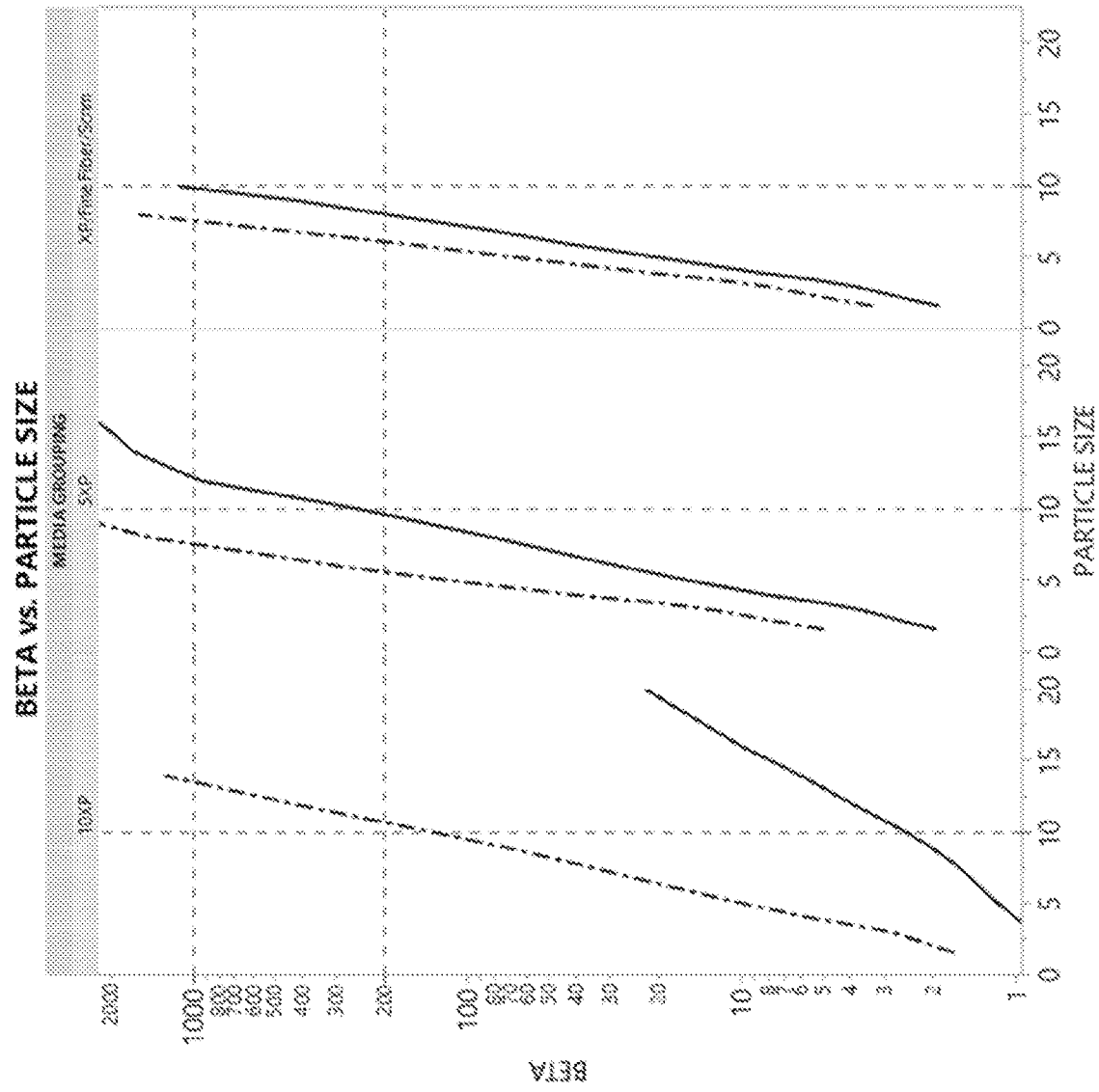
FIG. 3A shows β ratio versus particle sizes for three different media under cyclic flow conditions (blue) or steady flow conditions (red). Left panel: Donaldson Synteq XP™ synthetic liquid media having a 10 micron (μm) efficiency rating. Middle panel: Donaldson Synteq XP™ synthetic liquid media having a 5 micron efficiency rating. Right panel: Filter medium (XP/Fine Fiber/Scrim) as described in Example 1 (an efficiency layer (Donaldson Synteq XP™ synthetic liquid media having a 10 micron efficiency rating), a continuous fine fiber layer, and a support layer (scrim)).

Although comparable efficiency was observed for the Synteq XP™ synthetic liquid media having a 5 micron efficiency rating and the XP/Fine Fiber/Scrim media, the XP/Fine Fiber/Scrim media, the XP/Fine Fiber/Scrim media exhibited improved pressure drop, as shown in FIG. 3B.

TABLE 3

Reported physical properties of SVP 651 resin are:

| Property | ASTM Method | Units | Typical Value |
|---|---|---|---|
| Specific Cravity | D-792 | — | 1.08 |
| Water Absorption (24 hr immersion) | D-570 | % | 2.5 |
| Hardness | D-240 | Shore D | 65 |
| Melting Point | DSC | °C.(° F.) | 154 (509) |
| Tensile Suength @ Yield | D-638 | MPa (kpsi) | 50 (7.3) |
| Elongation at Break | D-638 | % | 550 |
| Flexural Modulus | D-790 | MPa (kpsi) | 180 (26) |
| Volume Resistivity | D-257 | ohm-cm | 1032 |

Example 2

Figure 4:
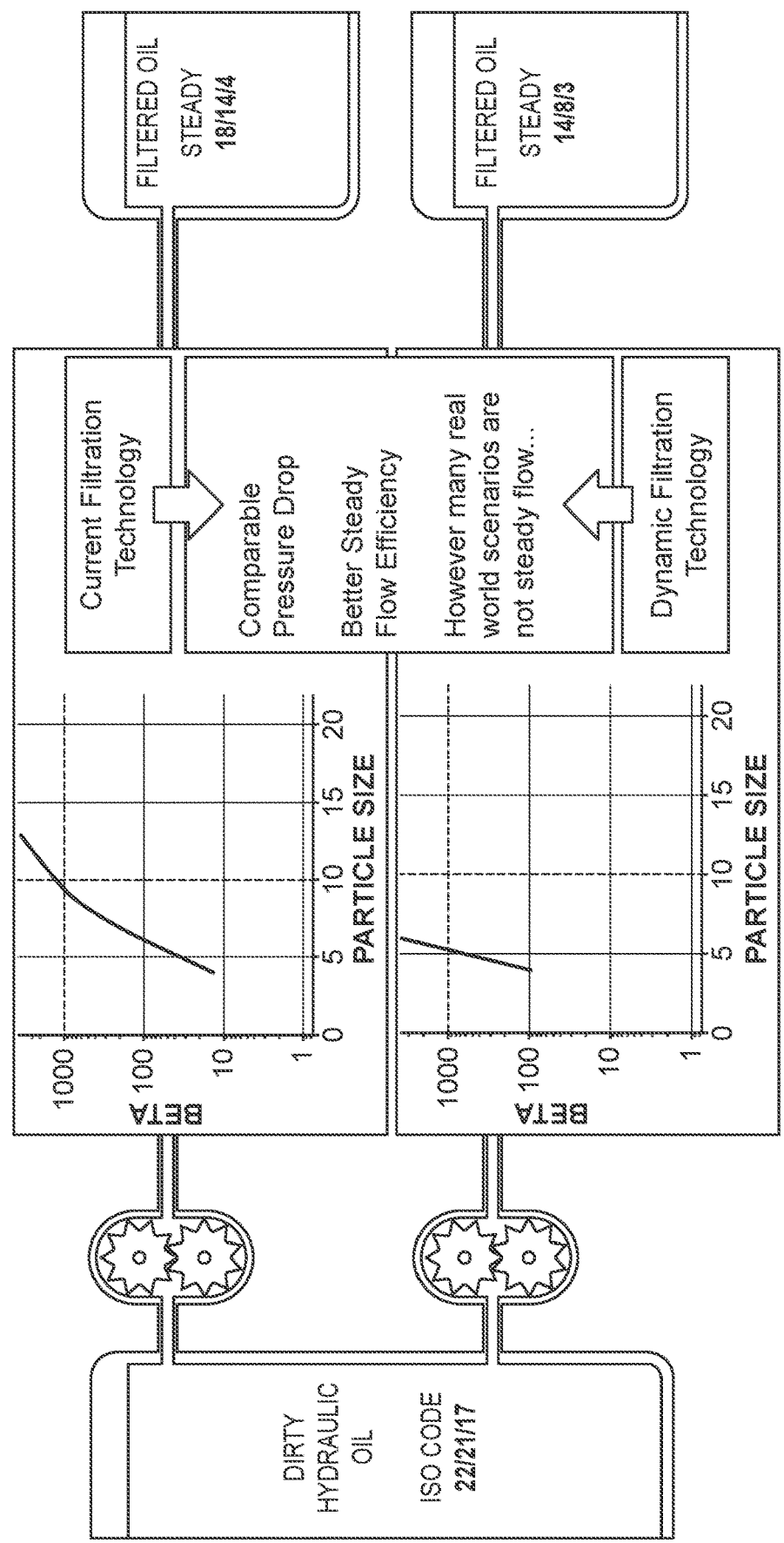
FIG. 4 shows β ratio versus particle sizes under steady flow conditions for filter elements including Donaldson Synteq XP™ synthetic liquid media having a 10 micron efficiency rating (top) or a filter medium as described in Example 2 (an efficiency layer (Donaldson Synteq XP™ synthetic liquid media having a 10 micron efficiency rating), a continuous fine fiber layer, and a support layer). Beta ratio was measured as described in the Steady Flow Conditions Test in the Examples. The three numbers separated by slashes indicate International Organization for Standardization (ISO) cleanliness codes, measured and defined as described ISO 4406:2017.
Figure 5:
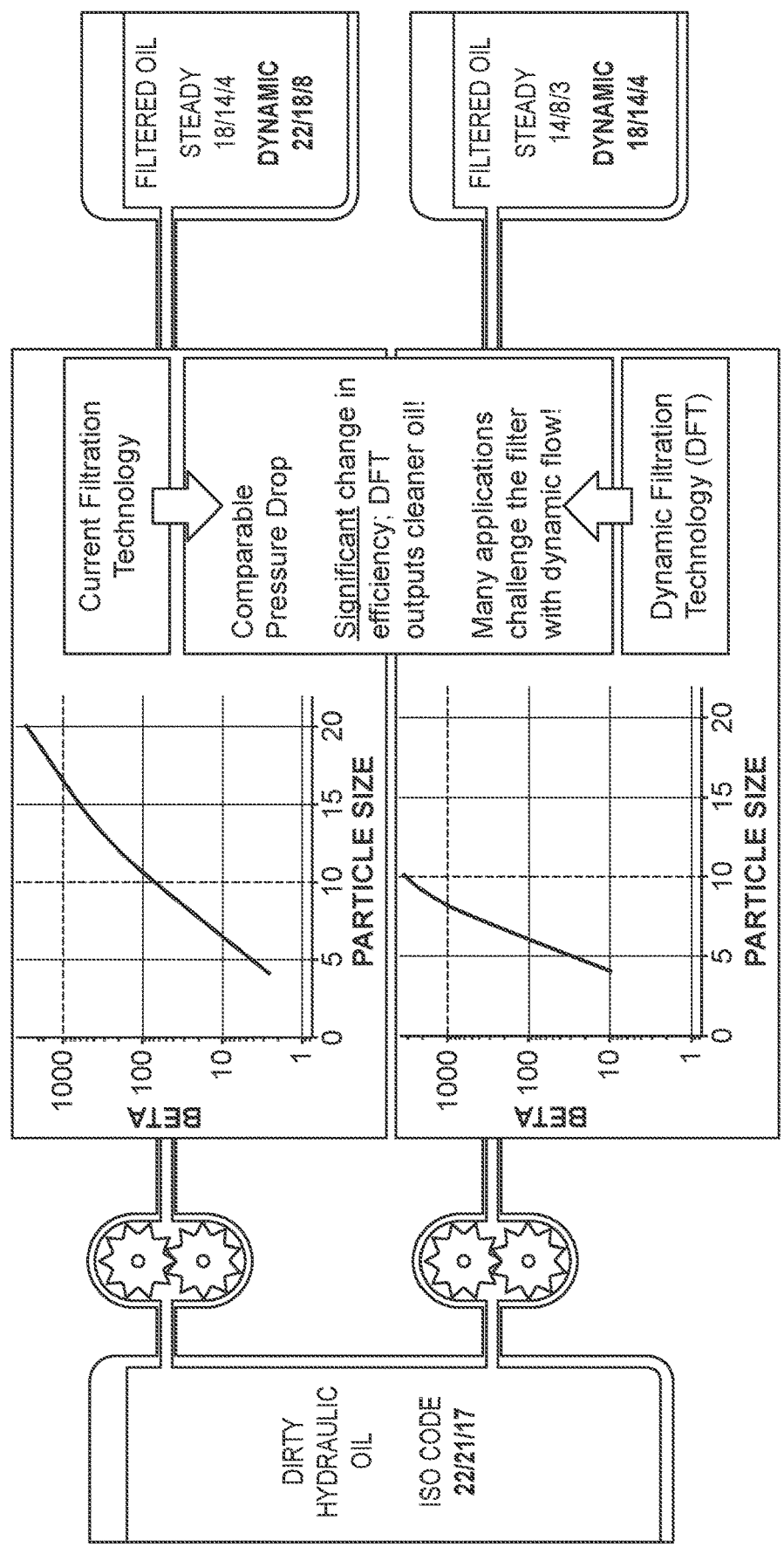
FIG. 5 shows β ratio versus particle sizes under cyclic flow conditions for filter elements including Donaldson Synteq XP™ synthetic liquid media having a 10 micron efficiency rating (top) or a filter medium as described in Example 2 (an efficiency layer (Donaldson Synteq XP™ synthetic liquid media having a 10 micron efficiency rating), a continuous fine fiber layer, and a support layer). Beta ratio was measured as described in the Cyclic Flow Conditions Test in the Examples. The three numbers separated by slashes indicate International Organization for Standardization (ISO) cleanliness codes, measured and defined as described ISO 4406:2017.

XP/Fine Fiber/Scrim media was constructed as described in Example 1. The XP/Fine Fiber/Scrim media and a Synteq XP™ synthetic liquid media having a 10 micron efficiency rating (Donaldson Company, Inc., Minneapolis, MN) were placed on a wire support and pleated to form a filter element. The filter elements were then tested under steady flow conditions (as described in the Steady Flow Conditions Test) or under cyclic flow conditions (as described in the Cyclic Flow Conditions Test). Results are shown in FIG. 4 (steady flow conditions) and FIG. 5 (cyclic flow conditions).

Under steady flow conditions, Synteq XP™ synthetic liquid media without a fine fiber layer achieved a reduction (from 22/21/17 to 18/14/4) in International Organization for Standardization (ISO) cleanliness codes, (measured and defined as described ISO 4406:2017), and the addition of a fine fiber layer achieved a further reduction (to 14/8/3) in cleanliness codes, at a comparable pressure drop—that is, pressure drop of the filter element that included XP/Fine Fiber/Scrim media was within 20%, and usually within 10% of the pressure drop of the filter element that included Synteq XP™ synthetic liquid media without the fine fiber.

Under dynamic flow conditions, Synteq XP™ synthetic liquid media without a fine fiber layer achieved a lesser reduction in cleanliness codes (from 22/21/17 to 22/18/8), but the addition of a fine fiber layer achieved a much greater reduction in cleanliness codes (22/21/17 down to 18/14/4), achieving the same levels achieved without the fine fiber layer under steady flow conditions, again, at a comparable pressure drop.

Example 3

Media was prepared according to Pendant Drop Sample Preparation Method 3, Table 1 Set A (small fine fibers deposited directly on scrim) and Pendant Drop Sample Preparation Method 4, Table 1, Set A (small fine fibers deposited on a large fine fiber layer deposited on scrim).

An exemplary image of the large fine fiber layer deposited on scrim is shown in FIG. 2B.

Figure 2C:
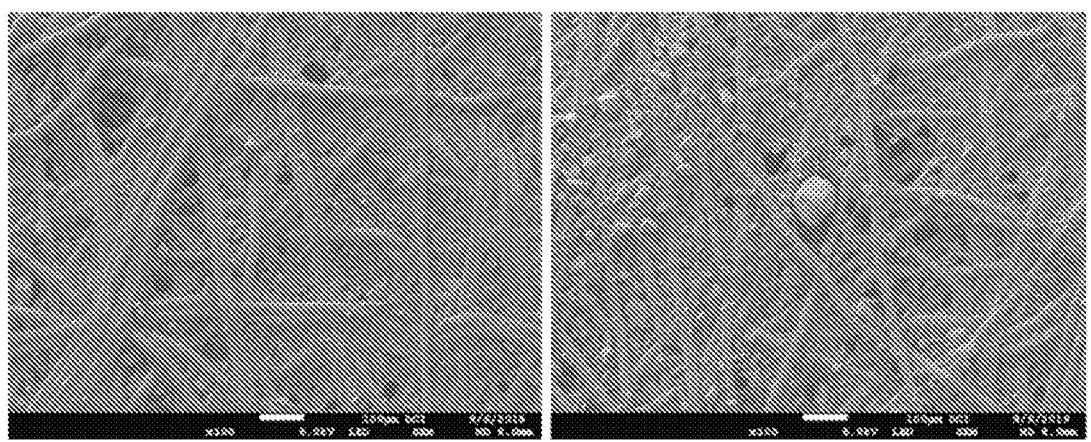
FIG. 2C shows exemplary SEM images (1000× magnification) of samples prepared as described in Example 3 (a continuous fine fiber layer including small fine fibers laid directly on scrim).
Figure 2D:
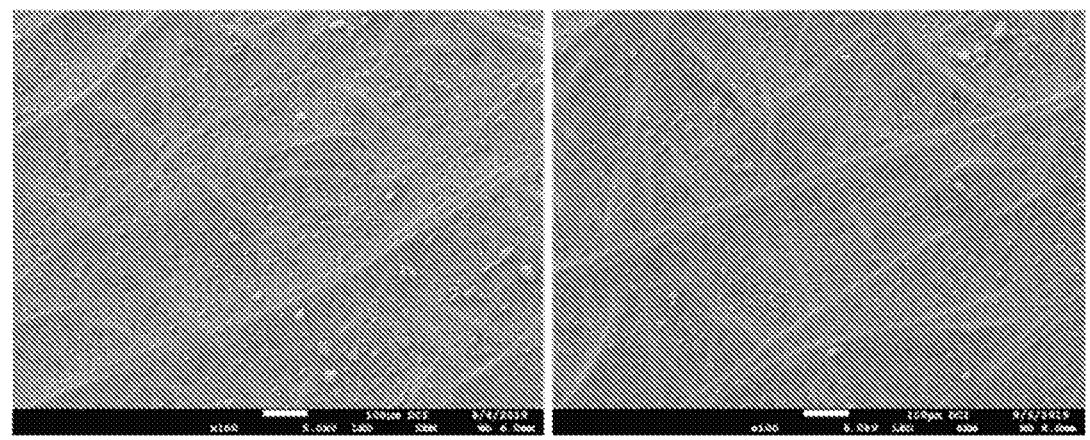
FIG. 2D shows exemplary SEM images (1000× magnification) of samples prepared as described in Example 3 (a continuous fine fiber layer including small fine fibers overlaid on large fine fibers).

An exemplary image of small fine fibers deposited directly on scrim is shown in FIG. 2C and an exemplary image of small fine fibers deposited on a large fine fiber layer deposited on scrim is shown in FIG. 2D (small fine fibers deposited on a large fine fiber layer deposited on scrim).

Example 4

Media was prepared according to Pendant Drop Sample Preparation Method 1. The resulting nonwoven had a theoretical basis weight of 1.64 g/m$^2$.

Control nonwoven media, prepared by co-spinning each single electrospinning precursor solution from two different syringes, had theoretical basis weights of 0.56 g/m$^2$ or 1.08 g/m$^2$, for Solution 1 and Solution 2, respectively.

Figure 2E:
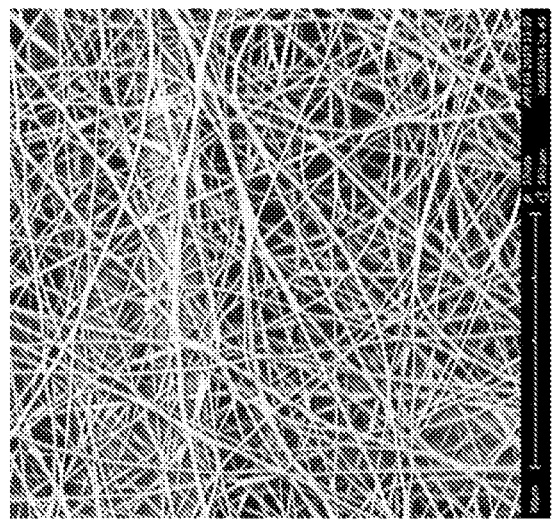
FIG. 2E shows exemplary SEM images (1000× magnification) of continuous fine fiber layer samples prepared as described in Example 4 using Solution 1 to achieve small fine fibers (left panel), Solution 1 and Solution 2 to achieve commingled fine fibers of mixed (small and large) diameters (center panel), and Solution 2 to achieve large fine fibers (right panel).
Figure 2E:
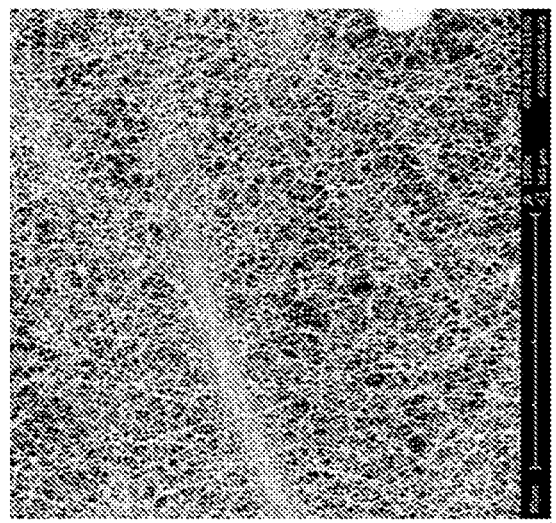
Figure 2E:
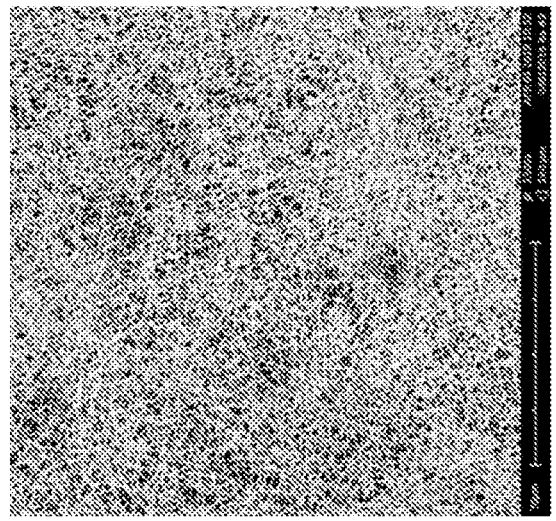
Figure 2F:
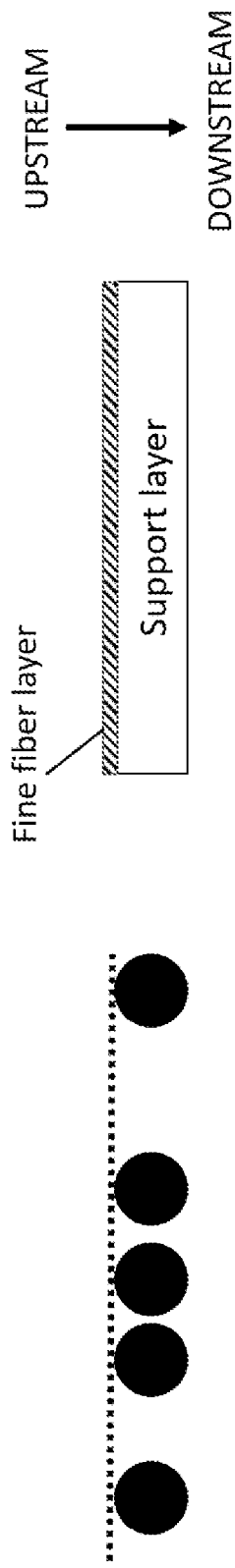
FIG. 2F shows a schematic for a sample prepared as described in Example 3 (small fine fibers laid directly on scrim).
Figure 2G:
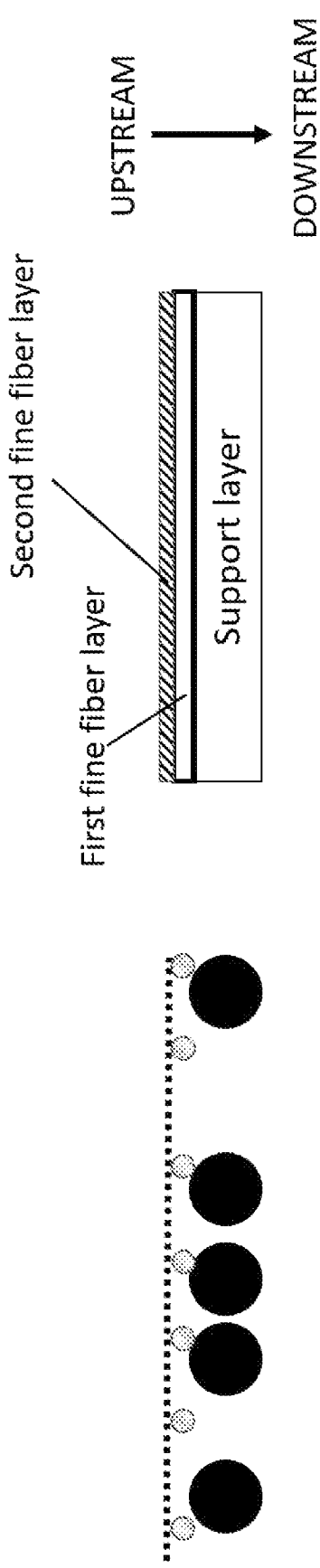
FIG. 2G shows a schematic for a continuous fine fiber layer sample prepared as described in Example 3 (small fine fibers overlaid on large fine fibers, large fine fibers laid direction on scrim).
Figure 2H:
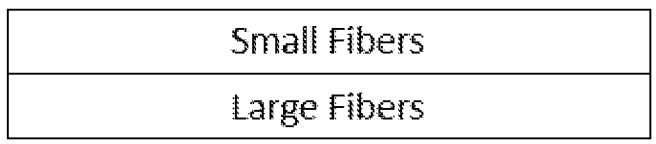
FIG. 2H-FIG. 2M shows schematics of exemplary media constructions. In each construction, the support layer is not shown but typically would be located on the downstream side of the media. In each construction, the efficiency layer is not shown but would typically be located on the upstream side of the media.
Figure 2I:
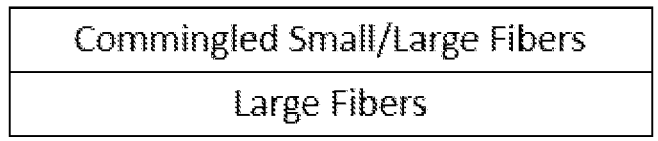
Figure 2J:
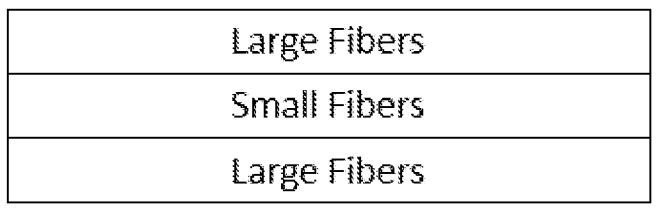
Figure 2K:
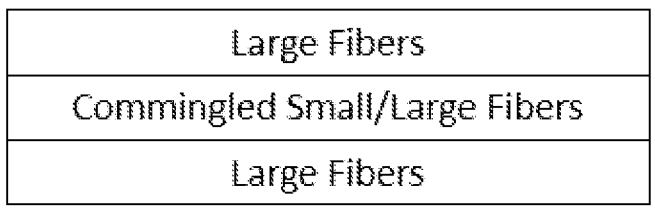
Figure 2L:
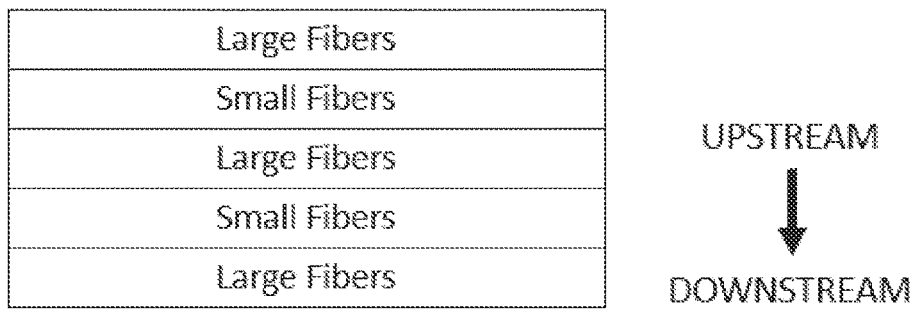
Figure 2M:
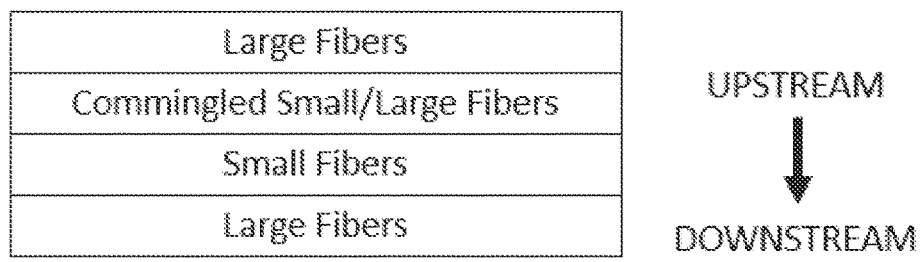

SEM images of the resulting media are shown in FIG. 2E.

Example 5

Sample integrity of composite samples during FHAST bench testing up to 20 psi (at 0.56 feet/minute face velocity, as further described in the Liquid Filtration Performance Testing methods) was evaluated and initial pressure drop of each composite was plotted against composite maximum pore size. As used in this Example, the "composite" refers to any layers of fine fiber (including, for example, the first, second, etc., layers of fine fibers) and the support layer. The composite includes at least one layer of fine fiber.

Composite average maximum pore size (P100) and composite average mean flow pore size (P50) for each sample was measured by flow porometry according to Flow Porometry Method A.

Each sample included mixed diameter fine fibers and a substrate. Some samples included a layer of fine fibers that included "large" fine fibers and "small" fine fibers, prepared as described in Methods 1, 2 or 3. Some samples included a first layer of continuous fine fibers and a second layer of continuous fine fibers where the first layer of continuous fine fibers included fine fibers having an average diameter at least three times the average fiber diameter of the smallest fibers of the second continuous fine fiber layer, prepared as described in Methods 4, 5, 6 or 7.

Figure 6A:
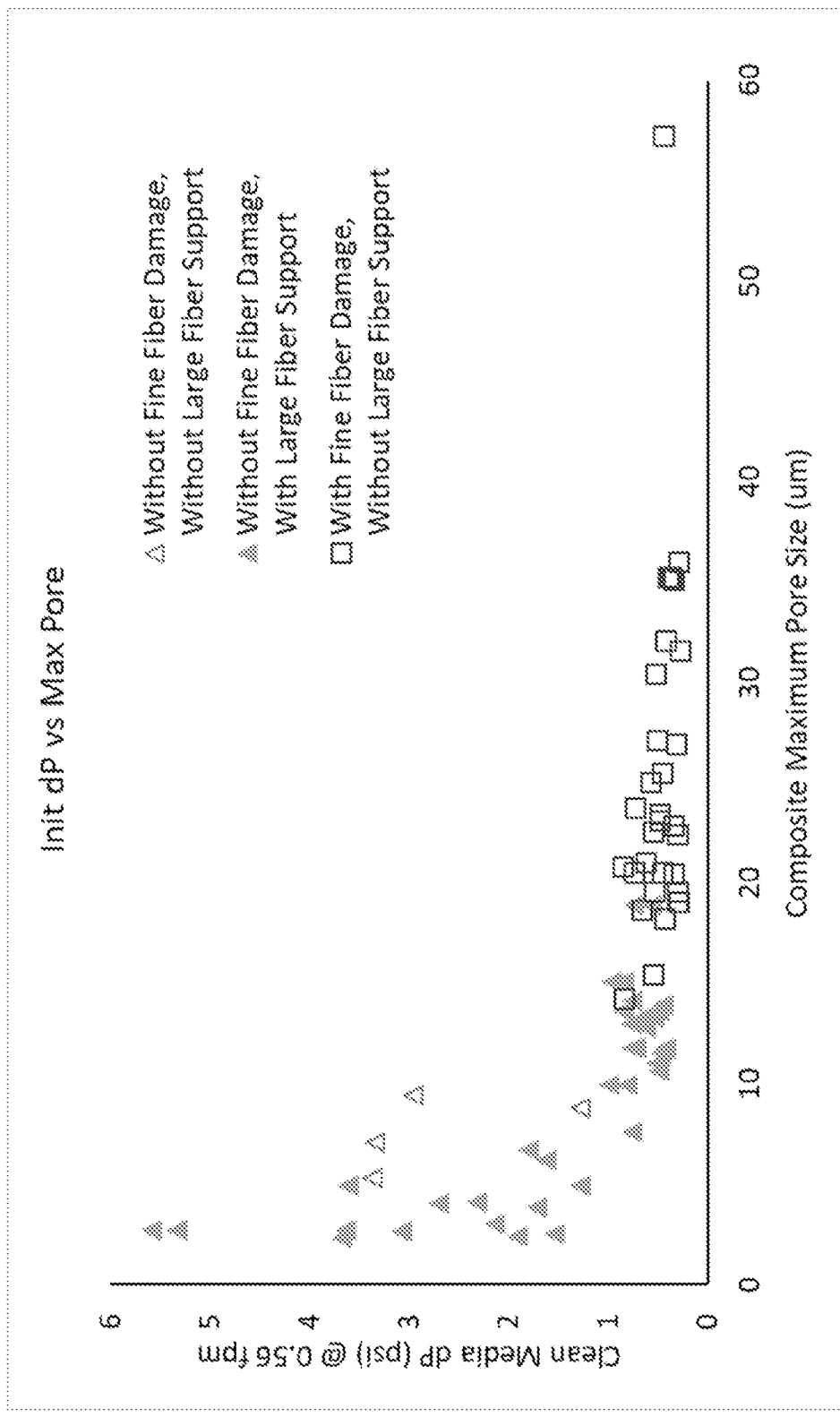
FIG. 6A-FIG. 6B shows initial pressure drop plotted against composite maximum pore size (FIG. 6A) or composite mean flow pore size (FIG. 6B) for composites including one or more continuous fine fiber layers and a support layer, as further described in Example 5. Triangles represent samples that maintained fine fiber structural integrity throughout testing; squares represent samples that suffered from fine fiber blow-out during testing.
Figure 6B:
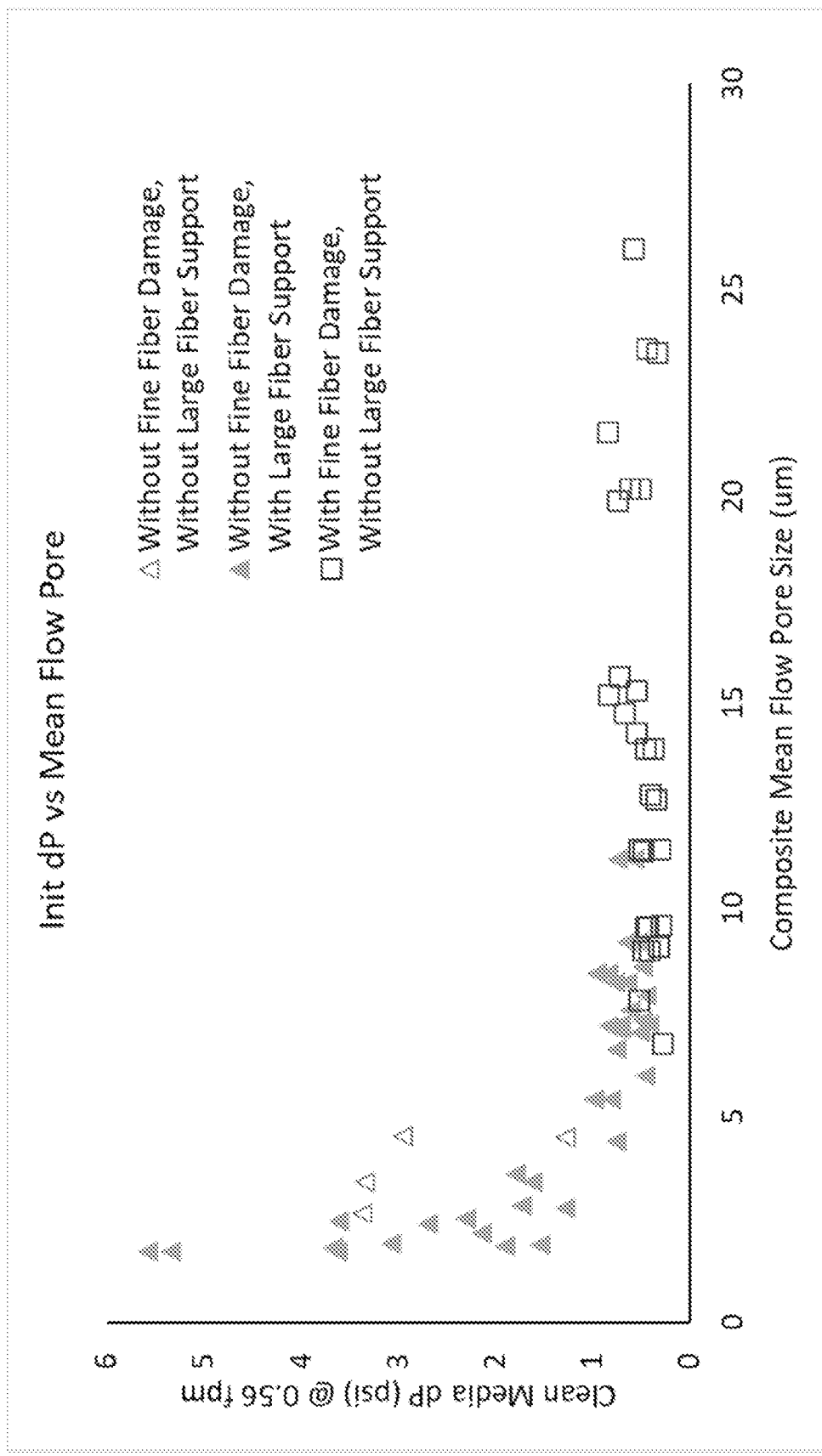

Results are shown in FIG. 6. Triangles represent samples that maintained fine fiber structural integrity throughout FHAST bench testing; squares represent samples that suffered from fine fiber blow-out during FHAST bench testing (indicated by beta collapse). Samples that included two fine fiber layers, the first layer including fine fibers having an average diameter at least three times the average fiber diameter of the smallest fibers of the second fine fiber layer are indicated by filled shapes. Samples that included one fine fiber layer including mixed diameter fibers are indicated by un-filled shapes.

Most of the media samples having only one layer of fine fibers (that is, that were prepared using Methods 1, 2 or 3), exhibited fine fiber damage (represented by open squares). A few media samples having only one layer of fine fibers survived up to 20 psi during FHAST bench testing layer (represented by open triangles). Without wishing to be bound by theory, it is believed these fine fiber layers survived testing because the coverage (basis weight) was very high—but such high basis weight comes at the cost of higher initial pressure drop.

In contrast, all of the media samples that were prepared using Methods 4, 5, 6 or 7, and included two fine fiber layer maintained fine fiber structural integrity (represented by filled triangles).

The results illustrate that composite average maximum pore size (FIG. 6A) and composite average mean flow pore size (FIG. 6B) both correlate with the ability of the composite to withstand FHAST bench testing—a laboratory test that highly correlates with the ability of the composite to withstand at least 20 psi pressure drop during liquid filtration, indicating better filter performance than a filter media that cannot withstand the same conditions.

While some media samples having a composite average maximum pore size (P100) as large as 20 µm withstood FHAST bench testing, a transition zone where some media samples begin to fail testing was observed for media samples having a composite average maximum pore sizes between 14 µm and 20 µm.

Similarly, while some media have a composite average mean flow pore size (P50) as large as 11 µm withstood FHAST bench testing, a transition zone where some media samples begin to fail testing was observed for media samples having a composite average maximum pore sizes between 6 µm and 11 µm.

For example, a sample without a large fine fiber support having a composite average maximum pore size of 11 µm is unable to survive FHAST bench testing, while a sample with a large fine fiber support having a composite average maximum pore size of 11 µm is able to survive FHAST bench testing. Being able to use a fine fiber sample with a larger pore size allows the fine tuning of efficiency without a detrimental pressure drop of the resulting composite.

Example 6

A composite including a fine fiber layer and a support layer was prepared according to Pendant Drop Sample Preparation Method 8A-8C to form Fine Fiber Sample A, Fine Fiber Sample B, and Fine Fiber Sample C (each of which also included a support layer, as described above).

An efficiency layer was prepared as described in the Preparation of Media Handsheets section that included 40 wt-% glass fibers (Lauscha B-10-F, nominal fiber diameter 1 µm, Lauscha Fiber International (Lauscha, Germany)) and 60 wt-% bicomponent fibers (Teijin TJ04CN, Teijin Limited (Tokyo, Japan)) to form Efficiency Layer A.

Figure 7:
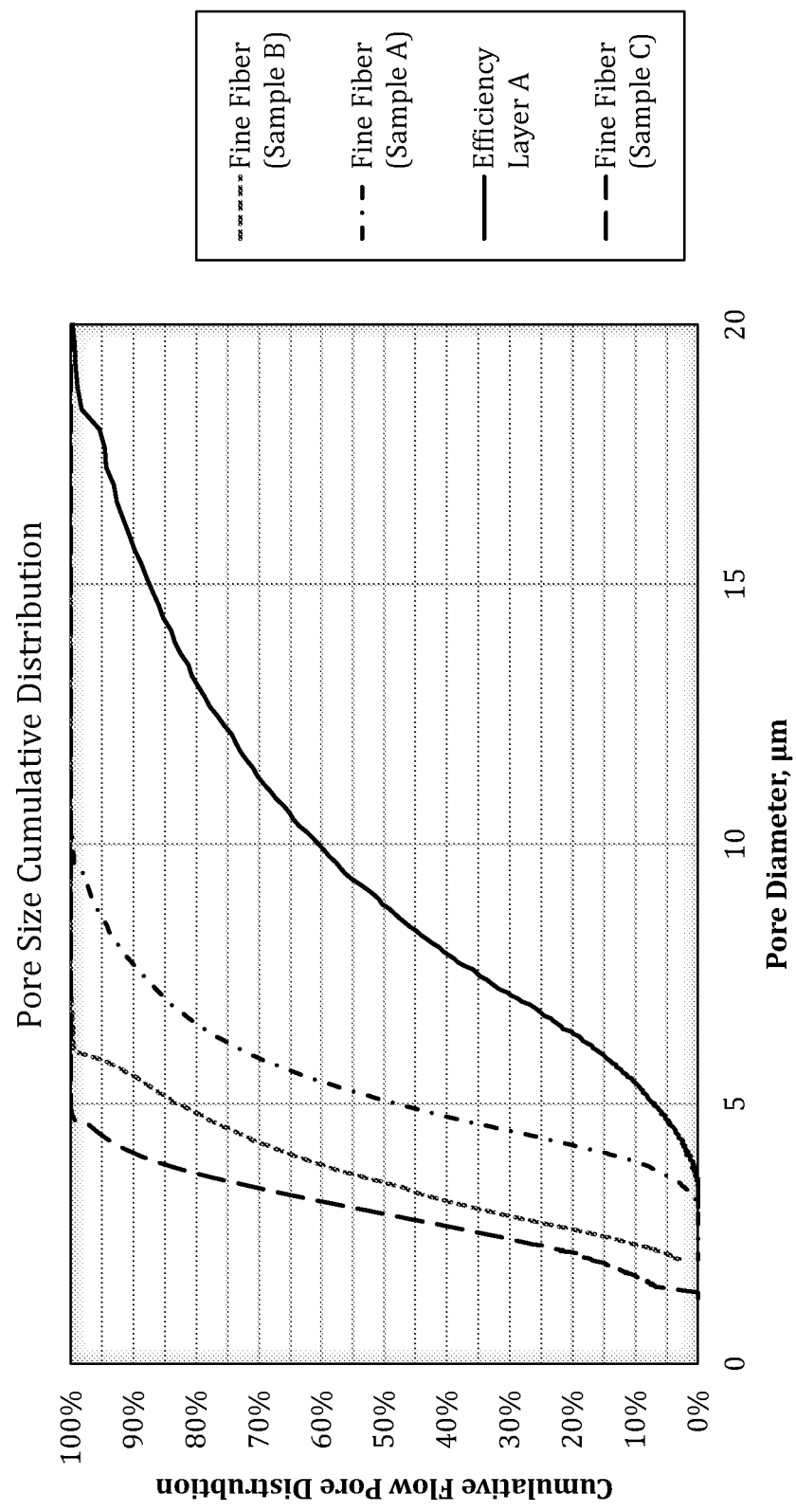
FIG. 7 shows the cumulative flow pore size distribution for samples described in Example 6.

Capillary flow porometry measurements were performed on Fine Fiber Sample A, Fine Fiber Sample B, Fine Fiber Sample C, and Efficiency Layer A, according to Flow Porometry Method B. Results are shown in Table 4 and FIG. 7.

TABLE 4

| | P95 | P90 | P50 | P10 | P5 | P95/P50 | P95/P5 |
|---|---|---|---|---|---|---|---|
| Efficiency Layer A | 17.81 µm | 15.73 µm | 8.82 µm | 5.40 µm | 4.70 µm | 2.02 µm | 3.30 µm |
| Fine Fiber Sample A | 8.59 µm | 7.69 µm | 5.07 µm | 3.89 µm | 3.62 µm | 1.70 µm | 2.21 µm |
| Fine Fiber Sample B | 5.85 µm | 5.54 µm | 3.48 µm | 2.29 µm | 2.12 µm | 1.68 µm | 2.55 µm |
| Fine Fiber Sample C | 4.39 µm | 4.06 µm | 2.88 µm | 1.70 µm | 1.45 µm | 1.52 µm | 2.58 µm |

Media was prepared as described in the Preparation of Media Handsheets section that included 40 wt-% glass fibers (Lauscha B-26-R, nominal fiber diameter 2.4 µm, Lauscha Fiber International (Lauscha, Germany)) and 60 wt-% bicomponent fibers (Teijin TJ04CN, Teijin Limited (Tokyo, Japan)) to form Loading Layer A.

The performance of a filter media that included both Loading Layer A and Efficiency Layer A was assessed under both steady flow and cyclic flow conditions. Results are shown in Table 5A. As can be seen from the results in Table 5A, although a loading layer and efficiency layer without a fine fiber layer had good performance under steady flow conditions, as indicated by a low pressure drop (ΔP) and a high efficiency, under cyclic flow conditions, the efficiency dropped dramatically. While under steady flow conditions, the media could filter 10 µm-diameter particles with high efficiency, under steady flow conditions, that efficiency for the same diameter particles was more than 50 times lower. Similarly, while under steady flow conditions, the media could filter 99% of particles having a 9.3 µm-dimeter, under cyclic flow conditions, the same 99% filtration could not be achieved unless the particles had a 27 µm diameter.

As shown in Table 5B, the addition of certain fine fibers layers (Fine Fiber Sample A, Fine Fiber Sample B) could "rescue" this loss in efficiency while maintaining an acceptable pressure drop. In contrast, the addition of Fine Fiber Sample C results in an undesirably high pressure drop (greater than 3× the pressure drop exhibited by Loading Layer A and Efficiency Layer A alone). Fine Fiber Sample C has smaller pores than Efficiency Layer A so that the P95 of Fine Fiber Sample C (4.39 µm) does not fall within the P5-P50 range (4.70 µm-8.82 µm) of Efficiency Layer A. In contrast, both Fine Fiber Sample A and Fine Fiber Sample B have a P95 that falls within the P5-P50 range (4.70 µm-8.82 µm) of Efficiency Layer A.

Having a very small pore size in the fine fiber layer (as in, for example, Fine Fiber Sample C) results in an increased pressure drop because the fine fiber blocks the flow of air through the filter media. Moreover, without wishing to be bound by theory, it is believed that having a pore size of the fine fiber layer that is so much smaller than that of the efficiency layer is also less efficient because the fine fiber layer is capturing particles of a size that cannot be caught in the efficient layer. In contrast, when the pore sizes of the fine fiber layer and the efficiency layer overlap, the fine fiber layer is catching particles of a size that may also be caught by the efficiency layer.

TABLE 5A

| Test Conditions | Layers of Filter Media | Clean ΔP | Over-all $\beta_{10\,\mu m}$ | $\beta 100$ |
|---|---|---|---|---|
| Steady Flow | Loading Layer A/Efficiency Layer A | 7.6 kPa | 152 | 9.3 µm |
| Cyclic Flow | Loading Layer A/Efficiency Layer A | 7.2 kPa | 2.39 | 27 µm |

TABLE 5B

| Test Conditions | Layers of Filter Media | Clean ΔP | Over-all $\beta_{10\,\mu m}$ | $\beta 100$ |
|---|---|---|---|---|
| Cyclic Flow | Loading Layer A/Efficiency Layer A/Fine Fiber Sample A | 10.3 kPa | 8.53 | 17 µm |
| Cyclic Flow | Loading Layer A/Efficiency Layer A/Fine Fiber Sample B | 15.8 kPa | 129 | 9.5 µm |
| Cyclic Flow | Loading Layer A/Efficiency Layer A/Fine Fiber Sample C | 23.2 kPa | 2470 | 4.1 µm |

Example 7

Figure 8A:
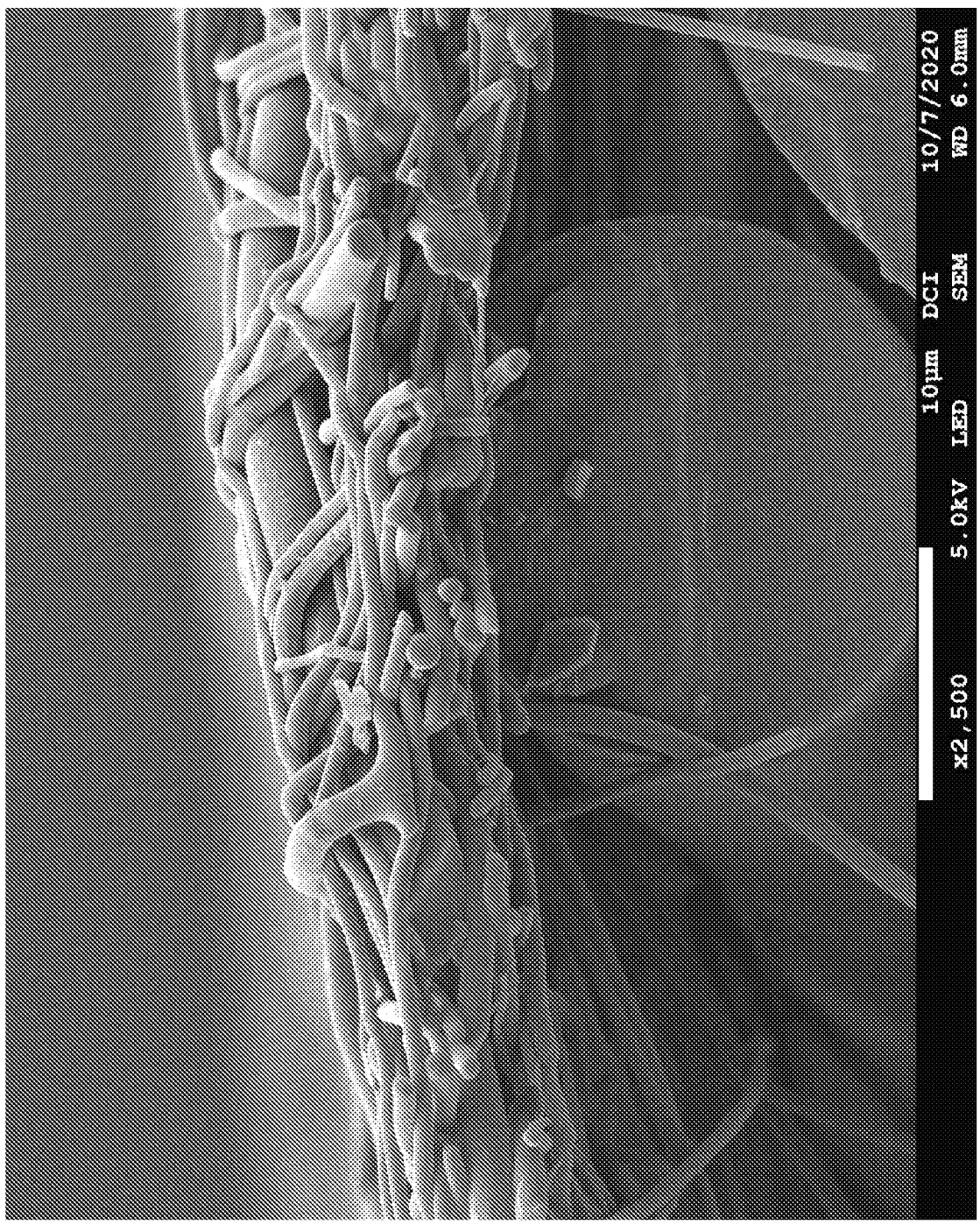
FIG. 8A shows an exemplary cross-sectional image of a continuous fine fiber layer on a support layer.

A sample prepared according to Method 9 was analyzing according to the "Fine Fiber Layer Thickness" method. An exemplary image is shown in FIG. 8A, wherein the full depth of the fine fiber layer is visible in cross-section, and fibers of the support layer are partially visible at the bottom of the image.

Figure 8B:
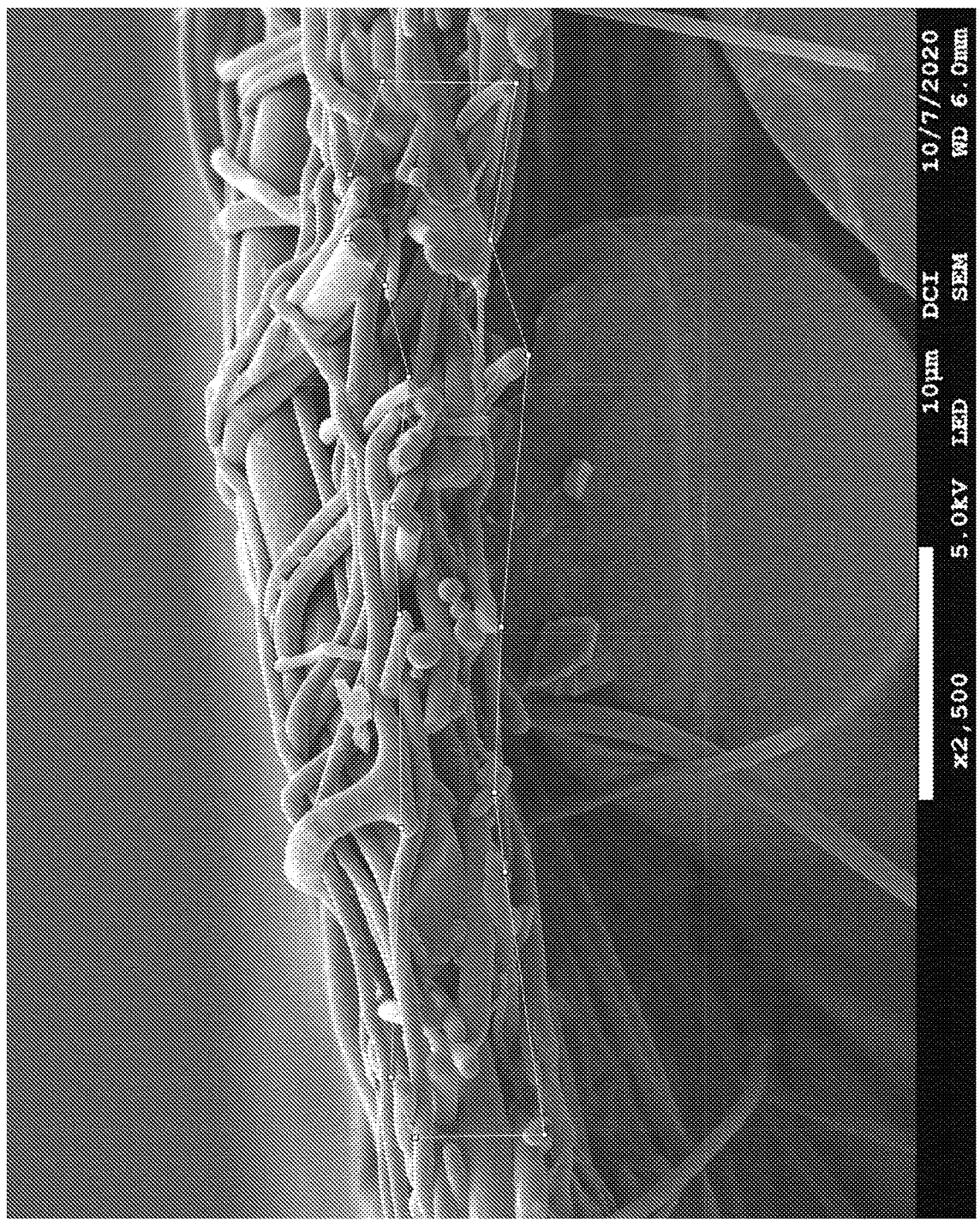
FIG. 8B-FIG. 8D show exemplary images of a method to measure the continuous fine fiber layer thickness, as further described in the Examples.
Figure 8C:
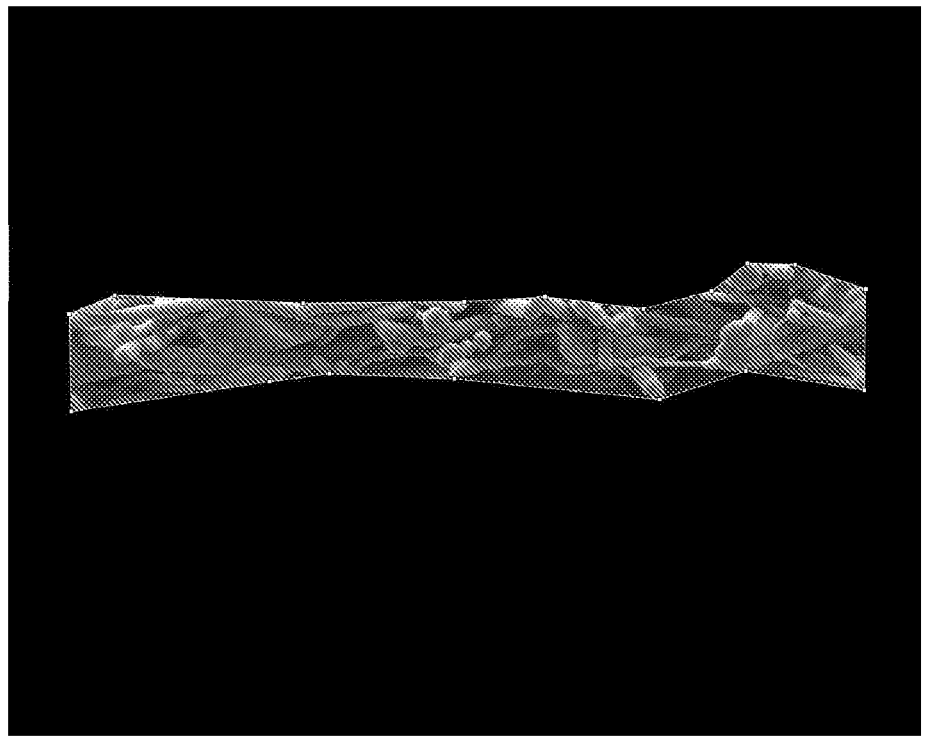
Figure 8D:
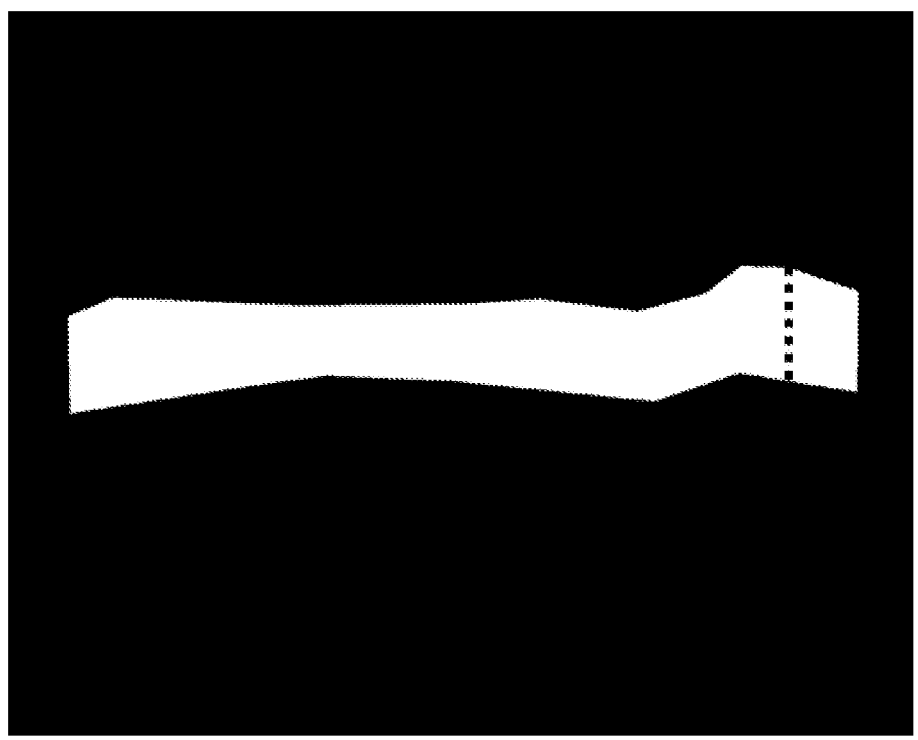

FIG. 8B shows delineation of the fine fiber cross-section using a polygon tool. FIG. 8C shows the image after the area outside the selected fine fiber cross-section has been cleared. FIG. 8D shows the area of the selected fine fiber cross-section after it was re-colored white using the threshold level tool (to compensate for fibers on the borders of the selected section), and the dashed line indicates the maximum thickness in the image that was measured and recorded (5.97 µm). Five of these maximum values were rounded to the nearest tenth of a micron and then these rounded values then averaged. Results are shown in Table 6.

TABLE 6

| | Max Thickness (µm) | Rounded |
|---|---|---|
| Sample 1 | 5.97 | 6 |
| Sample 2 | 8.17 | 8.2 |
| Sample 3 | 7.203 | 7.2 |

TABLE 6-continued

| | Max Thickness (µm) | Rounded |
|---|---|---|
| Sample 4 | 6.941 | 6.9 |
| Sample 5 | 4.702 | 4.7 |
| Average Fine Fiber Layer Thickness | | 6.6 |

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A filter medium comprising a support layer;
a continuous fine fiber layer, having a thickness of up to 50 µm; and
an efficiency layer;
wherein a composite comprising the support layer and the continuous fine fiber layer has a P95/P50 ratio of up to 2;
wherein the efficiency layer has a P95/P50 ratio of at least 1.8; and
wherein the value of P95 of the composite falls within a range provided by the values of P5 and P50 of the efficiency layer.

2. The filter medium of claim 1, wherein the composite has a P95/P50 ratio of greater than 1.

3. The filter medium of claim 1, wherein the efficiency layer has a P95/P50 ratio of up to 20.

4. The filter medium of claim 1, wherein the continuous fine fiber layer has a thickness of at least 2 µm.

5. The filter medium of claim 1, wherein the continuous fine fiber layer is located between the efficiency layer and the support layer.

6. The filter medium of claim 1, wherein the efficiency layer is located on the upstream side of the filter medium.

7. The filter medium of claim 1, wherein the filter medium further comprises a second efficiency layer.

8. The filter medium of claim 7, wherein the second efficiency layer is located adjacent to and upstream of the efficiency layer.

9. The filter medium of claim 1, wherein the efficiency layer comprises a bi-component fiber and an efficiency fiber, wherein the efficiency fiber has a smaller diameter than the bi-component fiber.

10. The filter medium of claim 9, wherein the efficiency fiber comprises a glass fiber.

11. The filter medium of claim 1, wherein the efficiency layer comprises a microfibrillated cellulose fiber.

12. The filter medium of claim 1, wherein the continuous fine fiber layer comprises a fiber having a diameter of up to 10 micrometers (µm).

13. The filter medium of claim 1, wherein the continuous fine fiber layer comprises a fiber having an elliptical shape.

14. The filter medium of claim 1, wherein the continuous fine fiber layer comprises a fiber having a diameter of at least 1 micrometer (µm).

15. The filter medium of claim 1, wherein the continuous fine fiber layer comprises a mixture of fibers of different diameters.

16. The filter medium of claim 15, wherein the fibers of different diameters are commingled within a single strata of the continuous fine fiber layer.

17. The filter medium of claim 15, wherein the fibers of different diameters form different strata in the continuous fine fiber layer.

18. The filter medium of claim 1, wherein the support layer comprises a spunbond layer.

19. A filter element comprising the filter medium of claim 1.

20. The filter element of claim 19, wherein a wire support is located downstream of the support layer.

* * * * *